(12) United States Patent
Bruening et al.

(10) Patent No.: US 12,485,168 B2
(45) Date of Patent: Dec. 2, 2025

(54) HEPATITIS B VIRUS VACCINES

(71) Applicants: Vir Biotechnology, Inc., San Francisco, CA (US); Triad National Security, LLC, Los Alamos, NM (US)

(72) Inventors: Eric Bruening, San Francisco, CA (US); Janet Douglas, San Francisco, CA (US); Emily Marshall, San Francisco, CA (US); Karina Yusim, Santa Fe, NM (US); Bette Korber, Santa Fe, NM (US); James Theiler, Santa Fe, NM (US)

(73) Assignees: Vir Biotechnlogy, Inc., San Francisco, CA (US); Triad National Security, LLC, Los Alamos, NM (US)

( * ) Notice: Subject to any disclaimer, the term of this patent is extended or adjusted under 35 U.S.C. 154(b) by 859 days.

(21) Appl. No.: 17/638,344

(22) PCT Filed: Aug. 28, 2020

(86) PCT No.: PCT/US2020/048411
§ 371 (c)(1),
(2) Date: Feb. 25, 2022

(87) PCT Pub. No.: WO2021/045969
PCT Pub. Date: Mar. 11, 2021

(65) Prior Publication Data
US 2022/0288195 A1 Sep. 15, 2022

Related U.S. Application Data

(60) Provisional application No. 62/941,125, filed on Nov. 27, 2019, provisional application No. 62/893,546, filed on Aug. 29, 2019.

(51) Int. Cl.
| | | |
|---|---|---|
| *A61K 39/29* | (2006.01) | |
| *A61K 39/00* | (2006.01) | |
| *A61P 31/20* | (2006.01) | |
| *C07K 14/005* | (2006.01) | |
| *C12N 15/86* | (2006.01) | |

(52) U.S. Cl.
CPC ............ *A61K 39/292* (2013.01); *A61P 31/20* (2018.01); *C07K 14/005* (2013.01); *C12N 15/86* (2013.01); *A61K 2039/5256* (2013.01); *A61K 2039/53* (2013.01); *A61K 2039/70* (2013.01); *C12N 2710/16122* (2013.01); *C12N 2710/16142* (2013.01); *C12N 2730/10134* (2013.01)

(58) Field of Classification Search
CPC .......... A61K 39/292; A61K 2039/5256; A61K 2039/53; A61K 2039/70; A61K 2039/545; A61K 2039/57; A61K 2039/572; A61K 39/12; A61P 31/20; C07K 14/005; C12N 15/86; C12N 2710/16122; C12N 2710/16142; C12N 2730/10134; C12N 2710/16143; C12N 2730/10122
See application file for complete search history.

(56) References Cited

U.S. PATENT DOCUMENTS

| | | |
|---|---|---|
| 6,072,049 A | 6/2000 | Thoma |
| 7,018,826 B1 | 3/2006 | Hildt et al. |
| 7,875,423 B2 | 1/2011 | Bartholomeusz et al. |
| 8,278,432 B2 | 10/2012 | Bozdayi |
| 8,859,198 B2 | 10/2014 | Bartholomeusz et al. |
| 9,249,427 B2 | 2/2016 | Picker et al. |
| 9,393,299 B2 | 7/2016 | Martin et al. |
| 10,532,099 B2 | 1/2020 | Picker et al. |
| 10,894,078 B2 | 1/2021 | Bruening et al. |
| 10,912,827 B2 | 2/2021 | Protzer et al. |
| 11,091,779 B2 | 8/2021 | Frueh et al. |
| 2004/0054139 A1 | 3/2004 | Page et al. |
| 2004/0106174 A1 | 6/2004 | Jones et al. |
| 2004/0137016 A1 | 7/2004 | Moon et al. |
| 2008/0171062 A1* | 7/2008 | Sala-Schaeffer ....... A61K 39/12 435/254.2 |
| 2014/0106174 A1 | 4/2014 | Yamaguchi et al. |
| 2016/0106830 A1* | 4/2016 | Georges ............... C07K 14/005 530/350 |

(Continued)

FOREIGN PATENT DOCUMENTS

| | | |
|---|---|---|
| CA | 3 040 225 A1 | 11/2011 |
| KR | 10-2013-0113046 A | 10/2013 |

(Continued)

OTHER PUBLICATIONS

Caposio et al., "Characterization of a live-attenuated HCMV-based vaccine platform," *Scientific Reports* 9:19236, 2019, 19 pages.
Genbank, "Hepatitis B virus isolate M154, complete genome," Accession No. GQ358158.1, Apr. 29, 2011. (3 pages).
Genbank, "Hepatitis B virus, complete genome," Accession No. Y07587.1, Mar. 20, 2001. (3 pages).
Hansen et al., "Broadly targeted CD8+ T cell responses restricted by major histocompatibility complex E," *Science* 351(6274):714-720, Feb. 12, 2016. (8 pages).

(Continued)

*Primary Examiner* — Rachel B Gill
(74) *Attorney, Agent, or Firm* — Fox Rothschild LLP

(57) ABSTRACT

Isolated polynucleotides and polypeptides, and hepatitis B virus (HBV) vaccines comprising the same. Viral vectors for expressing such polypeptides, and which may be used in HBV vaccines, as well as methods of protecting a subject from HBV infection and methods of treating HBV in a subject comprising administering the polypeptides, vectors, or vaccines. Methods of designing and producing an HBV vaccine comprising designing vaccine antigens to cover the diversity within a geographic area using an antigen amino acid sequence that efficiently covers the epitopes in the HBV genotypes present in the geographic area.

15 Claims, 24 Drawing Sheets

Specification includes a Sequence Listing.

(56) References Cited

U.S. PATENT DOCUMENTS

| | | | |
|---|---|---|---|
| 2018/0133321 A1* | 5/2018 | Picker | A61K 40/11 |
| 2022/0257748 A1* | 8/2022 | Früh | A61K 40/11 |

FOREIGN PATENT DOCUMENTS

| | | |
|---|---|---|
| KR | 10-1418836 B1 | 8/2014 |
| WO | 01/27281 A1 | 4/2001 |
| WO | 01/98333 A2 | 12/2001 |
| WO | 02/094866 A1 | 11/2002 |
| WO | 2005/042733 A1 | 5/2005 |
| WO | 2011/015656 A2 | 2/2011 |
| WO | 2012109404 A1 | 8/2012 |
| WO | 2016/054654 A1 | 4/2016 |
| WO | 2016/130693 A1 | 8/2016 |
| WO | 2017/121791 A1 | 7/2017 |
| WO | 2018/075591 A8 | 4/2018 |
| WO | 2018189522 A1 | 10/2018 |

OTHER PUBLICATIONS

Hansen et al., "Cytomegalovirus Vectors Violate CD8+ T Cell Epitope Recognition Paradigms," *Science* 340(6135):1237874, May 24, 2013. (19 pages).

Hansen et al., "Effector memory T cell responses are associated with protection of rhesus monkeys from mucosal simian immunodeficiency virus challenge," *Nature Medicine* 15(3):293-299, Mar. 2009. (8 pages).

Hansen et al., "Evasion of $CD8^+$ T Cells Is Critical for Superinfection by Cytomegalovirus," *Science* 328(5974): 102-106, Apr. 2, 2010. (6 pages).

Hansen et al., "Immune clearance of highly pathogenic SIV infection," *Nature* 502:100-124, Jul. 6, 2013, 10 pages.

Hansen et al., "Profound early control of highly pathogenic SIV by an effector memory T-cell vaccine," *Nature* 473: 523-527, May 26, 2011. (7 pages).

Korber, "LANL/New Mexico Consortium HIV vaccine design and Analysis," Los Alamos National Laboratory, LA-UR-14-25023, Jul. 7, 2014, 10 pages.

Theiler et al., "Epigraph: A Vaccine Design Tool Applied to an HIV Therapeutic Vaccine and a Pan-Filovirus Vaccine," *Scientific Reports* 6:33987, Oct. 5, 2016. (15 pages).

UniProt, "Hepatitis B virus (HBV)," sequence ID No. A0AOD3RZH3, downloaded Feb. 17, 2021. (3 pages).

UniProt, "Hepatitis B virus (HBV)," sequence ID No. B3VB42_HBV, downloaded Feb. 17, 2021. (2 pages).

UniProt, "Hepatitis B virus (HBV)," sequence ID No. K9UTJ3_HBV, downloaded Feb. 17, 2021. (1 page).

UniProt, "Hepatitis B virus (HBV)," sequence ID No. Q9IXD7_HBV, downloaded Feb. 17, 2021. (1 page).

* cited by examiner

| | | | |
|---|---|---:|---:|
| ▨ | A | 55 | 3.4% |
| ▨ | B | 536 | 32.8% |
| ▨ | BC | 14 | 0.9% |
| ▨ | C | 620 | 37.9% |
| ▨ | CB | 104 | 6.4% |
| ▨ | D | 175 | 10.7% |
| ▨ | DC | 87 | 5.3% |
| ▨ | DE | 22 | 1.3% |
| ▨ | other | 22 | 1.3% |
| | total | 1635 | 100.0% |

ASIA

| | | | |
|---|---|---:|---:|
| ▨ | B | 298 | 28.5% |
| ▨ | C | 528 | 50.6% |
| ▨ | CB | 85 | 8.1% |
| ▨ | D | 35 | 3.4% |
| ▨ | DC | 86 | 8.2% |
| ▨ | other | 12 | 1.1% |
| | total | 1044 | 100.0% |

CHINA

FIG. 7A

2 vs GLOBAL

2 vs CHINA

2 vs NOT CHINA

Legend:
- Dvac Genotype D vaccine
- Cref Genotype C reference strain
- CHn China Best Natural
- CHe China Episensus sequence
- GLn Global Best Natural
- GLe Global Episensus Sequence
- 2CHGLe Histograms:
PTE coverage
By 1000 randomly
selected natural strains

|  | Vaccine | Parameters | China Exact | China Ioff | China Rarest Epi | China Rare Count | NOT China Exact | NOT China Ioff | NOT China Rarest Epi | NOT China Rare Count | Global Exact | Global Ioff | Global Rarest Epi | Global Rare Count |
|---|---|---|---|---|---|---|---|---|---|---|---|---|---|---|
| 1 | D.vaccine (Y07587) |  | 0.548 | 0.809 | 0 | 9 | 0.633 | 0.853 | 1 | 9 | 0.603 | 0.837 | 1 | 9

FIG. 10A

SEQUENCE LISTING

<160> NUMBER OF SEQ ID NOS: 36

<210> SEQ ID NO 1

-continued

```
<211> LENGTH: 1057
<212> TYPE: PRT
<213> ORGANISM: Artificial Sequence
<220> FEATURE:
<223> OTHER INFORMATION: Synthetic sequence 1_CH_epi

<400> SEQUENCE: 1
```

Asp Ile Asp Pro Tyr Lys Glu Phe Gly Ala Ser Val Glu Leu Leu Ser
1               5                   10                  15

Phe Leu Pro Ser Asp Phe Phe Pro Ser Ile Arg Asp Leu Leu Asp Thr
            20                  25                  30

Ala Ser Ala Leu Tyr Arg Glu Ala Leu Glu Ser Pro Glu His Cys Ser
        35                  40                  45

Pro His His Thr Ala Leu Arg Gln Ala Ile Leu Cys Trp Gly Glu Leu
    50                  55                  60

Met Asn Leu Ala Thr Trp Val Gly Ser Asn Leu Glu Asp Pro Ala Ser
65                  70                  75                  80

Arg Glu Leu Val Val Ser Tyr Val Asn Val Asn Met Gly Leu Lys Ile
                85                  90                  95

Arg Gln Leu Leu Trp Phe His Ile Ser Cys Leu Thr Phe Gly Arg Glu
            100                 105                 110

Thr Val Leu Glu Tyr Leu Val Ser Phe Gly Val Trp Ile Arg Thr Pro
        115                 120                 125

Pro Ala Tyr Arg Pro Pro Asn Ala Pro Ile Leu Ser Thr Leu Pro Glu
    130                 135                 140

Thr Thr Val Val Arg Arg Arg Gly Arg Ser Pro Arg Arg Arg Thr Pro
145                 150                 155                 160

Ser Pro Arg Arg Arg Arg Ser Gln Ser Pro Arg Arg Arg Arg Ser Gln
                165                 170                 175

Ser Arg Glu Ser Gln Cys Met Gly Gly Trp Ser Ser Lys Pro Arg Gln
            180                 185                 190

Gly Met Gly Thr Asn Leu Ser Val Pro Asn Pro Leu Gly Phe Phe Pro
        195                 200                 205

Asp His Gln Leu Asp Pro Ala Phe Gly Ala Asn Ser Asn Asn Pro Asp
    210                 215                 220

Trp Asp Phe Asn Pro Asn Lys Asp His Trp Pro Glu Ala Asn Gln Val
225                 230                 235                 240

Gly Ala Gly Ala Phe Gly Pro Gly Phe Thr Pro Pro His Gly Gly Leu
                245                 250                 255

Leu Gly Trp Ser Pro Gln Ala Gln Gly Ile Leu Thr Thr Val Pro Ala
            260                 265                 270

Ala Pro Pro Pro Ala Ser Thr Asn Arg Gln Ser Gly Arg Gln Pro Thr
        275                 280                 285

Pro Ile Ser Pro Pro Leu Arg Asp Ser His Pro Gln Ala Met Gln Trp
    290                 295                 300

Asn Ser Thr Thr Phe His Gln Ala Leu Leu Asp Pro Arg Val Arg Gly
305                 310                 315                 320

Leu Tyr Phe Pro Ala Gly Gly Ser Ser Ser Gly Thr Val Asn Pro Val
                325                 330                 335

Pro Thr Thr Ala Ser Pro Ile Ser Ser Ile Phe Ser Arg Thr Gly Asp
            340                 345                 350

Pro Ala Pro Asn Met Glu Asn Thr Thr Ser Gly Phe Leu Gly Pro Leu
        355                 360                 365

Leu Val Leu Gln Ala Gly Phe Phe Leu Leu Thr Arg Ile Leu Thr Ile
    370                 375                 380

-continued

```
Pro Gln Ser Leu Asp Ser Trp Trp Thr Ser Leu Asn Phe Leu Gly Gly
385                 390                 395                 400

Ala Pro Thr Cys Pro Gly Gln Asn Ser Gln Ser Pro Thr Ser Asn His
            405                 410                 415

Ser Pro Thr Ser Cys Pro Pro Ile Cys Pro Gly Tyr Arg Trp Met Cys
            420                 425                 430

Leu Arg Arg Phe Ile Ile Phe Leu Phe Ile Leu Leu Cys Leu Ile
            435                 440                 445

Phe Leu Leu Val Leu Leu Asp Tyr Gln Gly Met Leu Pro Val Cys Pro
    450                 455                 460

Leu Leu Pro Gly Thr Ser Thr Thr Ser Thr Gly Pro Cys Lys Thr Cys
465                 470                 475                 480

Thr Ile Pro Ala Gln Gly Thr Ser Met Phe Pro Ser Cys Cys Cys Thr
                485                 490                 495

Lys Pro Ser Asp Gly Asn Cys Thr Cys Ile Pro Ile Pro Ser Ser Trp
                500                 505                 510

Ala Phe Ala Arg Phe Leu Trp Glu Trp Ala Ser Val Arg Phe Ser Trp
            515                 520                 525

Leu Ser Leu Leu Val Pro Phe Val Gln Trp Phe Val Gly Leu Ser Pro
    530                 535                 540

Thr Val Trp Leu Ser Val Ile Trp Met Met Trp Tyr Trp Gly Pro Ser
545                 550                 555                 560

Leu Tyr Asn Ile Leu Ser Pro Phe Leu Pro Leu Leu Pro Ile Phe Phe
                565                 570                 575

Cys Leu Trp Val Tyr Ile Val Thr Gly Gly Val Phe Leu Val Asp Lys
            580                 585                 590

Asn Pro His Asn Thr Thr Glu Ser Arg Leu Val Val Asp Phe Ser Gln
            595                 600                 605

Phe Ser Arg Gly Ser Thr His Val Ser Trp Pro Lys Phe Ala Val Pro
    610                 615                 620

Asn Leu Gln Ser Leu Thr Asn Leu Leu Ser Ser Asn Leu Ser Trp Leu
625                 630                 635                 640

Ser Leu Asp Val Ser Ala Ala Phe Tyr His Ile Pro Leu His Pro Ala
                645                 650                 655

Ala Met Pro His Leu Leu Val Gly Ser Ser Gly Leu Pro Arg Tyr Val
                660                 665                 670

Ala Arg Leu Ser Ser Thr Ser Arg Asn Ile Asn Tyr Gln His Gly Thr
            675                 680                 685

Met Gln Asp Leu His Asp Ser Cys Ser Arg Asn Leu Tyr Val Ser Leu
    690                 695                 700

Leu Leu Leu Tyr Lys Thr Phe Gly Arg Lys Leu His Leu Tyr Ser His
705                 710                 715                 720

Pro Ile Ile Leu Gly Phe Arg Lys Ile Pro Met Gly Val Gly Leu Ser
                725                 730                 735

Pro Phe Leu Leu Ala Gln Phe Thr Ser Ala Ile Cys Ser Val Val Arg
            740                 745                 750

Arg Ala Phe Pro His Cys Leu Ala Phe Ser Tyr Met Asp Asp Val Val
            755                 760                 765

Leu Gly Ala Lys Ser Val Gln His Leu Glu Ser Leu Phe Thr Ser Ile
    770                 775                 780

Thr Asn Phe Leu Leu Ser Leu Gly Ile His Leu Asn Pro Asn Lys Thr
785                 790                 795                 800
```

Lys Arg Trp Gly Tyr Ser Leu Asn Phe Met Gly Tyr Val Ile Gly Ser
                805                 810                 815

Trp Gly Thr Leu Pro Gln Glu His Ile Val Leu Lys Ile Lys Gln Cys
            820                 825                 830

Phe Arg Lys Leu Pro Val Asn Arg Pro Ile Asp Trp Lys Val Cys Gln
        835                 840                 845

Arg Ile Val Gly Leu Leu Gly Phe Ala Ala Pro Phe Thr Gln Cys Gly
    850                 855                 860

Tyr Pro Ala Leu Met Pro Leu Tyr Ala Cys Ile Gln Ser Lys Gln Ala
865                 870                 875                 880

Phe Thr Phe Ser Pro Thr Tyr Lys Ala Phe Leu Cys Lys Gln Tyr Leu
                885                 890                 895

Asn Leu Tyr Pro Val Ala Arg Gln Arg Ser Gly Leu Cys Gln Val Phe
            900                 905                 910

Ala Asp Ala Thr Pro Thr Gly Trp Gly Leu Ala Ile Gly His Arg Arg
        915                 920                 925

Met Arg Gly Thr Phe Val Ala Pro Leu Pro Ile His Thr Ala Glu Leu
    930                 935                 940

Leu Ala Ala Cys Phe Ala Arg Ser Arg Ser Gly Ala Lys Leu Ile Gly
945                 950                 955                 960

Thr Asp Asn Ser Val Val Leu Ser Arg Lys Tyr Thr Ser Phe Pro Trp
                965                 970                 975

Leu Leu Gly Cys Ala Ala Asn Trp Ile Leu Arg Gly Thr Ser Phe Val
            980                 985                 990

Tyr Val Pro Ser Ala Leu Asn Pro Ala Asp Asp Pro Ser Arg Gly Arg
        995                 1000                1005

Leu Gly Leu Tyr Arg Pro Leu Leu His Leu Pro Phe Arg Pro Thr Thr
    1010                1015                1020

Gly Arg Thr Ser Leu Tyr Ala Val Ser Pro Ser Val Pro Ser His Leu
1025                1030                1035                1040

Pro Asp Arg Val His Phe Ala Ser Pro Leu His Val Ala Trp Arg Pro
                1045                1050                1055

Pro

<210> SEQ ID NO 2
<211> LENGTH: 1057
<212> TYPE: PRT
<213> ORGANISM: Artificial Sequence
<220> FEATURE:
<223> OTHER INFORMATION: Synthetic sequence 1_GL_epi

<400> SEQUENCE: 2

Asp Ile Asp Pro Tyr Lys Glu Phe Gly Ala Ser Val Glu Leu Leu Ser
1               5                   10                  15

Phe Leu Pro Ser Asp Phe Phe Pro Ser Val Arg Asp Leu Leu Asp Thr
            20                  25                  30

Ala Ser Ala Leu Tyr Arg Glu Ala Leu Glu Ser Pro Glu His Cys Ser
        35                  40                  45

Pro His His Thr Ala Leu Arg Gln Ala Ile Leu Cys Trp Gly Glu Leu
    50                  55                  60

Met Asn Leu Ala Thr Trp Val Gly Ser Asn Leu Glu Asp Pro Ala Ser
65                  70                  75                  80

Arg Glu Leu Val Val Ser Tyr Val Asn Val Asn Met Gly Leu Lys Ile
                85                  90                  95

Arg Gln Leu Leu Trp Phe His Ile Ser Cys Leu Thr Phe Gly Arg Glu

-continued

```
                100                 105                 110
Thr Val Leu Glu Tyr Leu Val Ser Phe Gly Val Trp Ile Arg Thr Pro
            115                 120                 125
Pro Ala Tyr Arg Pro Pro Asn Ala Pro Ile Leu Ser Thr Leu Pro Glu
            130                 135                 140
Thr Thr Val Val Arg Arg Gly Arg Ser Pro Arg Arg Thr Pro
145                 150                 155                 160
Ser Pro Arg Arg Arg Ser Gln Ser Pro Arg Arg Arg Ser Gln
            165                 170                 175
Ser Arg Glu Ser Gln Cys Met Gly Gly Trp Ser Ser Lys Pro Arg Lys
                180                 185                 190
Gly Met Gly Thr Asn Leu Ser Val Pro Asn Pro Leu Gly Phe Phe Pro
            195                 200                 205
Asp His Gln Leu Asp Pro Ala Phe Gly Ala Asn Ser Asn Asn Pro Asp
            210                 215                 220
Trp Asp Phe Asn Pro Asn Lys Asp His Trp Pro Glu Ala Asn Gln Val
225                 230                 235                 240
Gly Ala Gly Ala Phe Gly Pro Gly Phe Thr Pro Pro His Gly Gly Leu
                245                 250                 255
Leu Gly Trp Ser Pro Gln Ala Gln Gly Ile Leu Thr Thr Val Pro Ala
                260                 265                 270
Ala Pro Pro Pro Ala Ser Thr Asn Arg Gln Ser Gly Arg Gln Pro Thr
            275                 280                 285
Pro Leu Ser Pro Pro Leu Arg Asp Thr His Pro Gln Ala Met Gln Trp
            290                 295                 300
Asn Ser Thr Thr Phe His Gln Thr Leu Gln Asp Pro Arg Val Arg Gly
305                 310                 315                 320
Leu Tyr Phe Pro Ala Gly Gly Ser Ser Gly Thr Val Asn Pro Val
                325                 330                 335
Pro Thr Thr Ala Ser Pro Ile Ser Ser Ile Phe Ser Arg Ile Gly Asp
            340                 345                 350
Pro Ala Pro Asn Met Glu Asn Ile Thr Ser Gly Phe Leu Gly Pro Leu
            355                 360                 365
Leu Val Leu Gln Ala Gly Phe Phe Leu Leu Thr Arg Ile Leu Thr Ile
            370                 375                 380
Pro Gln Ser Leu Asp Ser Trp Trp Thr Ser Leu Asn Phe Leu Gly Gly
385                 390                 395                 400
Thr Pro Val Cys Leu Gly Gln Asn Ser Gln Ser Pro Thr Ser Asn His
                405                 410                 415
Ser Pro Thr Ser Cys Pro Pro Ile Cys Pro Gly Tyr Arg Trp Met Cys
            420                 425                 430
Leu Arg Arg Phe Ile Ile Phe Leu Phe Ile Leu Leu Leu Cys Leu Ile
            435                 440                 445
Phe Leu Leu Val Leu Leu Asp Tyr Gln Gly Met Leu Pro Val Cys Pro
            450                 455                 460
Leu Ile Pro Gly Ser Ser Thr Thr Ser Thr Gly Pro Cys Lys Thr Cys
465                 470                 475                 480
Thr Thr Pro Ala Gln Gly Thr Ser Met Phe Pro Ser Cys Cys Cys Thr
                485                 490                 495
Lys Pro Ser Asp Gly Asn Cys Thr Cys Ile Pro Ile Pro Ser Ser Trp
            500                 505                 510
Ala Phe Ala Lys Phe Leu Trp Glu Trp Ala Ser Val Arg Phe Ser Trp
            515                 520                 525
```

```
Leu Ser Leu Leu Val Pro Phe Val Gln Trp Phe Val Gly Leu Ser Pro
            530                 535                 540

Thr Val Trp Leu Ser Val Ile Trp Met Met Trp Tyr Trp Gly Pro Ser
545                 550                 555                 560

Leu Tyr Asn Ile Leu Ser Pro Phe Leu Pro Leu Leu Pro Ile Phe Phe
                565                 570                 575

Cys Leu Trp Val Tyr Ile Val Thr Gly Gly Val Phe Leu Val Asp Lys
                580                 585                 590

Asn Pro His Asn Thr Thr Glu Ser Arg Leu Val Val Asp Phe Ser Gln
            595                 600                 605

Phe Ser Arg Gly Asn Thr Arg Val Ser Trp Pro Lys Phe Ala Val Pro
            610                 615                 620

Asn Leu Gln Ser Leu Thr Asn Leu Leu Ser Ser Asn Leu Ser Trp Leu
625                 630                 635                 640

Ser Leu Asp Val Ser Ala Ala Phe Tyr His Leu Pro Leu His Pro Ala
                645                 650                 655

Ala Met Pro His Leu Leu Val Gly Ser Ser Gly Leu Ser Arg Tyr Val
            660                 665                 670

Ala Arg Leu Ser Ser Asn Ser Arg Ile Phe Asn His Gln His Gly Thr
            675                 680                 685

Met Gln Asn Leu His Asp Ser Cys Ser Arg Asn Leu Tyr Val Ser Leu
            690                 695                 700

Leu Leu Leu Tyr Lys Thr Phe Gly Arg Lys Leu His Leu Tyr Ser His
705                 710                 715                 720

Pro Ile Ile Leu Gly Phe Arg Lys Ile Pro Met Gly Val Gly Leu Ser
                725                 730                 735

Pro Phe Leu Leu Ala Gln Phe Thr Ser Ala Ile Cys Ser Val Val Arg
            740                 745                 750

Arg Ala Phe Pro His Cys Leu Ala Phe Ser Tyr Met Asp Asp Val Val
            755                 760                 765

Leu Gly Ala Lys Ser Val Gln His Leu Glu Ser Leu Tyr Thr Ala Val
            770                 775                 780

Thr Asn Phe Leu Leu Ser Leu Gly Ile His Leu Asn Pro Asn Lys Thr
785                 790                 795                 800

Lys Arg Trp Gly Tyr Ser Leu Asn Phe Met Gly Tyr Val Ile Gly Ser
                805                 810                 815

Trp Gly Thr Leu Pro Gln Glu His Ile Val Gln Lys Ile Lys Gln Cys
            820                 825                 830

Phe Arg Lys Leu Pro Val Asn Arg Pro Ile Asp Trp Lys Val Cys Gln
            835                 840                 845

Arg Ile Val Gly Leu Leu Gly Phe Ala Ala Pro Phe Thr Gln Cys Gly
850                 855                 860

Tyr Pro Ala Leu Met Pro Leu Tyr Ala Cys Ile Gln Ser Lys Gln Ala
865                 870                 875                 880

Phe Thr Phe Ser Pro Thr Tyr Lys Ala Phe Leu Cys Lys Gln Tyr Leu
                885                 890                 895

Asn Leu Tyr Pro Val Ala Arg Gln Arg Pro Gly Leu Cys Gln Val Phe
                900                 905                 910

Ala Asp Ala Thr Pro Thr Gly Trp Gly Leu Ala Ile Gly His Gln Arg
            915                 920                 925

Met Arg Gly Thr Phe Val Ala Pro Leu Pro Ile His Thr Ala Glu Leu
930                 935                 940
```

```
Leu Ala Ala Cys Phe Ala Arg Ser Arg Ser Gly Ala Lys Leu Ile Gly
945                 950                 955                 960

Thr Asp Asn Ser Val Val Leu Ser Arg Lys Tyr Thr Ser Phe Pro Trp
                965                 970                 975

Leu Leu Gly Cys Ala Ala Asn Trp Ile Leu Arg Gly Thr Ser Phe Val
            980                 985                 990

Tyr Val Pro Ser Ala Leu Asn Pro Ala Asp Pro Ser Arg Gly Arg
        995                1000                1005

Leu Gly Leu Tyr Arg Pro Leu Arg Leu Pro Phe Arg Pro Thr Thr
    1010                1015                1020

Gly Arg Thr Ser Leu Tyr Ala Asp Ser Pro Ser Val Pro Ser His Leu
1025                1030                1035                1040

Pro Asp Arg Val His Phe Ala Ser Pro Leu His Val Ala Trp Arg Pro
                1045                1050                1055

Pro

<210> SEQ ID NO 3
<211> LENGTH: 1057
<212> TYPE: PRT
<213> ORGANISM: Artificial Sequence
<220> FEATURE:
<223> OTHER INFORMATION: Synthetic sequence 2_CH_epi (a)

<400> SEQUENCE: 3

Asp Ile Asp Pro Tyr Lys Glu Phe Gly Ala Ser Val Glu Leu Leu Ser
1               5                   10                  15

Phe Leu Pro Ser Asp Phe Phe Pro Ser Ile Arg Asp Leu Leu Asp Thr
            20                  25                  30

Ala Ser Ala Leu Tyr Arg Glu Ala Leu Glu Ser Pro Glu His Cys Ser
        35                  40                  45

Pro His His Thr Ala Leu Arg Gln Ala Ile Leu Cys Trp Gly Glu Leu
    50                  55                  60

Met Asn Leu Ala Thr Trp Val Gly Ser Asn Leu Glu Asp Pro Ala Ser
65                  70                  75                  80

Arg Glu Leu Val Val Ser Tyr Val Asn Val Asn Met Gly Leu Lys Ile
                85                  90                  95

Arg Gln Leu Leu Trp Phe His Ile Ser Cys Leu Thr Phe Gly Arg Glu
            100                 105                 110

Thr Val Leu Glu Tyr Leu Val Ser Phe Gly Val Trp Ile Arg Thr Pro
        115                 120                 125

Pro Ala Tyr Arg Pro Pro Asn Ala Pro Ile Leu Ser Thr Leu Pro Glu
    130                 135                 140

Thr Thr Val Val Arg Arg Arg Gly Arg Ser Pro Arg Arg Arg Thr Pro
145                 150                 155                 160

Ser Pro Arg Arg Arg Arg Ser Gln Ser Pro Arg Arg Arg Arg Ser Gln
                165                 170                 175

Ser Arg Glu Ser Gln Cys Met Gly Gly Trp Ser Ser Lys Pro Arg Gln
            180                 185                 190

Gly Met Gly Thr Asn Leu Ser Val Pro Asn Pro Leu Gly Phe Phe Pro
        195                 200                 205

Asp His Gln Leu Asp Pro Ala Phe Gly Ala Asn Ser Asn Asn Pro Asp
    210                 215                 220

Trp Asp Phe Asn Pro Asn Lys Asp His Trp Pro Glu Ala Asn Gln Val
225                 230                 235                 240

Gly Ala Gly Ala Phe Gly Pro Gly Phe Thr Pro Pro His Gly Gly Leu
```

```
            245                 250                 255
Leu Gly Trp Ser Pro Gln Ala Gln Gly Ile Leu Thr Thr Val Pro Ala
            260                 265                 270

Ala Pro Pro Ala Ser Thr Asn Arg Gln Ser Gly Arg Gln Pro Thr
            275                 280                 285

Pro Ile Ser Pro Pro Leu Arg Asp Ser His Pro Gln Ala Met Gln Trp
            290                 295                 300

Asn Ser Thr Thr Phe His Gln Ala Leu Leu Asp Pro Arg Val Arg Gly
305                         310                 315                 320

Leu Tyr Phe Pro Ala Gly Gly Ser Ser Gly Thr Val Asn Pro Val
                325                 330                 335

Pro Thr Thr Ala Ser Pro Ile Ser Ser Ile Phe Ser Arg Thr Gly Asp
                340                 345                 350

Pro Ala Pro Asn Met Glu Asn Thr Thr Ser Gly Phe Leu Gly Pro Leu
                355                 360                 365

Leu Val Leu Gln Ala Gly Phe Phe Leu Leu Thr Arg Ile Leu Thr Ile
            370                 375                 380

Pro Gln Ser Leu Asp Ser Trp Trp Thr Ser Leu Asn Phe Leu Gly Gly
385                 390                 395                 400

Ala Pro Thr Cys Pro Gly Gln Asn Ser Gln Ser Pro Thr Ser Asn His
                405                 410                 415

Ser Pro Thr Ser Cys Pro Pro Ile Cys Pro Gly Tyr Arg Trp Met Cys
            420                 425                 430

Leu Arg Arg Phe Ile Ile Phe Leu Phe Ile Leu Leu Leu Cys Leu Ile
                435                 440                 445

Phe Leu Leu Val Leu Leu Asp Tyr Gln Gly Met Leu Pro Val Cys Pro
450                 455                 460

Leu Leu Pro Gly Thr Ser Thr Thr Ser Thr Gly Pro Cys Lys Thr Cys
465                 470                 475                 480

Thr Ile Pro Ala Gln Gly Thr Ser Met Phe Pro Ser Cys Cys Cys Thr
                485                 490                 495

Lys Pro Ser Asp Gly Asn Cys Thr Cys Ile Pro Ile Pro Ser Ser Trp
            500                 505                 510

Ala Phe Ala Arg Phe Leu Trp Glu Trp Ala Ser Val Arg Phe Ser Trp
            515                 520                 525

Leu Ser Leu Leu Val Pro Phe Val Gln Trp Phe Val Gly Leu Ser Pro
            530                 535                 540

Thr Val Trp Leu Ser Val Ile Trp Met Met Trp Tyr Trp Gly Pro Ser
545                 550                 555                 560

Leu Tyr Asn Ile Leu Ser Pro Phe Leu Pro Leu Leu Pro Ile Phe Phe
                565                 570                 575

Cys Leu Trp Val Tyr Ile Val Thr Gly Gly Val Phe Leu Val Asp Lys
                580                 585                 590

Asn Pro His Asn Thr Thr Glu Ser Arg Leu Val Val Asp Phe Ser Gln
                595                 600                 605

Phe Ser Arg Gly Ser Thr His Val Ser Trp Pro Lys Phe Ala Val Pro
            610                 615                 620

Asn Leu Gln Ser Leu Thr Asn Leu Leu Ser Asn Leu Ser Trp Leu
625                 630                 635                 640

Ser Leu Asp Val Ser Ala Ala Phe Tyr His Ile Pro Leu His Pro Ala
                645                 650                 655

Ala Met Pro His Leu Leu Val Gly Ser Ser Gly Leu Pro Arg Tyr Val
                660                 665                 670
```

```
Ala Arg Leu Ser Ser Thr Ser Arg Asn Ile Asn Tyr Gln His Gly Thr
            675                 680                 685

Met Gln Asp Leu His Asp Ser Cys Ser Arg Asn Leu Tyr Val Ser Leu
    690                 695                 700

Leu Leu Leu Tyr Lys Thr Phe Gly Arg Lys Leu His Leu Tyr Ser His
705                 710                 715                 720

Pro Ile Ile Leu Gly Phe Arg Lys Ile Pro Met Gly Val Gly Leu Ser
                725                 730                 735

Pro Phe Leu Leu Ala Gln Phe Thr Ser Ala Ile Cys Ser Val Val Arg
            740                 745                 750

Arg Ala Phe Pro His Cys Leu Ala Phe Ser Tyr Met Asp Asp Val Val
        755                 760                 765

Leu Gly Ala Lys Ser Val Gln His Leu Glu Ser Leu Phe Thr Ser Ile
    770                 775                 780

Thr Asn Phe Leu Leu Ser Leu Gly Ile His Leu Asn Pro Asn Lys Thr
785                 790                 795                 800

Lys Arg Trp Gly Tyr Ser Leu Asn Phe Met Gly Tyr Val Ile Gly Ser
                805                 810                 815

Trp Gly Thr Leu Pro Gln Glu His Ile Val Leu Lys Ile Lys Gln Cys
            820                 825                 830

Phe Arg Lys Leu Pro Val Asn Arg Pro Ile Asp Trp Lys Val Cys Gln
        835                 840                 845

Arg Ile Val Gly Leu Leu Gly Phe Ala Ala Pro Phe Thr Gln Cys Gly
    850                 855                 860

Tyr Pro Ala Leu Met Pro Leu Tyr Ala Cys Ile Gln Ser Lys Gln Ala
865                 870                 875                 880

Phe Thr Phe Ser Pro Thr Tyr Lys Ala Phe Leu Cys Lys Gln Tyr Leu
                885                 890                 895

Asn Leu Tyr Pro Val Ala Arg Gln Arg Ser Gly Leu Cys Gln Val Phe
            900                 905                 910

Ala Asp Ala Thr Pro Thr Gly Trp Gly Leu Ala Ile Gly His Arg Arg
        915                 920                 925

Met Arg Gly Thr Phe Val Ala Pro Leu Pro Ile His Thr Ala Glu Leu
    930                 935                 940

Leu Ala Ala Cys Phe Ala Arg Ser Arg Ser Gly Ala Lys Leu Ile Gly
945                 950                 955                 960

Thr Asp Asn Ser Val Val Leu Ser Arg Lys Tyr Thr Ser Phe Pro Trp
                965                 970                 975

Leu Leu Gly Cys Ala Ala Asn Trp Ile Leu Arg Gly Thr Ser Phe Val
            980                 985                 990

Tyr Val Pro Ser Ala Leu Asn Pro Ala Asp Asp Pro Ser Arg Gly Arg
        995                 1000                1005

Leu Gly Leu Tyr Arg Pro Leu Leu His Leu Pro Phe Arg Pro Thr Thr
    1010                1015                1020

Gly Arg Thr Ser Leu Tyr Ala Val Ser Pro Ser Val Pro Ser His Leu
1025                1030                1035                1040

Pro Asp Arg Val His Phe Ala Ser Pro Leu His Val Ala Trp Arg Pro
                1045                1050                1055

Pro

<210> SEQ ID NO 4
<211> LENGTH: 1057
<212> TYPE: PRT
```

<213> ORGANISM: Artificial Sequence
<220> FEATURE:
<223> OTHER INFORMATION: Synthetic sequence 2_CH_epi (b)

<400> SEQUENCE: 4

```
Asp Ile Asp Thr Tyr Lys Glu Phe Gly Ala Ser Val Glu Leu Leu Ser
1               5                   10                  15

Phe Leu Pro Ser Asp Phe Pro Ser Val Arg Asp Leu Leu Asp Thr
            20                  25                  30

Ala Ser Ala Leu Tyr Arg Glu Ala Leu Glu Ser Pro Glu His Cys Ser
        35                  40                  45

Pro His His Thr Ala Leu Arg Gln Ala Ile Val Cys Trp Gly Glu Leu
    50                  55                  60

Met Asn Leu Ala Thr Trp Val Gly Ser Asn Leu Glu Asp Pro Ala Ser
65                  70                  75                  80

Arg Glu Leu Val Val Gly Tyr Val Asn Val Asn Met Gly Leu Lys Leu
                85                  90                  95

Arg Gln Leu Leu Trp Phe His Ile Ser Cys Leu Thr Phe Gly Arg Glu
            100                 105                 110

Thr Val Ile Glu Tyr Leu Val Ser Phe Gly Val Trp Ile Arg Thr Pro
        115                 120                 125

Thr Ala Tyr Arg Pro Pro Asn Ala Pro Ile Leu Ser Thr Leu Pro Glu
    130                 135                 140

Thr Thr Val Val Arg Arg Arg Cys Arg Ser Pro Arg Arg Arg Thr Pro
145                 150                 155                 160

Ser Pro Arg Arg Arg Ser Gln Ser Pro Arg Arg Arg Ser Lys
                165                 170                 175

Ser Arg Glu Ser Gln Cys Met Gly Gly Trp Ser Ser Lys Pro Arg Lys
            180                 185                 190

Gly Met Gly Thr Asn Leu Ser Val Pro Asn Pro Leu Gly Phe Phe Pro
        195                 200                 205

Asp His Gln Leu Asp Pro Ala Phe Lys Ala Asn Ser Glu Asn Pro Asp
    210                 215                 220

Trp Asp Leu Asn Pro His Lys Asp Asn Trp Pro Asp Ala Asn Lys Val
225                 230                 235                 240

Gly Val Gly Ala Phe Gly Pro Gly Phe Thr Pro Pro His Gly Ser Leu
                245                 250                 255

Leu Gly Trp Ser Pro Gln Ala Gln Gly Leu Leu Thr Thr Val Pro Val
            260                 265                 270

Ala Pro Pro Pro Ala Ser Thr Asn Arg Gln Ser Gly Arg Gln Pro Thr
        275                 280                 285

Pro Leu Ser Pro Pro Leu Arg Asp Thr His Pro Gln Ala Met Gln Trp
    290                 295                 300

Asn Ser Thr Thr Phe His Gln Thr Leu Gln Asp Pro Arg Val Arg Ala
305                 310                 315                 320

Leu Tyr Phe Pro Ala Gly Gly Ser Ser Gly Thr Val Ser Pro Ala
                325                 330                 335

Gln Asn Thr Val Ser Ala Ile Ser Ser Ile Leu Ser Lys Thr Gly Asp
            340                 345                 350

Pro Val Pro Asn Met Glu Asn Ile Ala Ser Gly Leu Leu Gly Pro Leu
        355                 360                 365

Leu Val Leu Gln Ala Gly Phe Phe Leu Leu Thr Lys Ile Leu Thr Ile
    370                 375                 380

Pro Gln Ser Leu Asp Ser Trp Trp Thr Ser Leu Asn Phe Leu Gly Gly
```

```
                385                 390                 395                 400
Thr Pro Val Cys Leu Gly Gln Asn Ser Gln Ser Gln Ile Ser Ser His
                    405                 410                 415

Ser Pro Thr Cys Cys Pro Pro Ile Cys Pro Gly Tyr Arg Trp Met Cys
                    420                 425                 430

Leu Arg Arg Phe Ile Ile Phe Leu Cys Ile Leu Leu Leu Cys Leu Ile
                    435                 440                 445

Phe Leu Leu Val Leu Val Asp Tyr Gln Gly Met Leu Pro Val Cys Pro
450                 455                 460

Leu Ile Pro Gly Ser Ser Thr Thr Ser Thr Gly Pro Cys Lys Thr Cys
465                 470                 475                 480

Thr Thr Pro Ala Gln Gly Thr Ser Met Tyr Pro Ser Cys Cys Cys Thr
                    485                 490                 495

Lys Pro Thr Asp Gly Asn Cys Thr Cys Ile Pro Ile Pro Ser Ser Trp
                500                 505                 510

Ala Phe Ala Lys Tyr Leu Trp Glu Trp Ala Ser Val Arg Phe Ser Trp
                515                 520                 525

Leu Ser Leu Leu Val Pro Phe Val Gln Trp Phe Val Gly Leu Ser Pro
                530                 535                 540

Thr Val Trp Leu Ser Val Ile Trp Met Met Trp Phe Trp Gly Pro Ser
545                 550                 555                 560

Leu Tyr Asn Ile Leu Ser Pro Phe Met Pro Leu Leu Pro Ile Phe Phe
                565                 570                 575

Cys Leu Trp Val Tyr Ile Val Thr Gly Gly Val Phe Leu Val Asp Lys
                580                 585                 590

Asn Pro His Asn Thr Ala Glu Ser Arg Leu Val Val Asp Phe Ser Gln
                595                 600                 605

Phe Ser Arg Gly Asn Thr Arg Val Ser Trp Pro Lys Phe Ala Val Pro
                610                 615                 620

Asn Leu Gln Ser Leu Thr Asn Leu Leu Ser Ser Asn Leu Ser Trp Leu
625                 630                 635                 640

Ser Leu Asp Val Ser Ala Ala Phe Tyr His Leu Pro Leu His Pro Ala
                645                 650                 655

Ala Met Pro His Leu Leu Val Gly Ser Ser Gly Leu Ser Arg Tyr Val
                660                 665                 670

Ala Arg Leu Ser Ser Asn Ser Arg Ile Ile Asn Asn Gln His Arg Thr
                675                 680                 685

Met Gln Asn Leu His Asn Ser Cys Ser Arg Asn Leu Tyr Val Ser Leu
                690                 695                 700

Met Leu Leu Tyr Lys Thr Tyr Gly Arg Lys Leu His Leu Tyr Ser His
705                 710                 715                 720

Pro Ile Ile Leu Gly Phe Arg Lys Ile Pro Met Gly Val Gly Leu Ser
                    725                 730                 735

Pro Phe Leu Met Ala Gln Phe Thr Ser Ala Ile Cys Ser Val Val Arg
                    740                 745                 750

Arg Ala Phe Pro His Cys Leu Ala Phe Ser Tyr Ile Asp Asp Val Val
                755                 760                 765

Leu Gly Ala Lys Ser Val Gln His Leu Glu Ser Leu Tyr Ala Ala Val
                770                 775                 780

Thr Asn Phe Leu Leu Ser Leu Gly Ile His Leu Asn Pro His Lys Thr
785                 790                 795                 800

Lys Arg Trp Gly Tyr Ser Leu His Phe Met Gly Tyr Val Ile Gly Cys
                    805                 810                 815
```

```
Trp Gly Thr Leu Pro Gln Glu His Ile Val Gln Lys Ile Lys Met Cys
                820                 825                 830

Phe Arg Lys Leu Pro Val Asn Arg Pro Val Asp Trp Lys Val Cys Gln
            835                 840                 845

Arg Ile Val Gly Leu Leu Gly Phe Ala Ala Pro Phe Thr Gln Cys Gly
        850                 855                 860

Tyr Pro Ala Leu Met Pro Leu Tyr Ala Cys Ile Gln Ala Lys Gln Ala
865                 870                 875                 880

Phe Thr Phe Ser Pro Thr Tyr Lys Ala Phe Leu Ser Lys Gln Tyr Leu
                885                 890                 895

Asn Leu Tyr Pro Val Ala Arg Gln Arg Pro Gly Leu Cys Gln Val Phe
            900                 905                 910

Ala Asp Ala Thr Pro Thr Gly Trp Gly Leu Ala Ile Gly His Gln Arg
        915                 920                 925

Met Arg Gly Thr Phe Val Ser Pro Leu Pro Ile His Thr Ala Glu Leu
    930                 935                 940

Leu Ala Ala Cys Phe Ala Arg Ser Arg Ser Gly Ala Asn Leu Ile Gly
945                 950                 955                 960

Thr Asp Asn Ser Val Val Leu Ser Arg Lys Tyr Thr Ser Phe Pro Trp
                965                 970                 975

Leu Leu Gly Cys Ala Ala Asn Trp Ile Leu Arg Gly Thr Ser Phe Val
            980                 985                 990

Tyr Val Pro Ser Ala Leu Asn Pro Ala Asp Asp Pro Ser Arg Gly Arg
        995                 1000                1005

Leu Gly Leu Tyr Arg Pro Leu Arg Leu Leu Tyr Arg Pro Thr Thr
    1010                1015                1020

Gly Arg Thr Ser Leu Tyr Ala Asp Ser Pro Ser Val Pro Ser His Leu
1025                1030                1035                1040

Pro Val Arg Val His Phe Ala Ser Pro Leu His Val Ala Trp Lys Pro
                1045                1050                1055

Pro

<210> SEQ ID NO 5
<211> LENGTH: 1057
<212> TYPE: PRT
<213> ORGANISM: Artificial Sequence
<220> FEATURE:
<223> OTHER INFORMATION: Synthetic sequence 2_CHGL_epi Epi1

<400> SEQUENCE: 5

Asp Ile Asp Pro Tyr Lys Glu Phe Gly Ala Ser Val Glu Leu Leu Ser
1               5                   10                  15

Phe Leu Pro Ser Asp Phe Phe Pro Ser Ile Arg Asp Leu Leu Asp Thr
                20                  25                  30

Ala Ser Ala Leu Tyr Arg Glu Ala Leu Glu Ser Pro Glu His Cys Ser
            35                  40                  45

Pro His His Thr Ala Leu Arg Gln Ala Ile Leu Cys Trp Gly Glu Leu
        50                  55                  60

Met Asn Leu Ala Thr Trp Val Gly Ser Asn Leu Glu Asp Pro Ala Ser
65                  70                  75                  80

Arg Glu Leu Val Val Ser Tyr Val Asn Val Asn Met Gly Leu Lys Ile
                85                  90                  95

Arg Gln Leu Leu Trp Phe His Ile Ser Cys Leu Thr Phe Gly Arg Glu
            100                 105                 110
```

-continued

```
Thr Val Leu Glu Tyr Leu Val Ser Phe Gly Val Trp Ile Arg Thr Pro
            115                 120                 125

Pro Ala Tyr Arg Pro Pro Asn Ala Pro Ile Leu Ser Thr Leu Pro Glu
            130                 135                 140

Thr Thr Val Val Arg Arg Gly Arg Ser Pro Arg Arg Arg Thr Pro
145                 150                 155                 160

Ser Pro Arg Arg Arg Ser Gln Ser Pro Arg Arg Arg Ser Gln
                165                 170                 175

Ser Arg Glu Ser Gln Cys Met Gly Trp Ser Ser Lys Pro Arg Gln
            180                 185                 190

Gly Met Gly Thr Asn Leu Ser Val Pro Asn Pro Leu Gly Phe Phe Pro
            195                 200                 205

Asp His Gln Leu Asp Pro Ala Phe Gly Ala Asn Ser Asn Pro Asp
            210                 215                 220

Trp Asp Phe Asn Pro Asn Lys Asp His Trp Pro Glu Ala Asn Gln Val
225                 230                 235                 240

Gly Ala Gly Ala Phe Gly Pro Gly Phe Thr Pro Pro His Gly Gly Leu
            245                 250                 255

Leu Gly Trp Ser Pro Gln Ala Gln Gly Ile Leu Thr Thr Val Pro Ala
            260                 265                 270

Ala Pro Pro Pro Ala Ser Thr Asn Arg Gln Ser Gly Arg Gln Pro Thr
            275                 280                 285

Pro Ile Ser Pro Pro Leu Arg Asp Ser His Pro Gln Ala Met Gln Trp
            290                 295                 300

Asn Ser Thr Thr Phe His Gln Ala Leu Leu Asp Pro Arg Val Arg Gly
305                 310                 315                 320

Leu Tyr Phe Pro Ala Gly Gly Ser Ser Ser Gly Thr Val Asn Pro Val
            325                 330                 335

Pro Thr Thr Ala Ser Pro Ile Ser Ser Ile Phe Ser Arg Thr Gly Asp
            340                 345                 350

Pro Ala Pro Asn Met Glu Asn Thr Thr Ser Gly Phe Leu Gly Pro Leu
            355                 360                 365

Leu Val Leu Gln Ala Gly Phe Phe Leu Leu Thr Arg Ile Leu Thr Ile
            370                 375                 380

Pro Gln Ser Leu Asp Ser Trp Trp Thr Ser Leu Asn Phe Leu Gly Gly
385                 390                 395                 400

Ala Pro Thr Cys Pro Gly Gln Asn Ser Gln Ser Pro Thr Ser Asn His
            405                 410                 415

Ser Pro Thr Ser Cys Pro Pro Ile Cys Pro Gly Tyr Arg Trp Met Cys
            420                 425                 430

Leu Arg Arg Phe Ile Ile Phe Leu Phe Ile Leu Leu Leu Cys Leu Ile
            435                 440                 445

Phe Leu Leu Val Leu Leu Asp Tyr Gln Gly Met Leu Pro Val Cys Pro
            450                 455                 460

Leu Leu Pro Gly Thr Ser Thr Thr Ser Thr Gly Pro Cys Lys Thr Cys
465                 470                 475                 480

Thr Ile Pro Ala Gln Gly Thr Ser Met Phe Pro Ser Cys Cys Cys Thr
            485                 490                 495

Lys Pro Ser Asp Gly Asn Cys Thr Cys Ile Pro Ile Pro Ser Ser Trp
            500                 505                 510

Ala Phe Ala Arg Phe Leu Trp Glu Trp Ala Ser Val Arg Phe Ser Trp
            515                 520                 525

Leu Ser Leu Leu Val Pro Phe Val Gln Trp Phe Val Gly Leu Ser Pro
```

```
                530                 535                 540
Thr Val Trp Leu Ser Val Ile Trp Met Met Trp Tyr Trp Gly Pro Ser
545                 550                 555                 560

Leu Tyr Asn Ile Leu Ser Pro Phe Leu Pro Leu Pro Ile Phe Phe
                565                 570                 575

Cys Leu Trp Val Tyr Ile Val Thr Gly Val Phe Leu Val Asp Lys
                580                 585                 590

Asn Pro His Asn Thr Thr Glu Ser Arg Leu Val Val Asp Phe Ser Gln
                595                 600                 605

Phe Ser Arg Gly Ser Thr His Val Ser Trp Pro Lys Phe Ala Val Pro
                610                 615                 620

Asn Leu Gln Ser Leu Thr Asn Leu Leu Ser Ser Asn Leu Ser Trp Leu
625                 630                 635                 640

Ser Leu Asp Val Ser Ala Ala Phe Tyr His Ile Pro Leu His Pro Ala
                645                 650                 655

Ala Met Pro His Leu Leu Val Gly Ser Ser Gly Leu Pro Arg Tyr Val
                660                 665                 670

Ala Arg Leu Ser Ser Thr Ser Arg Asn Ile Asn Tyr Gln His Gly Thr
                675                 680                 685

Met Gln Asp Leu His Asp Ser Cys Ser Arg Asn Leu Tyr Val Ser Leu
                690                 695                 700

Leu Leu Leu Tyr Lys Thr Phe Gly Arg Lys Leu His Leu Tyr Ser His
705                 710                 715                 720

Pro Ile Ile Leu Gly Phe Arg Lys Ile Pro Met Gly Val Gly Leu Ser
                725                 730                 735

Pro Phe Leu Leu Ala Gln Phe Thr Ser Ala Ile Cys Ser Val Val Arg
                740                 745                 750

Arg Ala Phe Pro His Cys Leu Ala Phe Ser Tyr Met Asp Asp Val Val
                755                 760                 765

Leu Gly Ala Lys Ser Val Gln His Leu Glu Ser Leu Phe Thr Ser Ile
                770                 775                 780

Thr Asn Phe Leu Leu Ser Leu Gly Ile His Leu Asn Pro Asn Lys Thr
785                 790                 795                 800

Lys Arg Trp Gly Tyr Ser Leu Asn Phe Met Gly Tyr Val Ile Gly Ser
                805                 810                 815

Trp Gly Thr Leu Pro Gln Glu His Ile Val Leu Lys Ile Lys Gln Cys
                820                 825                 830

Phe Arg Lys Leu Pro Val Asn Arg Pro Ile Asp Trp Lys Val Cys Gln
                835                 840                 845

Arg Ile Val Gly Leu Leu Gly Phe Ala Ala Pro Phe Thr Gln Cys Gly
850                 855                 860

Tyr Pro Ala Leu Met Pro Leu Tyr Ala Cys Ile Gln Ser Lys Gln Ala
865                 870                 875                 880

Phe Thr Phe Ser Pro Thr Tyr Lys Ala Phe Leu Cys Lys Gln Tyr Leu
                885                 890                 895

Asn Leu Tyr Pro Val Ala Arg Gln Arg Ser Gly Leu Cys Gln Val Phe
                900                 905                 910

Ala Asp Ala Thr Pro Thr Gly Trp Gly Leu Ala Ile Gly His Arg Arg
                915                 920                 925

Met Arg Gly Thr Phe Val Ala Pro Leu Pro Ile His Thr Ala Glu Leu
                930                 935                 940

Leu Ala Ala Cys Phe Ala Arg Ser Arg Ser Gly Ala Lys Leu Ile Gly
945                 950                 955                 960
```

```
Thr Asp Asn Ser Val Val Leu Ser Arg Lys Tyr Thr Ser Phe Pro Trp
                965                 970                 975

Leu Leu Gly Cys Ala Ala Asn Trp Ile Leu Arg Gly Thr Ser Phe Val
            980                 985                 990

Tyr Val Pro Ser Ala Leu Asn Pro Ala Asp Asp Pro Ser Arg Gly Arg
        995                 1000                1005

Leu Gly Leu Tyr Arg Pro Leu Leu His Leu Pro Phe Arg Pro Thr Thr
    1010                1015                1020

Gly Arg Thr Ser Leu Tyr Ala Val Ser Pro Ser Val Pro Ser His Leu
1025                1030                1035                1040

Pro Asp Arg Val His Phe Ala Ser Pro Leu His Val Ala Trp Arg Pro
                1045                1050                1055

Pro

<210> SEQ ID NO 6
<211> LENGTH: 1048
<212> TYPE: PRT
<213> ORGANISM: Artificial Sequence
<220> FEATURE:
<223> OTHER INFORMATION: Synthetic sequence 2_CHGL_epi Epi2

<400> SEQUENCE: 6

Asp Ile Asp Pro Tyr Lys Glu Phe Gly Ala Thr Val Glu Leu Leu Ser
1               5                   10                  15

Phe Leu Pro Ser Asp Phe Phe Pro Ser Val Arg Asp Leu Leu Asp Thr
            20                  25                  30

Ala Ser Ala Leu Tyr Arg Asp Ala Leu Glu Ser Pro Glu His Cys Thr
        35                  40                  45

Pro His His Thr Ala Leu Arg Gln Ala Ile Leu Cys Trp Gly Glu Leu
    50                  55                  60

Met Thr Leu Ala Thr Trp Val Gly Val Asn Leu Glu Asp Pro Ala Ser
65                  70                  75                  80

Arg Asp Leu Val Val Ser Tyr Val Asn Thr Asn Met Gly Leu Lys Phe
                85                  90                  95

Arg Gln Leu Leu Trp Phe His Ile Ser Cys Leu Thr Phe Gly Arg Glu
            100                 105                 110

Thr Val Ile Glu Tyr Leu Val Ser Phe Gly Val Trp Ile Arg Thr Pro
        115                 120                 125

Thr Ala Tyr Arg Pro Pro Asn Ala Pro Ile Leu Ser Thr Leu Pro Glu
    130                 135                 140

Thr Thr Val Val Arg Arg Arg Asp Arg Gly Arg Ser Pro Arg Arg Arg
145                 150                 155                 160

Thr Pro Ser Pro Arg Arg Arg Ser Gln Ser Pro Arg Arg Arg Arg
                165                 170                 175

Ser Lys Ser Arg Glu Ser Gln Cys Met Gly Gln Asn Leu Ser Thr Ser
            180                 185                 190

Asn Pro Leu Gly Phe Phe Pro Asp His Gln Leu Asp Pro Ala Phe Arg
        195                 200                 205

Ala Asn Thr Ala Asn Pro Asp Trp Asp Phe Asn Pro Asn Lys Asp Thr
    210                 215                 220

Trp Pro Asp Ala Asn Lys Val Gly Ala Gly Ala Phe Gly Leu Gly Phe
225                 230                 235                 240

Thr Pro Pro His Gly Gly Val Leu Gly Trp Ser Pro Gln Ala Gln Gly
                245                 250                 255
```

-continued

```
Ile Leu Gln Thr Leu Pro Ala Asn Pro Pro Ala Ser Thr Asn Arg
            260                 265                 270

Gln Ser Gly Arg Gln Pro Thr Pro Leu Ser Pro Leu Arg Asp Thr
        275                 280                 285

His Pro Gln Ala Met Gln Trp Asn Ser Thr Thr Phe His Gln Thr Leu
    290                 295                 300

Gln Asp Pro Arg Val Arg Ala Leu Tyr Phe Pro Ala Gly Ser Ser
305                 310                 315                 320

Ser Gly Thr Val Ser Pro Ala Gln Asn Thr Val Ser Ala Ile Ser Ser
                325                 330                 335

Ile Leu Ser Lys Thr Gly Asp Pro Val Pro Asn Met Glu Asn Ile Ala
            340                 345                 350

Ser Gly Leu Leu Gly Pro Leu Leu Val Leu Gln Ala Gly Phe Phe Leu
        355                 360                 365

Leu Thr Lys Ile Leu Thr Ile Pro Gln Ser Leu Asp Ser Trp Trp Thr
    370                 375                 380

Ser Leu Asn Phe Leu Gly Gly Thr Thr Val Cys Leu Gly Gln Asn Ser
385                 390                 395                 400

Gln Ser Pro Thr Ser Asn His Ser Pro Thr Ser Cys Pro Pro Thr Cys
                405                 410                 415

Pro Gly Tyr Arg Trp Met Cys Leu Arg Arg Phe Ile Ile Phe Leu Cys
            420                 425                 430

Ile Leu Leu Leu Cys Leu Ile Phe Leu Leu Val Leu Leu Asp Tyr Gln
        435                 440                 445

Gly Met Leu Pro Val Cys Pro Leu Ile Pro Gly Ser Ser Thr Thr Ser
450                 455                 460

Thr Gly Pro Cys Arg Thr Cys Thr Thr Pro Ala Gln Gly Thr Ser Met
465                 470                 475                 480

Tyr Pro Ser Cys Cys Cys Thr Lys Pro Thr Asp Gly Asn Cys Thr Cys
                485                 490                 495

Ile Pro Ile Pro Ser Ser Trp Ala Phe Gly Lys Phe Leu Trp Glu Trp
            500                 505                 510

Ala Ser Ala Arg Phe Ser Trp Leu Ser Leu Leu Val Pro Phe Val Gln
        515                 520                 525

Trp Phe Ala Gly Leu Ser Pro Thr Val Trp Leu Ser Val Ile Trp Met
    530                 535                 540

Met Trp Phe Trp Gly Pro Ser Leu Tyr Asn Ile Leu Ser Pro Phe Ile
545                 550                 555                 560

Pro Leu Leu Pro Ile Phe Cys Tyr Leu Trp Val Ser Ile Val Thr Gly
                565                 570                 575

Gly Val Phe Leu Val Asp Lys Asn Pro His Asn Thr Ala Glu Ser Arg
            580                 585                 590

Leu Val Val Asp Phe Ser Gln Phe Ser Arg Gly Asn Thr Arg Val Ser
        595                 600                 605

Trp Pro Lys Phe Ala Val Pro Asn Leu Gln Ser Leu Thr Asn Leu Leu
    610                 615                 620

Ser Ser Asp Leu Ser Trp Leu Ser Leu Asp Val Ser Ala Ala Phe Tyr
625                 630                 635                 640

His Leu Pro Leu His Pro Ala Ala Met Pro His Leu Leu Val Gly Ser
                645                 650                 655

Ser Gly Leu Ser Arg Tyr Val Ala Arg Leu Ser Ser Asn Ser Arg Ile
            660                 665                 670

Phe Asn His Gln His Gly Thr Met Gln Asn Leu His Asp Ser Cys Ser
```

```
                    675                 680                 685
Arg Asn Leu Tyr Val Ser Leu Met Leu Tyr Lys Thr Tyr Gly Arg
690                 695                 700

Lys Leu His Leu Tyr Ser His Pro Ile Ile Met Gly Phe Arg Lys Ile
705                 710                 715                 720

Pro Met Gly Val Gly Leu Ser Pro Phe Leu Met Ala Gln Phe Thr Ser
                    725                 730                 735

Ala Ile Cys Ser Val Val Arg Arg Ala Phe Pro His Cys Leu Ala Phe
                740                 745                 750

Ser Tyr Met Asp Asp Leu Val Leu Gly Ala Lys Ser Val Gln His Leu
            755                 760                 765

Glu Ser Leu Phe Thr Ala Val Thr Asn Phe Leu Leu Ser Leu Gly Ile
770                 775                 780

His Leu Asn Pro His Lys Thr Lys Arg Trp Gly Tyr Ser Leu His Phe
785                 790                 795                 800

Met Gly Tyr Val Ile Gly Cys Tyr Gly Ser Leu Pro Gln Asp His Ile
                    805                 810                 815

Ile Gln Lys Ile Lys Glu Cys Phe Arg Lys Leu Pro Val Asn Arg Pro
                820                 825                 830

Ile Asp Trp Lys Val Cys Gln Arg Ile Val Gly Leu Leu Gly Phe Ala
            835                 840                 845

Ala Pro Phe Thr Gln Cys Gly Tyr Pro Ala Leu Met Pro Leu Tyr Ala
850                 855                 860

Cys Ile Gln Ala Lys Gln Ala Phe Thr Phe Ser Pro Thr Tyr Lys Ala
865                 870                 875                 880

Phe Leu Ser Lys Gln Tyr Met Asn Leu Tyr Pro Val Ala Arg Gln Arg
                    885                 890                 895

Pro Gly Leu Cys Gln Val Phe Ala Asp Ala Thr Pro Thr Gly Trp Gly
                900                 905                 910

Leu Ala Ile Gly His Gln Arg Met Arg Gly Thr Phe Val Ser Pro Leu
            915                 920                 925

Pro Ile His Thr Ala Glu Leu Leu Ala Ala Cys Phe Ala Arg Ser Arg
930                 935                 940

Ser Gly Ala Asn Ile Leu Gly Thr Asp Asn Ser Val Val Leu Ser Arg
945                 950                 955                 960

Lys Tyr Thr Ser Phe Pro Trp Leu Leu Gly Cys Thr Ala Asn Trp Ile
                    965                 970                 975

Leu Arg Gly Thr Ser Phe Val Tyr Val Pro Ser Ala Leu Asn Pro Ala
                980                 985                 990

Asp Asp Pro Ser Arg Gly Arg Leu Gly Leu Ser Arg Pro Leu Leu Arg
            995                 1000                1005

Leu Pro Phe Arg Pro Thr Thr Gly Arg Thr Ser Leu Tyr Ala Asp Ser
        1010                1015                1020

Pro Ser Val Pro Ser His Leu Pro Val Arg Val His Phe Ala Ser Pro
1025                1030                1035                1040

Leu His Val Ala Trp Lys Pro Pro
                    1045

<210> SEQ ID NO 7
<211> LENGTH: 1063
<212> TYPE: PRT
<213> ORGANISM: Artificial Sequence
<220> FEATURE:
<223> OTHER INFORMATION: Synthetic sequence Epi3
```

-continued

```
<400> SEQUENCE: 7

Met Asp Ile Asp Pro Tyr Lys Glu Phe Gly Ala Ser Val Glu Leu Leu
1               5                   10                  15

Ser Phe Leu Pro Ser Asp Phe Pro Ser Ile Arg Asp Leu Leu Asp
            20                  25                  30

Thr Ala Ser Ala Leu Tyr Arg Glu Ala Leu Glu Ser Pro Glu His Cys
        35                  40                  45

Ser Pro His His Thr Ala Leu Arg Gln Ala Ile Leu Cys Trp Gly Glu
    50                  55                  60

Leu Met Asn Leu Ala Thr Trp Val Gly Ser Asn Leu Glu Asp Pro Ala
65                  70                  75                  80

Ser Arg Glu Leu Val Val Ser Tyr Val Asn Val Asn Met Gly Leu Lys
                85                  90                  95

Ile Arg Gln Leu Leu Trp Phe His Ile Ser Cys Leu Thr Phe Gly Arg
            100                 105                 110

Glu Thr Val Leu Glu Tyr Leu Val Ser Phe Gly Val Trp Ile Arg Thr
        115                 120                 125

Pro Pro Ala Tyr Arg Pro Pro Asn Ala Pro Ile Leu Ser Thr Leu Pro
    130                 135                 140

Glu Thr Thr Val Val Arg Arg Arg Gly Arg Ser Pro Arg Arg Arg Thr
145                 150                 155                 160

Pro Ser Pro Arg Arg Arg Arg Ser Gln Ser Pro Arg Arg Arg Arg Ser
                165                 170                 175

Gln Ser Arg Glu Ser Gln Cys Met Gly Gly Trp Ser Ser Lys Pro Arg
            180                 185                 190

Gln Gly Met Gly Thr Asn Leu Ser Val Pro Asn Pro Leu Gly Phe Phe
        195                 200                 205

Pro Asp His Gln Leu Asp Pro Ala Phe Gly Ala Asn Ser Asn Asn Pro
    210                 215                 220

Asp Trp Asp Phe Asn Pro Asn Lys Asp His Trp Pro Glu Ala Asn Gln
225                 230                 235                 240

Val Gly Ala Gly Ala Phe Gly Pro Gly Phe Thr Pro Pro His Gly Gly
                245                 250                 255

Leu Leu Gly Trp Ser Pro Gln Ala Gln Gly Ile Leu Thr Thr Val Pro
            260                 265                 270

Ala Ala Pro Pro Pro Ala Ser Thr Asn Arg Gln Ser Gly Arg Gln Pro
        275                 280                 285

Thr Pro Ile Ser Pro Pro Leu Arg Asp Ser His Pro Gln Ala Met Gln
    290                 295                 300

Trp Asn Ser Thr Thr Phe His Gln Ala Leu Leu Asp Pro Arg Val Arg
305                 310                 315                 320

Gly Leu Tyr Phe Pro Ala Gly Gly Ser Ser Ser Gly Thr Val Asn Pro
                325                 330                 335

Val Pro Thr Thr Ala Ser Pro Ile Ser Ser Ile Phe Ser Arg Thr Gly
            340                 345                 350

Asp Pro Ala Pro Asn Met Glu Asn Thr Ala Ser Gly Phe Leu Gly Pro
        355                 360                 365

Leu Leu Val Leu Gln Ala Gly Phe Phe Leu Leu Thr Arg Ile Leu Thr
    370                 375                 380

Ile Pro Gln Ser Leu Asp Ser Trp Trp Thr Ser Leu Asn Phe Leu Gly
385                 390                 395                 400

Gly Ala Pro Thr Cys Pro Gly Gln Asn Ser Gln Ser Pro Thr Ser Asn
                405                 410                 415
```

```
His Ser Pro Thr Ser Cys Pro Pro Ile Cys Pro Gly Tyr Arg Trp Met
            420             425             430

Cys Leu Arg Arg Phe Ile Ile Phe Leu Phe Ile Leu Leu Leu Cys Leu
            435             440             445

Ile Phe Leu Leu Val Leu Leu Asp Tyr Gln Gly Met Leu Pro Val Cys
450             455             460

Pro Leu Leu Pro Gly Thr Ser Thr Thr Ser Thr Gly Pro Cys Lys Thr
465             470             475             480

Cys Thr Ile Pro Ala Gln Gly Thr Ser Met Phe Pro Ser Cys Cys Cys
                485             490             495

Thr Lys Pro Ser Asp Gly Asn Cys Thr Cys Ile Pro Ile Pro Ser Ser
            500             505             510

Trp Ala Phe Ala Arg Phe Leu Trp Glu Trp Ala Ser Val Arg Phe Ser
            515             520             525

Trp Leu Ser Leu Leu Val Pro Phe Val Gln Trp Phe Val Gly Leu Ser
            530             535             540

Pro Thr Val Trp Leu Ser Val Ile Trp Met Met Trp Tyr Trp Gly Pro
545             550             555             560

Ser Leu Tyr Asn Ile Leu Ser Pro Phe Leu Pro Leu Leu Pro Ile Phe
                565             570             575

Phe Cys Leu Trp Val Tyr Ile Val Thr Gly Gly Val Phe Leu Val Asp
            580             585             590

Lys Asn Pro His Asn Thr Thr Glu Ser Arg Leu Val Val Asp Phe Ser
            595             600             605

Gln Phe Ser Arg Gly Ser Thr His Val Ser Trp Pro Lys Phe Ala Val
            610             615             620

Pro Asn Leu Gln Ser Leu Thr Asn Leu Leu Ser Ser Asn Leu Ser Trp
625             630             635             640

Leu Ser Leu Asp Val Ser Ala Ala Phe Tyr His Ile Pro Leu His Pro
                645             650             655

Ala Ala Met Pro His Leu Leu Val Gly Ser Ser Gly Leu Pro Arg Tyr
            660             665             670

Val Ala Arg Leu Ser Ser Thr Ser Arg Asn Ile Asn Tyr Gln His Gly
            675             680             685

Thr Met Gln Asp Leu His Asp Ser Cys Ser Arg Asn Leu Tyr Val Ser
            690             695             700

Leu Leu Leu Leu Tyr Lys Thr Phe Gly Arg Lys Leu His Leu Tyr Ser
705             710             715             720

His Pro Ile Ile Leu Gly Phe Arg Lys Ile Pro Met Gly Val Gly Leu
                725             730             735

Ser Pro Phe Leu Leu Ala Gln Phe Thr Ser Ala Ile Cys Ser Val Val
            740             745             750

Arg Arg Ala Phe Pro His Cys Leu Ala Phe Ser Val Val Leu Gly Ala
            755             760             765

Lys Ser Val Gln His Leu Glu Ser Leu Phe Thr Ser Ile Thr Asn Phe
            770             775             780

Leu Leu Ser Leu Gly Ile His Leu Asn Pro Asn Lys Thr Lys Arg Trp
785             790             795             800

Gly Tyr Ser Leu Asn Phe Met Gly Tyr Val Ile Gly Ser Trp Gly Thr
                805             810             815

Leu Pro Gln Glu His Ile Val Leu Lys Ile Lys Gln Cys Phe Arg Lys
            820             825             830
```

```
Leu Pro Val Asn Arg Pro Ile Asp Trp Lys Val Cys Gln Arg Ile Val
                835                 840                 845

Gly Leu Leu Gly Phe Ala Ala Pro Phe Thr Gln Cys Gly Tyr Pro Ala
        850                 855                 860

Leu Met Pro Leu Tyr Ala Cys Ile Gln Ser Lys Gln Ala Phe Thr Phe
865                 870                 875                 880

Ser Pro Thr Tyr Lys Ala Phe Leu Cys Lys Gln Tyr Leu Asn Leu Tyr
                885                 890                 895

Pro Val Ala Arg Gln Arg Ser Gly Leu Cys Gln Val Phe Ala Ala Ala
        900                 905                 910

Thr Pro Thr Gly Trp Gly Leu Ala Ile Gly His Arg Arg Met Arg Gly
        915                 920                 925

Thr Phe Val Ala Pro Leu Pro Ile His Thr Ala Ala Leu Leu Ala Ala
        930                 935                 940

Cys Phe Ala Arg Ser Arg Ser Gly Ala Lys Leu Ile Gly Thr Val Asn
945                 950                 955                 960

Ser Val Val Leu Ser Arg Lys Tyr Thr Ser Phe Pro Trp Leu Leu Gly
                965                 970                 975

Cys Ala Ala Asn Trp Ile Leu Arg Gly Thr Ser Phe Val Tyr Val Pro
                980                 985                 990

Ser Ala Leu Asn Pro Ala Ala Asp Pro Ser Arg Gly Arg Leu Gly Leu
        995                 1000                1005

Tyr Arg Pro Leu Leu His Leu Pro Phe Arg Pro Thr Thr Gly Arg Thr
        1010                1015                1020

Ser Leu Tyr Ala Val Ser Pro Ser Val Pro Ser His Leu Pro Asp Arg
1025                1030                1035                1040

Val His Phe Ala Ser Pro Leu His Val Ala Trp Arg Pro Pro Ile Pro
                1045                1050                1055

Asn Pro Leu Leu Gly Leu Asp
        1060

<210> SEQ ID NO 8
<211> LENGTH: 1054
<212> TYPE: PRT
<213> ORGANISM: Artificial Sequence
<220> FEATURE:
<223> OTHER INFORMATION: Synthetic sequence Epi4

<400> SEQUENCE: 8

Met Asp Ile Asp Pro Tyr Lys Glu Phe Gly Ala Thr Val Glu Leu Leu
1               5                   10                  15

Ser Phe Leu Pro Ser Asp Phe Phe Pro Ser Val Arg Asp Leu Leu Asp
                20                  25                  30

Thr Ala Ser Ala Leu Tyr Arg Asp Ala Leu Glu Ser Pro Glu His Cys
        35                  40                  45

Thr Pro His His Thr Ala Leu Arg Gln Ala Ile Leu Cys Trp Gly Glu
        50                  55                  60

Leu Met Thr Leu Ala Thr Trp Val Gly Val Asn Leu Glu Asp Pro Ala
65                  70                  75                  80

Ser Arg Asp Leu Val Val Ser Tyr Val Asn Thr Asn Met Gly Leu Lys
                85                  90                  95

Phe Arg Gln Leu Leu Trp Phe His Ile Ser Cys Leu Thr Phe Gly Arg
                100                 105                 110

Glu Thr Val Ile Glu Tyr Leu Val Ser Phe Gly Val Trp Ile Arg Thr
        115                 120                 125
```

```
Pro Thr Ala Tyr Arg Pro Pro Asn Ala Pro Ile Leu Ser Thr Leu Pro
    130                 135                 140

Glu Thr Thr Val Val Arg Arg Asp Arg Gly Arg Ser Pro Arg Arg
145                 150                 155                 160

Arg Thr Pro Ser Pro Arg Arg Arg Ser Gln Ser Pro Arg Arg
                165                 170                 175

Arg Ser Lys Ser Arg Glu Ser Gln Cys Met Gly Gln Asn Leu Ser Thr
            180                 185                 190

Ser Asn Pro Leu Gly Phe Phe Pro Asp His Gln Leu Asp Pro Ala Phe
        195                 200                 205

Arg Ala Asn Thr Ala Asn Pro Asp Trp Asp Phe Asn Pro Asn Lys Asp
210                 215                 220

Thr Trp Pro Asp Ala Asn Lys Val Gly Ala Gly Ala Phe Gly Leu Gly
225                 230                 235                 240

Phe Thr Pro Pro His Gly Gly Val Leu Gly Trp Ser Pro Gln Ala Gln
                245                 250                 255

Gly Ile Leu Gln Thr Leu Pro Ala Asn Pro Pro Ala Ser Thr Asn
            260                 265                 270

Arg Gln Ser Gly Arg Gln Pro Thr Pro Leu Ser Pro Pro Leu Arg Asp
    275                 280                 285

Thr His Pro Gln Ala Met Gln Trp Asn Ser Thr Thr Phe His Gln Thr
    290                 295                 300

Leu Gln Asp Pro Arg Val Arg Ala Leu Tyr Phe Pro Ala Gly Gly Ser
305                 310                 315                 320

Ser Ser Gly Thr Val Ser Pro Ala Gln Asn Thr Val Ser Ala Ile Ser
                325                 330                 335

Ser Ile Leu Ser Lys Thr Gly Asp Pro Val Pro Asn Met Glu Asn Ile
            340                 345                 350

Ala Ser Gly Leu Leu Gly Pro Leu Leu Val Leu Gln Ala Gly Phe Phe
        355                 360                 365

Leu Leu Thr Lys Ile Leu Thr Ile Pro Gln Ser Leu Asp Ser Trp Trp
370                 375                 380

Thr Ser Leu Asn Phe Leu Gly Gly Thr Thr Val Cys Leu Gly Gln Asn
385                 390                 395                 400

Ser Gln Ser Pro Thr Ser Asn His Ser Pro Thr Ser Cys Pro Pro Thr
                405                 410                 415

Cys Pro Gly Tyr Arg Trp Met Cys Leu Arg Arg Phe Ile Ile Phe Leu
            420                 425                 430

Cys Ile Leu Leu Leu Cys Leu Ile Phe Leu Leu Val Leu Leu Asp Tyr
        435                 440                 445

Gln Gly Met Leu Pro Val Cys Pro Leu Ile Pro Gly Ser Ser Thr Thr
    450                 455                 460

Ser Thr Gly Pro Cys Arg Thr Cys Thr Thr Pro Ala Gln Gly Thr Ser
465                 470                 475                 480

Met Tyr Pro Ser Cys Cys Thr Lys Pro Thr Asp Gly Asn Cys Thr
                485                 490                 495

Cys Ile Pro Ile Pro Ser Ser Trp Ala Phe Gly Lys Phe Leu Trp Glu
            500                 505                 510

Trp Ala Ser Ala Arg Phe Ser Trp Leu Ser Leu Leu Val Pro Phe Val
        515                 520                 525

Gln Trp Phe Ala Gly Leu Ser Pro Thr Val Trp Leu Ser Val Ile Trp
    530                 535                 540

Met Met Trp Phe Trp Gly Pro Ser Leu Tyr Asn Ile Leu Ser Pro Phe
```

```
               545                 550                 555                 560
       Ile Pro Leu Leu Pro Ile Phe Cys Tyr Leu Trp Val Ser Ile Val Thr
                           565                 570                 575

Gly Gly Val Phe Leu Val Asp Lys Asn Pro His Asn Thr Ala Glu Ser
                           580                 585                 590

Arg Leu Val Val Asp Phe Ser Gln Phe Ser Arg Gly Asn Thr Arg Val
                           595                 600                 605

Ser Trp Pro Lys Phe Ala Val Pro Asn Leu Gln Ser Leu Thr Asn Leu
                           610                 615                 620

Leu Ser Ser Asp Leu Ser Trp Leu Ser Leu Asp Val Ser Ala Ala Phe
       625                 630                 635                 640

Tyr His Leu Pro Leu His Pro Ala Ala Met Pro His Leu Leu Val Gly
                           645                 650                 655

Ser Ser Gly Leu Ser Arg Tyr Val Ala Arg Leu Ser Ser Asn Ser Arg
                           660                 665                 670

Ile Phe Asn His Gln His Gly Thr Met Gln Asn Leu His Asp Ser Cys
                           675                 680                 685

Ser Arg Asn Leu Tyr Val Ser Leu Met Leu Leu Tyr Lys Thr Tyr Gly
                           690                 695                 700

Arg Lys Leu His Leu Tyr Ser His Pro Ile Ile Met Gly Phe Arg Lys
       705                 710                 715                 720

Ile Pro Met Gly Val Gly Leu Ser Pro Phe Leu Met Ala Gln Phe Thr
                           725                 730                 735

Ser Ala Ile Cys Ser Val Val Arg Arg Ala Phe Pro His Cys Leu Ala
                           740                 745                 750

Phe Ser Leu Val Leu Gly Ala Lys Ser Val Gln His Leu Glu Ser Leu
                           755                 760                 765

Phe Thr Ala Val Thr Asn Phe Leu Leu Ser Leu Gly Ile His Leu Asn
                           770                 775                 780

Pro His Lys Thr Lys Arg Trp Gly Tyr Ser Leu His Phe Met Gly Tyr
       785                 790                 795                 800

Val Ile Gly Cys Tyr Gly Ser Leu Pro Gln Asp His Ile Ile Gln Lys
                           805                 810                 815

Ile Lys Glu Cys Phe Arg Lys Leu Pro Val Asn Arg Pro Ile Asp Trp
                           820                 825                 830

Lys Val Cys Gln Arg Ile Val Gly Leu Leu Gly Phe Ala Ala Pro Phe
                           835                 840                 845

Thr Gln Cys Gly Tyr Pro Ala Leu Met Pro Leu Tyr Ala Cys Ile Gln
                           850                 855                 860

Ala Lys Gln Ala Phe Thr Phe Ser Pro Thr Tyr Lys Ala Phe Leu Ser
       865                 870                 875                 880

Lys Gln Tyr Met Asn Leu Tyr Pro Val Ala Arg Gln Arg Pro Gly Leu
                           885                 890                 895

Cys Gln Val Phe Ala Ala Ala Thr Pro Thr Gly Trp Gly Leu Ala Ile
                           900                 905                 910

Gly His Gln Arg Met Arg Gly Thr Phe Val Ser Pro Leu Pro Ile His
                           915                 920                 925

Thr Ala Ala Leu Leu Ala Ala Cys Phe Ala Arg Ser Arg Ser Gly Ala
                           930                 935                 940

Asn Ile Leu Gly Thr Val Asn Ser Val Val Leu Ser Arg Lys Tyr Thr
       945                 950                 955                 960

Ser Phe Pro Trp Leu Leu Gly Cys Thr Ala Asn Trp Ile Leu Arg Gly
                           965                 970                 975
```

```
Thr Ser Phe Val Tyr Val Pro Ser Ala Leu Asn Pro Ala Ala Asp Pro
            980                 985                 990

Ser Arg Gly Arg Leu Gly Leu Ser Arg Pro Leu Leu Arg Leu Pro Phe
            995                 1000                1005

Arg Pro Thr Thr Gly Arg Thr Ser Leu Tyr Ala Asp Ser Pro Ser Val
            1010                1015                1020

Pro Ser His Leu Pro Val Arg Val His Phe Ala Ser Pro Leu His Val
1025                1030                1035                1040

Ala Trp Lys Pro Pro Tyr Pro Tyr Asp Val Pro Asp Tyr Ala
            1045                1050
```

<210> SEQ ID NO 9
<211> LENGTH: 1039
<212> TYPE: PRT
<213> ORGANISM: Artificial Sequence
<220> FEATURE:
<223> OTHER INFORMATION: Synthetic sequence 3_GL_epi rare15.1

<400> SEQUENCE: 9

```
Ile Asp Pro Tyr Lys Glu Phe Gly Ala Thr Val Glu Leu Leu Ser Phe
1               5                   10                  15

Leu Pro Ser Asp Phe Phe Pro Ser Ile Arg Asp Leu Leu Asp Thr Ala
            20                  25                  30

Ser Ala Leu Tyr Arg Asp Ala Leu Glu Ser Pro Glu His Cys Thr Pro
            35                  40                  45

His His Thr Ala Leu Arg Gln Ala Ile Leu Cys Trp Gly Glu Leu Met
        50                  55                  60

Thr Leu Ala Thr Trp Val Gly Val Asn Leu Glu Asp Pro Ala Ser Arg
65                  70                  75                  80

Asp Leu Val Val Ser Tyr Val Asn Thr Asn Met Gly Leu Lys Phe Arg
                85                  90                  95

Gln Leu Leu Trp Phe His Ile Ser Cys Leu Thr Phe Gly Arg Glu Thr
            100                 105                 110

Val Ile Glu Tyr Leu Val Ser Phe Gly Val Trp Ile Arg Thr Pro Thr
            115                 120                 125

Ala Tyr Arg Pro Pro Asn Ala Pro Ile Leu Ser Thr Leu Pro Glu Thr
            130                 135                 140

Thr Val Val Arg Arg Arg Asp Arg Gly Arg Ser Pro Arg Arg Arg Thr
145                 150                 155                 160

Pro Ser Pro Arg Arg Arg Arg Ser Gln Ser Arg Glu Ser Gln Cys Met
                165                 170                 175

Gly Gln Asn Leu Ser Thr Ser Asn Pro Leu Gly Phe Phe Pro Asp His
            180                 185                 190

Gln Leu Asp Pro Ala Phe Lys Ala Asn Ser Glu Asn Pro Asp Trp Asp
            195                 200                 205

Leu Asn Pro His Lys Asp Asn Trp Pro Asp Ala Asn Lys Val Gly Ala
            210                 215                 220

Gly Ala Phe Gly Leu Gly Phe Thr Pro Pro His Gly Gly Val Leu Gly
225                 230                 235                 240

Trp Ser Pro Gln Ala Gln Gly Ile Leu Gln Thr Leu Pro Ala Asn Pro
                245                 250                 255

Pro Pro Ala Ser Thr Asn Arg Gln Ser Gly Arg Gln Pro Thr Pro Leu
            260                 265                 270

Ser Pro Pro Leu Arg Asp Thr His Pro Gln Ala Met Gln Trp Asn Ser
            275                 280                 285
```

```
Thr Thr Phe His Gln Ala Leu Leu Asp Pro Arg Val Arg Gly Leu Tyr
    290                 295                 300
Leu Pro Ala Gly Gly Ser Ser Gly Thr Val Ser Pro Ala Gln Asn
305                 310                 315                 320
Thr Val Ser Ala Ile Ser Ser Ile Leu Ser Lys Thr Gly Asp Pro Val
                    325                 330                 335
Pro Asn Met Glu Asn Ile Ala Ser Gly Leu Leu Gly Pro Leu Leu Val
                340                 345                 350
Leu Gln Ala Gly Phe Phe Leu Leu Thr Lys Ile Leu Thr Ile Pro Gln
                355                 360                 365
Ser Leu Asp Ser Trp Trp Thr Ser Leu Asn Phe Leu Gly Gly Ala Pro
370                 375                 380
Thr Cys Pro Gly Gln Asn Ser Gln Ser Pro Thr Ser His Ser Pro
385                 390                 395                 400
Thr Ser Cys Pro Pro Thr Cys Pro Gly Tyr Arg Trp Met Cys Leu Arg
                    405                 410                 415
Arg Phe Ile Ile Phe Leu Cys Ile Leu Leu Leu Cys Leu Ile Phe Leu
                420                 425                 430
Leu Val Leu Val Asp Tyr Gln Gly Met Leu Pro Val Cys Pro Leu Leu
            435                 440                 445
Pro Gly Thr Ser Thr Thr Ser Thr Gly Pro Cys Arg Thr Cys Thr Thr
        450                 455                 460
Pro Ala Gln Gly Thr Ser Met Tyr Pro Ser Cys Cys Thr Lys Pro
465                 470                 475                 480
Thr Asp Gly Asn Cys Thr Cys Ile Pro Ile Pro Ser Ser Trp Ala Phe
                    485                 490                 495
Gly Lys Phe Leu Trp Glu Trp Ala Ser Ala Arg Phe Ser Trp Leu Ser
                500                 505                 510
Leu Leu Val Pro Phe Val Gln Trp Phe Ala Gly Leu Ser Pro Thr Val
            515                 520                 525
Trp Leu Ser Ala Ile Trp Met Met Trp Tyr Trp Gly Pro Ser Leu Tyr
        530                 535                 540
Ser Ile Leu Ser Pro Phe Ile Pro Leu Leu Pro Ile Phe Phe Cys Leu
545                 550                 555                 560
Trp Ala Tyr Ile Val Thr Gly Val Phe Leu Val Asp Lys Asn Pro
                    565                 570                 575
His Asn Thr Ala Glu Ser Arg Leu Val Val Asp Phe Ser Gln Phe Ser
                580                 585                 590
Arg Gly Ser Thr His Val Ser Trp Pro Lys Phe Ala Val Pro Asn Leu
            595                 600                 605
Gln Ser Leu Thr Asn Leu Leu Ser Ser Asp Leu Ser Trp Leu Ser Leu
        610                 615                 620
Asp Val Ser Ala Ala Phe Tyr His Ile Pro Leu His Pro Ala Ala Met
625                 630                 635                 640
Pro His Leu Leu Ile Gly Ser Ser Gly Leu Ser Arg Tyr Val Ala Arg
                    645                 650                 655
Leu Ser Ser Thr Ser Arg Asn Ile Asn Tyr Gln His Gly Thr Met Gln
                660                 665                 670
Asp Leu His Asp Ser Cys Ser Arg Asn Leu Tyr Val Ser Leu Met Leu
            675                 680                 685
Leu Tyr Lys Thr Tyr Gly Arg Lys Leu His Leu Tyr Ser His Pro Ile
        690                 695                 700
```

Ile Met Gly Phe Arg Lys Ile Pro Met Gly Leu Gly Leu Ser Pro Phe
705                 710                 715                 720

Leu Met Ala Gln Phe Thr Ser Ala Ile Cys Ser Val Val Arg Arg Ala
            725                 730                 735

Phe Pro His Cys Leu Ala Phe Ser Tyr Ile Asp Asp Val Val Leu Gly
        740                 745                 750

Ala Lys Thr Val Gln His Leu Glu Ser Leu Phe Thr Ser Ile Thr Asn
    755                 760                 765

Phe Leu Leu Ser Leu Gly Ile His Leu Asn Pro His Lys Thr Lys Arg
        770                 775                 780

Trp Gly Tyr Ser Leu His Phe Met Gly Tyr Val Ile Gly Cys Tyr Gly
785                 790                 795                 800

Ser Leu Pro Gln Asp His Ile Ile Gln Lys Ile Lys Glu Cys Phe Arg
            805                 810                 815

Lys Leu Pro Val Asn Arg Pro Val Asp Trp Lys Val Cys Gln Arg Ile
        820                 825                 830

Val Gly Leu Leu Gly Phe Ala Ala Pro Phe Thr Gln Cys Gly Tyr Pro
    835                 840                 845

Ala Leu Met Pro Leu Tyr Ala Cys Ile Gln Ala Lys Gln Ala Phe Thr
        850                 855                 860

Phe Ser Pro Pro Tyr Lys Ala Phe Leu Cys Lys Gln Tyr Met Asn Leu
865                 870                 875                 880

Tyr Pro Val Ala Arg Gln Arg Ser Gly Leu Cys Gln Val Phe Ala Asp
            885                 890                 895

Ala Thr Pro Thr Gly Trp Gly Leu Val Met Gly His Gln Arg Met Arg
        900                 905                 910

Gly Thr Phe Val Ser Pro Leu Pro Ile His Thr Ala Glu Leu Leu Ala
        915                 920                 925

Ala Cys Phe Ala Arg Ser Arg Ser Gly Ala Asn Ile Leu Gly Thr Asp
        930                 935                 940

Asn Ser Val Val Leu Ala Arg Lys Tyr Thr Ser Phe Pro Trp Leu Leu
945                 950                 955                 960

Gly Cys Thr Ala Asn Trp Ile Leu Arg Gly Thr Ser Phe Val Tyr Val
            965                 970                 975

Pro Ser Ala Leu Asn Pro Ala Asp Asp Pro Ser Arg Gly Arg Leu Gly
        980                 985                 990

Leu Ser Arg Pro Leu Leu Arg Leu Pro Phe Gln Pro Thr Thr Gly Arg
        995                 1000                1005

Thr Ser Leu Tyr Ala Val Ser Pro Ser Val Pro Ser His Leu Pro Val
    1010                1015                1020

Arg Val His Phe Ala Ser Pro Leu His Val Ala Trp Lys Pro Pro
1025                1030                1035

<210> SEQ ID NO 10
<211> LENGTH: 1049
<212> TYPE: PRT
<213> ORGANISM: Artificial Sequence
<220> FEATURE:
<223> OTHER INFORMATION: Synthetic sequence 3_GL_epi rare15.2

<400> SEQUENCE: 10

Asp Ile Asp Thr Tyr Lys Glu Phe Gly Ala Ser Val Glu Leu Leu Ser
1               5                   10                  15

Phe Leu Pro Ala Asp Phe Phe Pro Ser Val Arg Asp Leu Leu Asp Thr
            20                  25                  30

-continued

Ala Ala Ala Leu Tyr Arg Glu Ala Leu Glu Ser Pro Glu His Cys Thr
          35                  40                  45

Pro Asn His Thr Ala Leu Arg Gln Ala Ile Leu Cys Trp Gly Asp Leu
 50                  55                  60

Met Thr Leu Ala Thr Trp Val Gly Asn Asn Leu Glu Asp Pro Ala Ser
 65                  70                  75                  80

Arg Asp Leu Val Val Asn Tyr Val Asn Thr Asn Met Gly Leu Lys Ile
                 85                  90                  95

Arg Gln Ile Leu Trp Phe His Ile Ser Cys Leu Thr Phe Gly Arg Asp
            100                 105                 110

Thr Val Leu Glu Tyr Leu Val Ser Phe Gly Val Trp Ile Arg Thr Pro
            115                 120                 125

Pro Ala Tyr Arg Pro Gln Asn Ala Pro Ile Leu Ser Thr Leu Pro Glu
            130                 135                 140

Asn Thr Val Val Arg Arg Gly Arg Thr Pro Arg Arg Thr Pro
145                 150                 155                 160

Ser Pro Arg Arg Arg Ser Gln Ser Arg Glu Pro Gln Cys Met Gly
                165                 170                 175

Gly Trp Ser Ser Lys Pro Arg Gln Gly Met Gly Thr Asn Leu Ser Val
            180                 185                 190

Pro Asn Pro Leu Gly Phe Leu Pro Asp His Gln Leu Asp Pro Ala Phe
            195                 200                 205

Arg Ala Asn Thr Ala Asn Pro Asp Trp Asp Phe Asn Pro Asn Lys Asp
            210                 215                 220

His Trp Pro Glu Ala Asn Gln Val Gly Ala Gly Ala Phe Gly Pro Gly
225                 230                 235                 240

Phe Thr Pro Pro His Gly Asn Leu Leu Gly Trp Ser Pro Gln Ala Gln
                245                 250                 255

Gly Leu Leu Thr Thr Val Pro Val Ala Pro Pro Ala Ser Thr Asn
            260                 265                 270

Arg Gln Leu Gly Arg Lys Pro Thr Pro Leu Ser Pro Leu Arg Asn
            275                 280                 285

Thr His Pro Gln Ala Met Gln Trp Asn Ser Thr Ala Phe His Gln Ala
290                 295                 300

Leu Gln Asp Pro Arg Val Arg Ala Leu Tyr Phe Pro Ala Gly Gly Ser
305                 310                 315                 320

Thr Ser Gly Thr Val Asn Pro Val Pro Thr Thr Val Ser Pro Ile Ser
                325                 330                 335

Ser Ile Phe Ser Arg Thr Gly Asp Pro Ala Pro Asn Met Glu Asn Thr
            340                 345                 350

Thr Ser Gly Phe Leu Gly Pro Leu Leu Val Leu Gln Ala Gly Phe Phe
            355                 360                 365

Ser Leu Thr Lys Ile Leu Thr Ile Pro Gln Ser Leu Asp Ser Trp Trp
370                 375                 380

Thr Ser Leu Asn Phe Leu Gly Gly Thr Pro Val Cys Leu Gly Gln Asn
385                 390                 395                 400

Ser Gln Ser Gln Ile Ser Ser His Ser Pro Thr Cys Cys Pro Pro Ile
                405                 410                 415

Cys Pro Gly Tyr Arg Trp Met Tyr Leu Arg Arg Phe Ile Ile Phe Leu
            420                 425                 430

Phe Ile Leu Leu Leu Cys Leu Thr Phe Leu Leu Val Leu Leu Asp Tyr
            435                 440                 445

Arg Gly Met Leu Pro Val Cys Pro Leu Ile Pro Gly Ser Thr Thr Thr

```
              450             455             460
Ser Thr Gly Pro Cys Lys Thr Cys Thr Ile Pro Ala Gln Gly Thr Ser
465                 470                 475                 480

Met Phe Pro Ser Cys Cys Cys Ser Lys Pro Ser Asp Gly Asn Cys Thr
                485                 490                 495

Cys Ile Pro Ile Pro Ser Ser Trp Ala Phe Ala Arg Phe Leu Trp Glu
                500                 505                 510

Trp Ala Ser Val Arg Phe Ser Trp Leu Ser Leu Leu Val Gln Phe Val
            515                 520                 525

Gln Trp Cys Val Gly Leu Ser Pro Thr Val Trp Leu Ser Val Ile Trp
        530                 535                 540

Met Met Trp Phe Trp Gly Pro Ser Leu Tyr Asn Ile Leu Ser Pro Phe
545                 550                 555                 560

Met Pro Leu Leu Pro Ile Phe Phe Cys Leu Trp Val Tyr Ile Ile Thr
                565                 570                 575

Gly Gly Val Phe Leu Val Asp Lys Asn Pro His Asn Thr Glu Glu Ser
            580                 585                 590

Arg Leu Val Val Asp Phe Ser Gln Phe Ser Arg Gly Asn Tyr Arg Val
        595                 600                 605

Ser Trp Pro Lys Phe Ala Val Pro Asn Leu Gln Ser Leu Thr Asn Leu
    610                 615                 620

Leu Ser Ser Asn Leu Ser Trp Ile Ser Leu Asp Val Ser Ala Ala Phe
625                 630                 635                 640

Tyr His Leu Pro Leu His Pro Ala Ala Met Pro His Leu Leu Val Gly
                645                 650                 655

Ser Ser Gly Leu Pro Arg Tyr Val Ala Arg Leu Ser Ser Asn Ser Arg
            660                 665                 670

Ile Ile Asn Asn Gln His Arg Thr Met Gln Asn Leu His Asn Ser Cys
        675                 680                 685

Ser Arg Asn Leu Tyr Val Ser Leu Leu Leu Leu Tyr Gln Thr Phe Gly
    690                 695                 700

Arg Lys Leu His Leu Tyr Ser His Pro Ile Val Leu Gly Phe Arg Lys
705                 710                 715                 720

Ile Pro Met Gly Val Gly Leu Ser Pro Phe Leu Leu Ala Gln Phe Thr
                725                 730                 735

Ser Ala Leu Cys Ser Val Val Arg Arg Ala Phe Pro His Cys Leu Ala
            740                 745                 750

Phe Ser Tyr Met Asp Asp Leu Val Leu Gly Ala Lys Ser Val Gln His
        755                 760                 765

Leu Glu Ser Leu Tyr Ala Ala Val Thr Asn Phe Leu Leu Ser Val Gly
    770                 775                 780

Ile His Leu Asn Thr Ser Lys Thr Lys Arg Trp Gly Tyr Ser Leu Asn
785                 790                 795                 800

Phe Met Gly Tyr Ile Ile Gly Ser Trp Gly Thr Leu Pro Gln Asp His
                805                 810                 815

Ile Val Gln Lys Ile Lys His Cys Phe Arg Lys Leu Pro Val Asn Arg
            820                 825                 830

Pro Ile Asp Trp Lys Val Cys Gln Arg Leu Val Gly Leu Leu Gly Phe
        835                 840                 845

Ala Ala Pro Phe Thr Gln Cys Gly Tyr Pro Ala Leu Lys Pro Leu Tyr
    850                 855                 860

Ala Cys Ile Gln Ser Arg Gln Ala Phe Thr Phe Ser Pro Thr Tyr Lys
865                 870                 875                 880
```

-continued

```
Ala Phe Leu Ser Lys Gln Tyr Leu Asn Leu Tyr Pro Val Ala Arg Gln
                885                 890                 895

Arg Ser Gly Val Cys Gln Val Phe Ala Asp Ala Thr Pro Thr Gly Trp
            900                 905                 910

Gly Leu Ala Ile Gly His Arg Met Arg Gly Thr Phe Val Ala Pro
        915                 920                 925

Leu Pro Ile His Thr Ala Glu Leu Leu Ala Ala Cys Phe Ala Arg Ser
    930                 935                 940

Arg Ser Gly Ala Asn Leu Ile Gly Thr Asp Asn Ser Val Val Leu Ser
945                 950                 955                 960

Arg Lys Tyr Thr Ser Tyr Pro Trp Leu Leu Gly Cys Ala Ala Asn Trp
                965                 970                 975

Ile Leu Arg Gly Thr Ser Phe Val Tyr Val Pro Ser Ala Leu Asn Pro
            980                 985                 990

Ala Asp Asp Pro Ser Arg Gly Arg Leu Gly Ile Tyr Arg Pro Leu Leu
        995                 1000                1005

Arg Leu Pro Tyr Arg Pro Thr Thr Gly Arg Thr Ser Leu Tyr Ala Ala
    1010                1015                1020

Ser Pro Ser Val Pro Ser His Leu Pro Ala Arg Val His Phe Ala Ser
1025                1030                1035                1040

Pro Leu His Val Thr Trp Lys Pro Pro
                1045

<210> SEQ ID NO 11
<211> LENGTH: 1057
<212> TYPE: PRT
<213> ORGANISM: Artificial Sequence
<220> FEATURE:
<223> OTHER INFORMATION: Synthetic sequence 3_GL_epi rare15.3

<400> SEQUENCE: 11

Asp Ile Asp Pro Tyr Lys Glu Phe Gly Ala Ser Val Glu Leu Leu Ser
1               5                   10                  15

Phe Leu Pro Ser Asp Phe Phe Pro Ser Val Arg Asp Leu Leu Asp Thr
                20                  25                  30

Ala Ser Ala Leu Tyr Arg Glu Ala Leu Glu Ser Pro Glu His Cys Ser
            35                  40                  45

Pro His His Thr Ala Leu Arg Gln Ala Ile Leu Cys Trp Gly Glu Leu
        50                  55                  60

Met Asn Leu Ala Thr Trp Val Gly Ser Asn Leu Glu Asp Pro Ala Ser
65                  70                  75                  80

Arg Glu Leu Val Val Ser Tyr Val Asn Val Asn Met Gly Leu Lys Ile
                85                  90                  95

Arg Gln Leu Leu Trp Phe His Ile Ser Cys Leu Thr Phe Gly Arg Glu
            100                 105                 110

Thr Val Leu Glu Tyr Leu Val Ser Phe Gly Val Trp Ile Arg Thr Pro
        115                 120                 125

Pro Ala Tyr Arg Pro Pro Asn Ala Pro Ile Leu Ser Thr Leu Pro Glu
    130                 135                 140

Thr Thr Val Val Arg Arg Gly Arg Ser Pro Arg Arg Thr Pro
145                 150                 155                 160

Ser Pro Arg Arg Arg Ser Gln Ser Pro Arg Arg Arg Ser Lys
                165                 170                 175

Ser Arg Glu Ser Gln Cys Met Gly Gly Trp Ser Ser Lys Pro Arg Lys
            180                 185                 190
```

```
Gly Met Gly Thr Asn Leu Ser Val Pro Asn Pro Leu Gly Phe Phe Pro
        195                 200                 205

Asp His Gln Leu Asp Pro Ala Phe Gly Ala Asn Ser Asn Asn Pro Asp
    210                 215                 220

Trp Asp Phe Asn Pro Asn Lys Asp Thr Trp Pro Asp Ala Asn Lys Val
225                 230                 235                 240

Gly Val Gly Ala Phe Gly Pro Gly Phe Thr Pro Pro His Gly Gly Leu
                245                 250                 255

Leu Gly Trp Ser Pro Gln Ala Gln Gly Ile Leu Thr Thr Val Pro Ala
            260                 265                 270

Ala Pro Pro Ala Ser Thr Asn Arg Gln Ser Gly Arg Gln Pro Thr
        275                 280                 285

Pro Ile Ser Pro Pro Leu Arg Asp Ser His Pro Gln Ala Met Gln Trp
        290                 295                 300

Asn Ser Thr Thr Phe His Gln Thr Leu Gln Asp Pro Arg Val Arg Gly
305                 310                 315                 320

Leu Tyr Phe Pro Ala Gly Gly Ser Ser Gly Thr Val Asn Pro Val
                325                 330                 335

Pro Thr Thr Ala Ser Pro Ile Ser Ser Ile Phe Ser Arg Ile Gly Asp
            340                 345                 350

Pro Ala Leu Asn Met Glu Asn Ile Thr Ser Gly Phe Leu Gly Pro Leu
        355                 360                 365

Leu Val Leu Gln Ala Gly Phe Phe Leu Leu Thr Arg Ile Leu Thr Ile
        370                 375                 380

Pro Gln Ser Leu Asp Ser Trp Trp Thr Ser Leu Asn Phe Leu Gly Gly
385                 390                 395                 400

Thr Thr Val Cys Leu Gly Gln Asn Ser Gln Ser Pro Thr Ser Asn His
                405                 410                 415

Ser Pro Thr Ser Cys Pro Pro Ile Cys Pro Gly Tyr Arg Trp Met Cys
            420                 425                 430

Leu Arg Arg Phe Ile Ile Phe Leu Phe Ile Leu Leu Leu Cys Leu Ile
        435                 440                 445

Phe Leu Leu Val Leu Leu Asp Tyr Gln Gly Met Leu Pro Val Cys Pro
        450                 455                 460

Leu Ile Pro Gly Ser Ser Thr Thr Ser Thr Gly Pro Cys Lys Thr Cys
465                 470                 475                 480

Thr Thr Pro Ala Gln Gly Asn Ser Met Phe Pro Ser Cys Cys Cys Thr
                485                 490                 495

Lys Pro Ser Asp Gly Asn Cys Thr Cys Ile Pro Ile Pro Ser Ser Trp
            500                 505                 510

Ala Phe Ala Lys Tyr Leu Trp Glu Trp Ala Ser Val Arg Phe Ser Trp
        515                 520                 525

Leu Ser Leu Leu Val Pro Phe Val Gln Trp Phe Val Gly Leu Ser Pro
        530                 535                 540

Thr Val Trp Leu Ser Val Ile Trp Met Met Trp Tyr Trp Gly Pro Ser
545                 550                 555                 560

Leu Tyr Asn Ile Leu Ser Pro Phe Leu Pro Leu Leu Pro Ile Phe Phe
                565                 570                 575

Cys Leu Trp Val Tyr Ile Val Thr Gly Gly Val Phe Leu Val Asp Lys
            580                 585                 590

Asn Pro His Asn Thr Thr Glu Ser Arg Leu Val Val Asp Phe Ser Gln
        595                 600                 605
```

-continued

```
Phe Ser Arg Gly Asn Thr Arg Val Ser Trp Pro Lys Phe Ala Val Pro
    610                 615                 620

Asn Leu Gln Ser Leu Thr Asn Leu Leu Ser Ser Asn Leu Ser Trp Leu
625                 630                 635                 640

Ser Leu Asp Val Ser Ala Ala Phe Tyr His Leu Pro Leu His Pro Ala
                645                 650                 655

Ala Met Pro His Leu Leu Val Gly Ser Ser Gly Leu Ser Arg Tyr Val
            660                 665                 670

Ala Arg Leu Ser Ser Asn Ser Arg Ile Phe Asn His Gln His Gly Thr
        675                 680                 685

Met Gln Asn Leu His Asp Ser Cys Ser Arg Asn Leu Tyr Val Ser Leu
690                 695                 700

Leu Leu Leu Tyr Lys Thr Phe Gly Arg Lys Leu His Leu Tyr Ser His
705                 710                 715                 720

Pro Ile Ile Leu Gly Phe Arg Lys Ile Pro Met Gly Val Gly Leu Ser
                725                 730                 735

Pro Phe Leu Leu Ala Gln Phe Thr Ser Ala Ile Cys Ser Val Val Arg
            740                 745                 750

Arg Ala Phe Pro His Cys Leu Ala Phe Ser Tyr Met Asp Asp Val Val
        755                 760                 765

Leu Gly Ala Lys Ser Val Gln His Leu Glu Ser Leu Phe Thr Ala Val
770                 775                 780

Thr Asn Phe Leu Leu Ser Leu Gly Ile His Leu Asn Pro Asn Lys Thr
785                 790                 795                 800

Lys Arg Trp Gly Tyr Ser Leu Asn Phe Met Gly Tyr Val Ile Gly Ser
                805                 810                 815

Trp Gly Thr Leu Pro Gln Glu His Ile Val Gln Lys Ile Lys Gln Cys
            820                 825                 830

Phe Arg Lys Leu Pro Val Asn Arg Pro Ile Asp Trp Lys Val Cys Gln
        835                 840                 845

Arg Ile Val Gly Leu Leu Gly Phe Ala Ala Pro Phe Thr Gln Cys Gly
850                 855                 860

Tyr Pro Ala Leu Met Pro Leu Tyr Ala Cys Ile Gln Ser Lys Gln Ala
865                 870                 875                 880

Phe Thr Phe Ser Pro Thr Tyr Lys Ala Phe Leu Cys Lys Gln Tyr Leu
                885                 890                 895

Asn Leu Tyr Pro Val Ala Arg Gln Arg Pro Gly Leu Cys Gln Val Phe
            900                 905                 910

Ala Asp Ala Thr Pro Thr Gly Trp Gly Leu Ala Ile Gly His Gln Arg
        915                 920                 925

Met Arg Gly Thr Phe Leu Ala Pro Leu Pro Ile His Thr Ala Glu Leu
930                 935                 940

Leu Ala Ala Cys Phe Ala Arg Ser Arg Ser Gly Ala Lys Leu Ile Gly
945                 950                 955                 960

Thr Asp Asn Ser Val Val Leu Ser Arg Lys Tyr Thr Ser Phe Pro Trp
                965                 970                 975

Leu Leu Gly Cys Ala Ala Asn Trp Ile Leu Arg Gly Thr Ser Phe Val
            980                 985                 990

Tyr Val Pro Ser Ala Leu Asn Pro Ala Asp Asp Pro Ser Arg Gly Arg
        995                 1000                1005

Leu Gly Leu Tyr Arg Pro Leu Leu Arg Leu Pro Phe Arg Pro Thr Thr
1010                1015                1020

Gly Arg Thr Ser Leu Tyr Ala Asp Ser Pro Ser Val Pro Ser His Leu
```

-continued

```
              1025                1030                1035                1040
        Pro Asp Arg Val His Phe Ala Ser Pro Leu His Val Ala Trp Arg Pro
                            1045                1050                1055
        Pro

<210> SEQ ID NO 12
<211> LENGTH: 1046
<212> TYPE: PRT
<213> ORGANISM: Hepatitis B virus

<400> SEQUENCE: 12

Asp Ile Asp Pro Tyr Lys Glu Phe Gly Ala Thr Val Glu Leu Leu Ser
1               5                   10                  15

Phe Leu Pro Ser Asp Phe Phe Pro Ser Val Arg Asp Leu Leu Asp Thr
            20                  25                  30

Ala Ser Ala Leu Tyr Arg Glu Ala Leu Glu Ser Pro Glu His Cys Ser
        35                  40                  45

Pro His His Thr Ala Leu Arg Gln Ala Ile Leu Cys Trp Gly Glu Leu
    50                  55                  60

Met Thr Leu Ala Thr Trp Val Gly Gly Asn Leu Glu Asp Pro Ile Ser
65                  70                  75                  80

Arg Asp Leu Val Val Ser Tyr Val Asn Thr Asn Met Gly Leu Lys Phe
                85                  90                  95

Arg Gln Leu Leu Trp Phe His Ile Ser Cys Leu Thr Phe Gly Arg Glu
            100                 105                 110

Thr Val Ile Glu Tyr Leu Val Ser Phe Gly Val Trp Ile Arg Thr Pro
        115                 120                 125

Pro Ala Tyr Arg Pro Pro Asn Ala Pro Ile Leu Ser Thr Leu Pro Glu
    130                 135                 140

Thr Thr Val Val Arg Arg Arg Gly Arg Ser Pro Arg Arg Arg Thr Pro
145                 150                 155                 160

Ser Pro Arg Arg Arg Arg Ser Gln Ser Pro Arg Arg Arg Arg Ser Gln
                165                 170                 175

Ser Arg Glu Ser Gln Cys Met Gly Gln Asn Leu Ser Thr Ser Asn Pro
            180                 185                 190

Leu Gly Phe Phe Pro Asp His Gln Leu Asp Pro Ala Phe Arg Ala Asn
        195                 200                 205

Thr Ala Asn Pro Asp Trp Asp Phe Asn Pro Asn Lys Asp Thr Trp Pro
    210                 215                 220

Asp Ala Asn Lys Val Gly Ala Gly Ala Phe Gly Leu Gly Phe Thr Pro
225                 230                 235                 240

Pro His Gly Gly Leu Leu Gly Trp Ser Pro Gln Ala Gln Gly Ile Leu
                245                 250                 255

Gln Thr Leu Pro Ala Asn Pro Pro Ala Ser Thr Asn Arg Gln Ser
            260                 265                 270

Gly Arg Gln Pro Thr Pro Leu Ser Pro Leu Arg Asn Thr His Pro
        275                 280                 285

Gln Ala Met Gln Trp Asn Ser Thr Thr Phe His Gln Thr Leu Gln Asp
    290                 295                 300

Pro Arg Val Arg Gly Leu Tyr Phe Pro Ala Gly Gly Ser Ser Ser Gly
305                 310                 315                 320

Thr Val Asn Pro Val Pro Thr Thr Val Ser Pro Ile Ser Ser Ile Phe
                325                 330                 335

Ser Arg Ile Gly Asp Pro Ala Leu Asn Met Glu Asn Ile Thr Ser Gly
```

```
              340                 345                 350
Phe Leu Gly Pro Leu Val Leu Gln Ala Gly Phe Phe Leu Leu Thr
            355                 360                 365
Arg Ile Leu Thr Ile Pro Gln Ser Leu Asp Ser Trp Trp Thr Ser Leu
        370                 375                 380
Asn Phe Leu Gly Gly Thr Thr Val Cys Leu Gly Gln Asn Ser Gln Ser
385                 390                 395                 400
Pro Thr Ser Asn His Ser Pro Thr Ser Cys Pro Pro Thr Cys Pro Gly
                405                 410                 415
Tyr Arg Trp Met Cys Leu Arg Arg Phe Ile Ile Phe Leu Phe Ile Leu
            420                 425                 430
Leu Leu Cys Leu Ile Phe Leu Leu Val Leu Leu Asp Tyr Gln Gly Met
        435                 440                 445
Leu Pro Val Cys Pro Leu Ile Pro Gly Ser Ser Thr Thr Ser Thr Gly
    450                 455                 460
Pro Cys Arg Thr Cys Thr Thr Pro Ala Gln Gly Thr Ser Met Tyr Pro
465                 470                 475                 480
Ser Cys Cys Cys Thr Lys Pro Ser Asp Gly Asn Cys Thr Cys Ile Pro
                485                 490                 495
Ile Pro Ser Ser Trp Ala Phe Gly Lys Phe Leu Trp Glu Trp Ala Ser
            500                 505                 510
Ala Arg Phe Ser Trp Leu Ser Leu Leu Val Pro Phe Val Gln Trp Phe
        515                 520                 525
Val Gly Leu Ser Pro Thr Val Trp Leu Ser Val Ile Trp Met Met Trp
    530                 535                 540
Tyr Trp Gly Pro Ser Leu Tyr Ser Ile Leu Ser Pro Phe Leu Pro Leu
545                 550                 555                 560
Leu Pro Ile Phe Phe Cys Leu Trp Val Tyr Ile Val Thr Gly Gly Val
                565                 570                 575
Phe Leu Val Asp Lys Asn Pro His Asn Thr Ala Glu Ser Arg Leu Val
            580                 585                 590
Val Asp Phe Ser Gln Phe Ser Arg Gly Asn Tyr Arg Val Ser Trp Pro
        595                 600                 605
Lys Phe Ala Val Pro Asn Leu Gln Ser Leu Thr Asn Leu Leu Ser Ser
    610                 615                 620
Asn Leu Ser Trp Leu Ser Leu Asp Val Ser Ala Ala Phe Tyr His Leu
625                 630                 635                 640
Pro Leu His Pro Ala Ala Met Pro His Leu Leu Val Gly Ser Ser Gly
                645                 650                 655
Leu Ser Arg Tyr Val Ala Arg Leu Ser Ser Asn Ser Arg Ile Phe Asn
            660                 665                 670
Tyr Gln His Gly Thr Met Gln Asn Leu His Asp Ser Cys Ser Arg Asn
        675                 680                 685
Leu Tyr Val Ser Leu Leu Leu Leu Tyr Gln Thr Phe Gly Arg Lys Leu
    690                 695                 700
His Leu Tyr Ser His Pro Ile Ile Leu Gly Phe Arg Lys Ile Pro Met
705                 710                 715                 720
Gly Val Gly Leu Ser Pro Phe Leu Leu Ala Gln Phe Thr Ser Ala Ile
                725                 730                 735
Cys Ser Val Val Arg Arg Ala Phe Pro His Cys Leu Ala Phe Ser Tyr
            740                 745                 750
Met Asp Asp Val Val Leu Gly Ala Lys Ser Val Gln His Leu Glu Ser
        755                 760                 765
```

```
Leu Phe Thr Ala Val Thr Asn Phe Leu Leu Ser Leu Gly Ile His Leu
    770                 775                 780

Asn Pro Asn Lys Thr Lys Arg Trp Gly Tyr Ser Leu His Phe Met Gly
785                 790                 795                 800

Tyr Val Ile Gly Cys Tyr Gly Ser Leu Pro Gln Asp His Ile Ile Gln
                805                 810                 815

Lys Ile Lys Glu Cys Phe Arg Lys Leu Pro Val Asn Arg Pro Ile Asp
                820                 825                 830

Trp Lys Val Cys Gln Arg Ile Val Gly Leu Leu Gly Phe Ala Ala Pro
                835                 840                 845

Phe Thr Gln Cys Gly Tyr Pro Ala Leu Met Pro Leu Tyr Ala Cys Ile
    850                 855                 860

Gln Ser Lys Gln Ala Phe Thr Phe Ser Pro Thr Tyr Lys Ala Phe Leu
865                 870                 875                 880

Cys Lys Gln Tyr Leu Asn Leu Tyr Pro Val Ala Arg Gln Arg Pro Gly
                885                 890                 895

Leu Cys Gln Val Phe Ala Asp Ala Thr Pro Thr Gly Trp Gly Leu Val
                900                 905                 910

Met Gly His Gln Arg Met Arg Gly Thr Phe Leu Ala Pro Leu Pro Ile
                915                 920                 925

His Thr Ala Glu Leu Leu Ala Ala Cys Phe Ala Arg Ser Arg Ser Gly
    930                 935                 940

Ala Asn Ile Leu Gly Thr Asp Asn Ser Val Val Leu Ser Arg Lys Tyr
945                 950                 955                 960

Thr Ser Phe Pro Trp Leu Leu Gly Cys Ala Ala Asn Trp Ile Leu Arg
                965                 970                 975

Gly Thr Ser Phe Val Tyr Val Pro Ser Ala Leu Asn Pro Thr Asp Asp
                980                 985                 990

Pro Ser Arg Gly Arg Leu Gly Leu Ser Arg Pro Leu Leu Arg Leu Pro
                995                 1000                1005

Phe Arg Pro Thr Thr Gly Arg Thr Ser Leu Tyr Ala Asp Ser Pro Ser
    1010                1015                1020

Val Pro Ser His Leu Pro Asp Arg Val His Phe Ala Ser Pro Leu His
1025                1030                1035                1040

Val Ala Trp Arg Pro Pro
                1045

<210> SEQ ID NO 13
<211> LENGTH: 1057
<212> TYPE: PRT
<213> ORGANISM: Hepatitis B virus

<400> SEQUENCE: 13

Asp Ile Asp Pro Tyr Lys Glu Phe Gly Ala Ser Val Glu Leu Leu Ser
1               5                   10                  15

Phe Leu Pro Ser Asp Phe Phe Pro Ser Ile Arg Asp Leu Leu Asp Thr
                20                  25                  30

Ala Ser Ala Leu Tyr Arg Glu Ala Leu Glu Ser Pro Glu His Cys Ser
            35                  40                  45

Pro His His Thr Ala Leu Arg Gln Ala Ile Leu Cys Trp Gly Glu Leu
        50                  55                  60

Met Asn Leu Ala Thr Trp Val Gly Ser Asn Leu Glu Asp Pro Ala Ser
65                  70                  75                  80

Arg Glu Leu Val Val Ser Tyr Val Asn Val Asn Met Gly Leu Lys Ile
```

```
                    85                  90                  95
Arg Gln Leu Leu Trp Phe His Ile Ser Cys Leu Thr Phe Gly Arg Glu
                100                 105                 110

Thr Val Leu Glu Tyr Leu Val Ser Phe Gly Val Trp Ile Arg Thr Pro
                115                 120                 125

Pro Ala Tyr Arg Pro Pro Asn Ala Pro Ile Leu Ser Thr Leu Pro Glu
                130                 135                 140

Thr Thr Val Val Arg Arg Arg Gly Arg Ser Pro Arg Arg Thr Pro
145                 150                 155                 160

Ser Pro Arg Arg Arg Ser Gln Ser Pro Arg Arg Arg Ser Gln
                165                 170                 175

Ser Arg Glu Ser Gln Cys Met Gly Gly Trp Ser Ser Lys Pro Arg Lys
                180                 185                 190

Gly Met Gly Thr Asn Leu Ser Val Pro Asn Pro Leu Gly Phe Phe Pro
                195                 200                 205

Asp His Gln Leu Asp Pro Ala Phe Gly Ala Asn Ser Asn Asn Pro Asp
                210                 215                 220

Trp Asp Phe Asn Pro Asn Lys Asp His Trp Pro Glu Ala Asn Gln Val
225                 230                 235                 240

Gly Ala Gly Ala Phe Gly Pro Gly Phe Thr Pro Pro His Gly Gly Leu
                245                 250                 255

Leu Gly Trp Ser Pro Gln Ala Gln Gly Ile Leu Thr Thr Val Pro Ala
                260                 265                 270

Ala Pro Pro Pro Ala Ala Thr Asn Arg Gln Ser Gly Arg Gln Pro Thr
                275                 280                 285

Pro Ile Ser Pro Pro Leu Arg Asp Ser His Pro Gln Ala Met Gln Trp
                290                 295                 300

Asn Ser Thr Thr Phe His Gln Ala Leu Leu Asp Pro Arg Val Arg Gly
305                 310                 315                 320

Leu Tyr Phe Pro Ala Gly Gly Ser Ser Ser Gly Thr Val Asn Pro Val
                325                 330                 335

Pro Thr Thr Ala Ser Pro Ile Ser Ser Ile Phe Ser Arg Ser Gly Asp
                340                 345                 350

Pro Ala Pro Asn Met Glu Asn Thr Thr Ser Gly Phe Leu Gly Pro Leu
                355                 360                 365

Leu Val Leu Gln Ala Val Phe Phe Leu Leu Thr Arg Ile Leu Thr Ile
                370                 375                 380

Pro Gln Ser Leu Asp Ser Trp Trp Thr Ser Leu Asn Phe Leu Gly Glu
385                 390                 395                 400

Ala Pro Ala Cys Pro Gly Gln Asn Ser Gln Ser Pro Thr Ser Ser His
                405                 410                 415

Ser Pro Thr Ser Cys Pro Pro Ile Cys Pro Gly Tyr Arg Trp Met Cys
                420                 425                 430

Leu Arg Arg Phe Ile Ile Phe Leu Phe Ile Leu Leu Leu Cys Leu Ile
                435                 440                 445

Phe Leu Leu Val Leu Leu Asp Tyr Gln Gly Met Leu Pro Val Cys Pro
                450                 455                 460

Leu Leu Pro Gly Thr Ser Thr Thr Ser Thr Gly Pro Cys Lys Thr Cys
465                 470                 475                 480

Thr Ile Pro Ala Gln Gly Thr Ser Met Phe Pro Ser Cys Cys Cys Thr
                485                 490                 495

Lys Pro Ser Asp Gly Asn Cys Thr Cys Ile Pro Ile Pro Ser Ser Trp
                500                 505                 510
```

```
Ala Phe Ala Arg Phe Leu Trp Glu Trp Ala Ser Val Arg Phe Ser Trp
            515                 520                 525

Leu Ser Leu Leu Val Pro Phe Val Gln Trp Phe Val Gly Leu Ser Pro
            530                 535                 540

Thr Val Trp Leu Ser Val Ile Trp Met Met Trp Tyr Trp Gly Pro Ser
545                 550                 555                 560

Leu Tyr Asn Ile Leu Ser Pro Phe Leu Pro Leu Leu Pro Leu Phe Phe
            565                 570                 575

Cys Leu Trp Val Tyr Ile Val Thr Gly Gly Val Phe Leu Val Asp Lys
            580                 585                 590

Asn Pro His Asn Thr Thr Glu Ser Arg Leu Val Val Asp Phe Ser Gln
            595                 600                 605

Phe Ser Arg Gly Ser Thr Arg Val Ser Trp Pro Lys Phe Ala Val Pro
            610                 615                 620

Asn Leu Gln Ser Leu Thr Asn Leu Leu Ser Ser Asn Leu Ser Trp Leu
625                 630                 635                 640

Ser Leu Asp Val Ser Ala Ala Phe Tyr His Leu Pro Leu His Pro Ala
            645                 650                 655

Ala Met Pro His Leu Leu Val Gly Ser Ser Gly Leu Pro Arg Tyr Val
            660                 665                 670

Ala Arg Leu Ser Ser Ala Ser Arg Asn Ile Asn Tyr Gln His Gly Thr
            675                 680                 685

Met Gln Asp Leu His Asp Ser Cys Ser Arg Asn Leu Tyr Val Ser Leu
            690                 695                 700

Met Leu Leu Tyr Lys Thr Phe Gly Arg Lys Leu His Leu Tyr Ser His
705                 710                 715                 720

Pro Ile Ile Leu Gly Phe Arg Lys Ile Pro Met Gly Val Gly Leu Ser
            725                 730                 735

Pro Phe Leu Leu Ala Gln Phe Thr Ser Ala Ile Cys Ser Val Val Arg
            740                 745                 750

Arg Ala Phe Pro His Cys Leu Ala Phe Ser Tyr Met Asp Asp Val Val
            755                 760                 765

Leu Gly Ala Lys Ser Val Gln His Leu Glu Ser Leu Phe Thr Ser Ile
            770                 775                 780

Thr Thr Phe Leu Leu Ser Leu Gly Ile His Leu Asn Pro Asn Lys Thr
785                 790                 795                 800

Lys Arg Trp Gly Tyr Ser Leu Asn Phe Met Gly Tyr Val Ile Gly Ser
            805                 810                 815

Trp Gly Thr Leu Pro Gln Glu His Ile Val Leu Lys Ile Lys Gln Cys
            820                 825                 830

Phe Arg Lys Leu Pro Val Asn Arg Pro Ile Asp Trp Lys Val Cys Gln
            835                 840                 845

Arg Ile Val Gly Leu Leu Gly Phe Ala Ala Pro Phe Thr Gln Cys Gly
            850                 855                 860

Tyr Pro Ala Leu Met Pro Leu Tyr Ala Cys Ile Gln Ala Lys Gln Ala
865                 870                 875                 880

Phe Thr Phe Ser Pro Thr Tyr Lys Ala Phe Leu Arg Thr Gln Tyr Leu
            885                 890                 895

Asn Leu Tyr Pro Val Ala Arg Gln Arg Ser Gly Leu Cys Gln Val Phe
            900                 905                 910

Ala Asp Ala Thr Pro Thr Gly Trp Gly Leu Ala Met Gly His Gln Arg
            915                 920                 925
```

```
Met Arg Gly Thr Phe Leu Ala Pro Leu Pro Ile His Thr Ala Glu Leu
    930                 935                 940

Leu Ala Ala Cys Phe Ala Arg Ser Arg Ser Gly Ala Lys Leu Ile Gly
945                 950                 955                 960

Thr Asp Asn Ser Val Val Leu Ala Arg Lys Tyr Thr Ser Phe Pro Trp
                965                 970                 975

Leu Leu Gly Cys Ala Ala Asn Trp Ile Leu Arg Gly Thr Ser Phe Val
            980                 985                 990

Tyr Val Pro Ser Ala Leu Asn Pro Ala Asp Asp Pro Ser Arg Gly Arg
        995                 1000                1005

Leu Gly Leu Tyr Arg Pro Leu Leu Arg Leu Pro Phe Arg Pro Thr Thr
    1010                1015                1020

Gly Arg Thr Ser Leu Tyr Ala Val Ser Pro Ser Val Pro Ser His Leu
1025                1030                1035                1040

Pro Val Arg Val His Phe Ala Ser Pro Leu His Val Ala Trp Arg Pro
                1045                1050                1055

Pro

<210> SEQ ID NO 14
<211> LENGTH: 1404
<212> TYPE: PRT
<213> ORGANISM: Artificial Sequence
<220> FEATURE:
<223> OTHER INFORMATION: Synthetic sequence HBV epigraph subtype D
      sequence

<400> SEQUENCE: 14

Met Asp Ile Asp Pro Tyr Lys Glu Phe Gly Ala Thr Val Glu Leu Leu
1               5                   10                  15

Ser Phe Leu Pro Ser Asp Phe Phe Pro Ser Val Arg Asp Leu Leu Asp
            20                  25                  30

Thr Ala Ser Ala Leu Tyr Arg Glu Ala Leu Glu Ser Pro Glu His Cys
        35                  40                  45

Ser Pro His His Thr Ala Leu Arg Gln Ala Ile Leu Cys Trp Gly Glu
    50                  55                  60

Leu Met Thr Leu Ala Thr Trp Val Gly Gly Asn Leu Glu Asp Pro Ile
65                  70                  75                  80

Ser Arg Asp Leu Val Val Ser Tyr Val Asn Thr Asn Met Gly Leu Lys
                85                  90                  95

Phe Arg Gln Leu Leu Trp Phe His Ile Ser Cys Leu Thr Phe Gly Arg
            100                 105                 110

Glu Thr Val Ile Glu Tyr Leu Val Ser Phe Gly Val Trp Ile Arg Thr
        115                 120                 125

Pro Pro Ala Tyr Arg Pro Pro Asn Ala Pro Ile Leu Ser Thr Leu Pro
    130                 135                 140

Glu Thr Thr Val Val Arg Arg Arg Gly Arg Ser Pro Arg Arg Arg Thr
145                 150                 155                 160

Pro Ser Pro Arg Arg Arg Arg Ser Gln Ser Pro Arg Arg Arg Arg Ser
                165                 170                 175

Lys Ser Arg Glu Ser Gln Cys Met Gly Gln Asn Leu Ser Thr Ser Asn
            180                 185                 190

Pro Leu Gly Phe Phe Pro Asp His Gln Leu Asp Pro Ala Phe Arg Ala
        195                 200                 205

Asn Thr Ala Asn Pro Asp Trp Asp Phe Asn Pro Asn Lys Asp Thr Trp
    210                 215                 220
```

-continued

```
Pro Asp Ala Asn Lys Val Gly Ala Gly Ala Phe Gly Leu Gly Phe Thr
225                 230                 235                 240

Pro Pro His Gly Gly Leu Leu Gly Trp Ser Pro Gln Ala Gln Gly Ile
            245                 250                 255

Leu Gln Thr Leu Pro Ala Asn Pro Pro Ala Ser Thr Asn Arg Gln
        260                 265                 270

Ser Gly Arg Gln Pro Thr Pro Leu Ser Pro Leu Arg Asn Thr His
    275                 280                 285

Pro Gln Ala Met Gln Trp Asn Ser Thr Thr Phe His Gln Thr Leu Gln
290                 295                 300

Asp Pro Arg Val Arg Gly Leu Tyr Phe Pro Ala Gly Gly Ser Ser Ser
305                 310                 315                 320

Gly Thr Val Asn Pro Val Pro Thr Thr Val Ser His Ile Ser Ser Ile
                325                 330                 335

Phe Ser Arg Ile Gly Asp Pro Ala Leu Asn Met Glu Asn Ile Thr Ser
                340                 345                 350

Gly Phe Leu Gly Pro Leu Leu Val Leu Gln Ala Gly Phe Phe Leu Leu
            355                 360                 365

Thr Arg Ile Leu Thr Ile Pro Gln Ser Leu Asp Ser Trp Trp Thr Ser
370                 375                 380

Leu Asn Phe Leu Gly Gly Thr Thr Val Cys Leu Gly Gln Asn Ser Gln
385                 390                 395                 400

Ser Pro Thr Ser Asn His Ser Pro Thr Ser Cys Pro Pro Thr Cys Pro
                405                 410                 415

Gly Tyr Arg Trp Met Cys Leu Arg Arg Phe Ile Ile Phe Leu Phe Ile
            420                 425                 430

Leu Leu Leu Cys Leu Ile Phe Leu Leu Val Leu Leu Asp Tyr Gln Gly
            435                 440                 445

Met Leu Pro Val Cys Pro Leu Ile Pro Gly Ser Ser Thr Thr Ser Thr
450                 455                 460

Gly Pro Cys Arg Thr Cys Thr Thr Pro Ala Gln Gly Thr Ser Met Tyr
465                 470                 475                 480

Pro Ser Cys Cys Cys Thr Lys Pro Ser Asp Gly Asn Cys Thr Cys Ile
                485                 490                 495

Pro Ile Pro Ser Ser Trp Ala Phe Gly Lys Phe Leu Trp Glu Trp Ala
            500                 505                 510

Ser Ala Arg Phe Ser Trp Leu Ser Leu Leu Val Pro Phe Val Gln Trp
            515                 520                 525

Phe Val Gly Leu Ser Pro Thr Val Trp Leu Ser Val Ile Trp Met Met
530                 535                 540

Trp Tyr Trp Gly Pro Ser Leu Tyr Ser Ile Leu Ser Pro Phe Leu Pro
545                 550                 555                 560

Leu Leu Pro Ile Phe Phe Cys Leu Trp Val Tyr Ile Met Pro Leu Ser
                565                 570                 575

Tyr Gln His Phe Arg Arg Leu Leu Leu Leu Asp Asp Glu Ala Gly Pro
            580                 585                 590

Leu Glu Glu Glu Leu Pro Arg Leu Ala Asp Glu Gly Leu Asn Arg Arg
            595                 600                 605

Val Ala Glu Asp Leu Asn Leu Gly Asn Leu Asn Val Ser Ile Pro Trp
            610                 615                 620

Thr His Lys Val Gly Asn Phe Thr Gly Leu Tyr Ser Ser Thr Val Pro
625                 630                 635                 640

Val Phe Asn Pro His Trp Lys Thr Pro Ser Phe Pro Asn Ile His Leu
```

```
                    645                 650                 655
His Gln Asp Ile Ile Lys Lys Cys Glu Gln Phe Val Gly Pro Leu Thr
            660                 665                 670

Val Asn Glu Lys Arg Arg Leu Gln Leu Ile Met Pro Ala Arg Phe Tyr
            675                 680                 685

Pro Asn Val Thr Lys Tyr Leu Pro Leu Asp Lys Gly Ile Lys Pro Tyr
            690                 695                 700

Tyr Pro Glu His Leu Val Asn His Tyr Phe Gln Thr Arg His Tyr Leu
705                 710                 715                 720

His Thr Leu Trp Lys Ala Gly Ile Leu Tyr Lys Arg Glu Thr Thr His
                725                 730                 735

Ser Ala Ser Phe Cys Gly Ser Pro Tyr Ser Trp Gln Glu Leu Gln
            740                 745                 750

His Gly Ala Glu Ser Phe His Gln Gln Ser Ser Gly Ile Leu Ser Arg
                755                 760                 765

Pro Pro Val Gly Ser Ser Leu Gln Ser Lys His Arg Lys Ser Arg Leu
            770                 775                 780

Gly Leu Gln Ser Gln Gln Gly His Leu Ala Arg Arg Gln Gln Gly Arg
785                 790                 795                 800

Ser Trp Ser Ile Arg Ala Gly Ile His Pro Thr Ala Arg Arg Pro Phe
                805                 810                 815

Gly Val Glu Pro Ser Gly Ser Gly His Thr Thr Asn Leu Ala Ser Lys
            820                 825                 830

Ser Ala Ser Cys Leu Tyr Gln Ser Pro Val Arg Lys Ala Ala Tyr Pro
            835                 840                 845

Ala Val Ser Thr Phe Glu Lys His Ser Ser Ser Gly His Ala Val Glu
850                 855                 860

Leu His Asn Leu Pro Pro Asn Ser Ala Arg Ser Gln Ser Glu Arg Pro
865                 870                 875                 880

Val Phe Pro Cys Trp Trp Leu Gln Phe Arg Asn Ser Lys Pro Cys Ser
                885                 890                 895

Asp Tyr Cys Leu Ser His Ile Val Asn Leu Leu Glu Asp Trp Gly Pro
                900                 905                 910

Cys Ala Glu His Gly Glu His His Ile Arg Ile Pro Arg Thr Pro Ala
            915                 920                 925

Arg Val Thr Gly Gly Val Phe Leu Val Asp Lys Asn Pro His Asn Thr
            930                 935                 940

Ala Glu Ser Arg Leu Val Val Asp Phe Ser Gln Phe Ser Arg Gly Asn
945                 950                 955                 960

Tyr Arg Val Ser Trp Pro Lys Phe Ala Val Pro Asn Leu Gln Ser Leu
                965                 970                 975

Thr Asn Leu Leu Ser Ser Asn Leu Ser Trp Leu Ser Leu Asp Val Ser
                980                 985                 990

Ala Ala Phe Tyr His Leu Pro Leu His Pro Ala Ala Met Pro His Leu
            995                 1000                1005

Leu Val Gly Ser Ser Gly Leu Ser Arg Tyr Val Ala Arg Leu Ser Ser
            1010                1015                1020

Asn Ser Arg Ile Phe Asn His Gln His Gly Thr Met Gln Asn Leu His
1025                1030                1035                1040

Asp Ser Cys Ser Arg Asn Leu Tyr Val Ser Leu Leu Leu Leu Tyr Gln
                1045                1050                1055

Thr Phe Gly Arg Lys Leu His Leu Tyr Ser His Pro Ile Ile Leu Gly
            1060                1065                1070
```

Phe Arg Lys Ile Pro Met Gly Val Gly Leu Ser Pro Phe Leu Leu Ala
1075 1080 1085

Gln Phe Thr Ser Ala Ile Cys Ser Val Val Arg Arg Ala Phe Pro His
1090 1095 1100

Cys Leu Ala Phe Ser Tyr Met Asp Asp Val Val Leu Gly Ala Lys Ser
1105 1110 1115 1120

Val Gln His Leu Glu Ser Leu Phe Thr Ala Val Thr Asn Phe Leu Leu
1125 1130 1135

Ser Leu Gly Ile His Leu Asn Pro Asn Lys Thr Lys Arg Trp Gly Tyr
1140 1145 1150

Ser Leu His Phe Met Gly Tyr Val Ile Gly Cys Tyr Gly Ser Leu Pro
1155 1160 1165

Gln Asp His Ile Ile Gln Lys Ile Lys Glu Cys Phe Arg Lys Leu Pro
1170 1175 1180

Val Asn Arg Pro Ile Asp Trp Lys Val Cys Gln Arg Ile Val Gly Leu
1185 1190 1195 1200

Leu Gly Phe Ala Ala Pro Phe Thr Gln Cys Gly Tyr Pro Ala Leu Met
1205 1210 1215

Pro Leu Tyr Ala Cys Ile Gln Ser Lys Gln Ala Phe Thr Phe Ser Pro
1220 1225 1230

Thr Tyr Lys Ala Phe Leu Cys Lys Gln Tyr Leu Asn Leu Tyr Pro Val
1235 1240 1245

Ala Arg Gln Arg Pro Gly Leu Cys Gln Val Phe Ala Asp Ala Thr Pro
1250 1255 1260

Thr Gly Trp Gly Leu Val Met Gly His Gln Arg Met Arg Gly Thr Phe
1265 1270 1275 1280

Leu Ala Pro Leu Pro Ile His Thr Ala Glu Leu Leu Ala Ala Cys Phe
1285 1290 1295

Ala Arg Ser Arg Ser Gly Ala Asn Ile Leu Gly Thr Asp Asn Ser Val
1300 1305 1310

Val Leu Ser Arg Lys Tyr Thr Ser Phe Pro Trp Leu Leu Gly Cys Ala
1315 1320 1325

Ala Asn Trp Ile Leu Arg Gly Thr Ser Phe Val Tyr Val Pro Ser Ala
1330 1335 1340

Leu Asn Pro Ala Asp Asp Pro Ser Arg Gly Arg Leu Gly Leu Ser Arg
1345 1350 1355 1360

Pro Leu Leu Arg Leu Pro Phe Arg Pro Thr Thr Gly Arg Thr Ser Leu
1365 1370 1375

Tyr Ala Asp Ser Pro Ser Val Pro Ser His Leu Pro Asp Arg Val His
1380 1385 1390

Phe Ala Ser Pro Leu His Val Ala Trp Arg Pro Pro
1395 1400

<210> SEQ ID NO 15
<211> LENGTH: 1396
<212> TYPE: PRT
<213> ORGANISM: Artificial Sequence
<220> FEATURE:
<223> OTHER INFORMATION: Synthetic sequence HBV epigraph subtype D sequence_SPC reordered

<400> SEQUENCE: 15

Met Gly Gln Asn Leu Ser Thr Ser Asn Pro Leu Gly Phe Phe Pro Asp
1 5 10 15

His Gln Leu Asp Pro Ala Phe Arg Ala Asn Thr Ala Asn Pro Asp Trp

```
                20                  25                  30
Asp Phe Asn Pro Asn Lys Asp Thr Trp Pro Asp Ala Asn Lys Val Gly
                35                  40                  45

Ala Gly Ala Phe Gly Leu Gly Phe Thr Pro Pro His Gly Gly Leu Leu
                50                  55                  60

Gly Trp Ser Pro Gln Ala Gln Gly Ile Leu Gln Thr Leu Pro Ala Asn
 65                  70                  75                  80

Pro Pro Pro Ala Ser Thr Asn Arg Gln Ser Gly Arg Gln Pro Thr Pro
                85                  90                  95

Leu Ser Pro Pro Leu Arg Asn Thr His Pro Gln Ala Gln Trp Asn Ser
                100                 105                 110

Thr Thr Phe His Gln Thr Leu Gln Asp Pro Arg Val Arg Gly Leu Tyr
                115                 120                 125

Phe Pro Ala Gly Gly Ser Ser Gly Thr Val Asn Pro Val Pro Thr
                130                 135                 140

Thr Val Ser His Ile Ser Ser Ile Phe Ser Arg Ile Gly Asp Pro Ala
145                 150                 155                 160

Leu Asn Glu Asn Ile Thr Ser Gly Phe Leu Gly Pro Leu Leu Val Leu
                165                 170                 175

Gln Ala Gly Phe Phe Leu Leu Thr Arg Ile Leu Thr Ile Pro Gln Ser
                180                 185                 190

Leu Asp Ser Trp Trp Thr Ser Leu Asn Phe Leu Gly Gly Thr Thr Val
                195                 200                 205

Cys Leu Gly Gln Asn Ser Gln Ser Pro Thr Ser Asn His Ser Pro Thr
                210                 215                 220

Ser Cys Pro Pro Thr Cys Pro Gly Tyr Arg Trp Met Cys Leu Arg Arg
225                 230                 235                 240

Phe Ile Ile Phe Leu Phe Ile Leu Leu Leu Cys Leu Ile Phe Leu Leu
                245                 250                 255

Val Leu Leu Asp Tyr Gln Gly Met Leu Pro Val Cys Pro Leu Ile Pro
                260                 265                 270

Gly Ser Ser Thr Thr Ser Thr Gly Pro Cys Arg Thr Cys Thr Thr Pro
                275                 280                 285

Ala Gln Gly Thr Ser Met Tyr Pro Ser Cys Cys Cys Thr Lys Pro Ser
                290                 295                 300

Asp Gly Asn Cys Thr Cys Ile Pro Ile Pro Ser Ser Trp Ala Phe Gly
305                 310                 315                 320

Lys Phe Leu Trp Glu Trp Ala Ser Ala Arg Phe Ser Trp Leu Ser Leu
                325                 330                 335

Leu Val Pro Phe Val Gln Trp Phe Val Gly Leu Ser Pro Thr Val Trp
                340                 345                 350

Leu Ser Val Ile Trp Met Met Trp Tyr Trp Gly Pro Ser Leu Tyr Ser
                355                 360                 365

Ile Leu Ser Pro Phe Leu Pro Leu Leu Pro Ile Phe Phe Cys Leu Trp
                370                 375                 380

Val Tyr Ile Pro Leu Ser Tyr Gln His Phe Arg Arg Leu Leu Leu Leu
385                 390                 395                 400

Asp Asp Glu Ala Gly Pro Leu Glu Glu Glu Leu Pro Arg Leu Ala Asp
                405                 410                 415

Glu Gly Leu Asn Arg Arg Val Ala Glu Asp Leu Asn Leu Gly Asn Leu
                420                 425                 430

Asn Val Ser Ile Pro Trp Thr His Lys Val Gly Asn Phe Thr Gly Leu
                435                 440                 445
```

```
Tyr Ser Ser Thr Val Pro Val Phe Asn Pro His Trp Lys Thr Pro Ser
    450                 455                 460

Phe Pro Asn Ile His Leu His Gln Asp Ile Ile Lys Lys Cys Glu Gln
465                 470                 475                 480

Phe Val Gly Pro Leu Thr Val Asn Glu Lys Arg Leu Gln Leu Ile
                485                 490                 495

Met Pro Ala Arg Phe Tyr Pro Asn Val Thr Lys Tyr Leu Pro Leu Asp
            500                 505                 510

Lys Gly Ile Lys Pro Tyr Tyr Pro Glu His Leu Val Asn His Tyr Phe
                515                 520                 525

Gln Thr Arg His Tyr Leu His Thr Leu Trp Lys Ala Gly Ile Leu Tyr
    530                 535                 540

Lys Arg Glu Thr Thr His Ser Ala Ser Phe Cys Gly Ser Pro Tyr Ser
545                 550                 555                 560

Trp Glu Gln Glu Leu Gln His Gly Ala Glu Ser Phe His Gln Ser
                565                 570                 575

Ser Gly Ile Leu Ser Arg Pro Pro Val Gly Ser Ser Leu Gln Ser Lys
            580                 585                 590

His Arg Lys Ser Arg Leu Gly Leu Gln Ser Gln Gln Gly His Leu Ala
    595                 600                 605

Arg Arg Gln Gln Gly Arg Ser Trp Ser Ile Arg Ala Gly Ile His Pro
    610                 615                 620

Thr Ala Arg Arg Pro Phe Gly Val Glu Pro Ser Gly Ser Gly His Thr
625                 630                 635                 640

Thr Asn Leu Ala Ser Lys Ser Ala Ser Cys Leu Tyr Gln Ser Pro Val
                645                 650                 655

Arg Lys Ala Ala Tyr Pro Ala Val Ser Thr Phe Glu Lys His Ser Ser
                660                 665                 670

Ser Gly His Ala Val Glu Leu His Asn Leu Pro Pro Asn Ser Ala Arg
            675                 680                 685

Ser Gln Ser Glu Arg Pro Val Phe Pro Cys Trp Trp Leu Gln Phe Arg
    690                 695                 700

Asn Ser Lys Pro Cys Ser Asp Tyr Cys Leu Ser His Ile Val Asn Leu
705                 710                 715                 720

Leu Glu Asp Trp Gly Pro Cys Ala Glu His Gly Glu His His Ile Arg
                725                 730                 735

Ile Pro Arg Thr Pro Ala Arg Val Thr Gly Gly Val Phe Leu Val Asp
            740                 745                 750

Lys Asn Pro His Asn Thr Ala Glu Ser Arg Leu Val Asp Phe Ser
    755                 760                 765

Gln Phe Ser Arg Gly Asn Tyr Arg Val Ser Trp Pro Lys Phe Ala Val
    770                 775                 780

Pro Asn Leu Gln Ser Leu Thr Asn Leu Leu Ser Ser Asn Leu Ser Trp
785                 790                 795                 800

Leu Ser Leu Asp Val Ser Ala Ala Phe Tyr His Leu Pro Leu His Pro
                805                 810                 815

Ala Ala Met Pro His Leu Leu Val Gly Ser Ser Gly Leu Ser Arg Tyr
            820                 825                 830

Val Ala Arg Leu Ser Ser Asn Ser Arg Ile Phe Asn His Gln His Gly
    835                 840                 845

Thr Met Gln Asn Leu His Asp Ser Cys Ser Arg Asn Leu Tyr Val Ser
    850                 855                 860
```

-continued

```
Leu Leu Leu Leu Tyr Gln Thr Phe Gly Arg Lys Leu His Leu Tyr Ser
865                 870                 875                 880

His Pro Ile Ile Leu Gly Phe Arg Lys Ile Pro Met Gly Val Gly Leu
                885                 890                 895

Ser Pro Phe Leu Leu Ala Gln Phe Thr Ser Ala Ile Cys Ser Val Val
            900                 905                 910

Arg Arg Ala Phe Pro His Cys Leu Ala Phe Ser Val Val Leu Gly Ala
        915                 920                 925

Lys Ser Val Gln His Leu Glu Ser Leu Phe Thr Ala Val Thr Asn Phe
    930                 935                 940

Leu Leu Ser Leu Gly Ile His Leu Asn Pro Asn Lys Thr Lys Arg Trp
945                 950                 955                 960

Gly Tyr Ser Leu His Phe Met Gly Tyr Val Ile Gly Cys Tyr Gly Ser
                965                 970                 975

Leu Pro Gln Asp His Ile Ile Gln Lys Ile Lys Glu Cys Phe Arg Lys
            980                 985                 990

Leu Pro Val Asn Arg Pro Ile Asp Trp Lys Val Cys Gln Arg Ile Val
        995                 1000                1005

Gly Leu Leu Gly Phe Ala Ala Pro Phe Thr Gln Cys Gly Tyr Pro Ala
        1010                1015                1020

Leu Met Pro Leu Tyr Ala Cys Ile Gln Ser Lys Gln Ala Phe Thr Phe
1025                1030                1035                1040

Ser Pro Thr Tyr Lys Ala Phe Leu Cys Lys Gln Tyr Leu Asn Leu Tyr
                1045                1050                1055

Pro Val Ala Arg Gln Arg Pro Gly Leu Cys Gln Val Phe Ala Ala Ala
            1060                1065                1070

Thr Pro Thr Gly Trp Gly Leu Val Met Gly His Gln Arg Met Arg Gly
        1075                1080                1085

Thr Phe Leu Ala Pro Leu Pro Ile His Thr Ala Ala Leu Leu Ala Ala
        1090                1095                1100

Cys Phe Ala Arg Ser Arg Ser Gly Ala Asn Ile Leu Gly Thr Val Asn
1105                1110                1115                1120

Ser Val Val Leu Ser Arg Lys Tyr Thr Ser Phe Pro Trp Leu Leu Gly
                1125                1130                1135

Cys Ala Ala Asn Trp Ile Leu Arg Gly Thr Ser Phe Val Tyr Val Pro
            1140                1145                1150

Ser Ala Leu Asn Pro Ala Ala Asp Pro Ser Arg Gly Arg Leu Gly Leu
        1155                1160                1165

Ser Arg Pro Leu Leu Arg Leu Pro Phe Arg Pro Thr Thr Gly Arg Thr
        1170                1175                1180

Ser Leu Tyr Ala Asp Ser Pro Ser Val Pro Ser His Leu Pro Asp Arg
1185                1190                1195                1200

Val His Phe Ala Ser Pro Leu His Val Ala Trp Arg Pro Pro Asp Ile
                1205                1210                1215

Asp Pro Tyr Lys Glu Phe Gly Ala Thr Val Glu Leu Leu Ser Phe Leu
            1220                1225                1230

Pro Ser Asp Phe Phe Pro Ser Val Arg Asp Leu Leu Asp Thr Ala Ser
        1235                1240                1245

Ala Leu Tyr Arg Glu Ala Leu Glu Ser Pro Glu His Cys Ser Pro His
        1250                1255                1260

His Thr Ala Leu Arg Gln Ala Ile Leu Cys Trp Gly Glu Leu Met Thr
1265                1270                1275                1280

Leu Ala Thr Trp Val Gly Gly Asn Leu Glu Asp Pro Ile Ser Arg Asp
```

```
                    1285                1290                1295
Leu Val Val Ser Tyr Val Asn Thr Asn Met Gly Leu Lys Phe Arg Gln
            1300                1305                1310
Leu Leu Trp Phe His Ile Ser Cys Leu Thr Phe Gly Arg Glu Thr Val
            1315                1320                1325
Ile Glu Tyr Leu Val Ser Phe Gly Val Trp Ile Arg Thr Pro Pro Ala
            1330                1335                1340
Tyr Arg Pro Pro Asn Ala Pro Ile Leu Ser Thr Leu Pro Glu Thr Thr
1345                1350                1355                1360
Val Val Arg Arg Arg Gly Arg Ser Pro Arg Arg Thr Pro Ser Pro
                1365                1370                1375
Arg Arg Arg Arg Ser Gln Ser Pro Arg Arg Arg Ser Lys Ser Arg
            1380                1385                1390
Glu Ser Gln Cys
        1395

<210> SEQ ID NO 16
<211> LENGTH: 183
<212> TYPE: PRT
<213> ORGANISM: Artificial Sequence
<220> FEATURE:
<223> OTHER INFORMATION: Synthetic sequence EpiD core(C)protein

<400> SEQUENCE: 16

Met Asp Ile Asp Pro Tyr Lys Glu Phe Gly Ala Thr Val Glu Leu Leu
1               5                   10                  15
Ser Phe Leu Pro Ser Asp Phe Phe Pro Ser Val Arg Asp Leu Leu Asp
            20                  25                  30
Thr Ala Ser Ala Leu Tyr Arg Glu Ala Leu Glu Ser Pro Glu His Cys
        35                  40                  45
Ser Pro His His Thr Ala Leu Arg Gln Ala Ile Leu Cys Trp Gly Glu
    50                  55                  60
Leu Met Thr Leu Ala Thr Trp Val Gly Gly Asn Leu Glu Asp Pro Ile
65                  70                  75                  80
Ser Arg Asp Leu Val Val Ser Tyr Val Asn Thr Asn Met Gly Leu Lys
                85                  90                  95
Phe Arg Gln Leu Leu Trp Phe His Ile Ser Cys Leu Thr Phe Gly Arg
            100                 105                 110
Glu Thr Val Ile Glu Tyr Leu Val Ser Phe Gly Val Trp Ile Arg Thr
        115                 120                 125
Pro Pro Ala Tyr Arg Pro Pro Asn Ala Pro Ile Leu Ser Thr Leu Pro
    130                 135                 140
Glu Thr Thr Val Val Arg Arg Arg Gly Arg Ser Pro Arg Arg Arg Thr
145                 150                 155                 160
Pro Ser Pro Arg Arg Arg Arg Ser Gln Ser Pro Arg Arg Arg Arg Ser
                165                 170                 175
Lys Ser Arg Glu Ser Gln Cys
            180

<210> SEQ ID NO 17
<211> LENGTH: 108
<212> TYPE: PRT
<213> ORGANISM: Artificial Sequence
<220> FEATURE:
<223> OTHER INFORMATION: Synthetic sequence EpiD PreS1 domain

<400> SEQUENCE: 17
```

```
Met Gly Gln Asn Leu Ser Thr Ser Asn Pro Leu Gly Phe Phe Pro Asp
1               5                   10                  15

His Gln Leu Asp Pro Ala Phe Arg Ala Asn Thr Ala Asn Pro Asp Trp
                20                  25                  30

Asp Phe Asn Pro Asn Lys Asp Thr Trp Pro Asp Ala Asn Lys Val Gly
            35                  40                  45

Ala Gly Ala Phe Gly Leu Gly Phe Thr Pro Pro His Gly Gly Leu Leu
        50                  55                  60

Gly Trp Ser Pro Gln Ala Gln Gly Ile Leu Gln Thr Leu Pro Ala Asn
65                  70                  75                  80

Pro Pro Pro Ala Ser Thr Asn Arg Gln Ser Gly Arg Gln Pro Thr Pro
                85                  90                  95

Leu Ser Pro Pro Leu Arg Asn Thr His Pro Gln Ala
            100                 105
```

<210> SEQ ID NO 18
<211> LENGTH: 55
<212> TYPE: PRT
<213> ORGANISM: Artificial Sequence
<220> FEATURE:
<223> OTHER INFORMATION: Synthetic sequence EpiD PreS2 domain

<400> SEQUENCE: 18

```
Met Gln Trp Asn Ser Thr Thr Phe His Gln Thr Leu Gln Asp Pro Arg
1               5                   10                  15

Val Arg Gly Leu Tyr Phe Pro Ala Gly Gly Ser Ser Ser Gly Thr Val
                20                  25                  30

Asn Pro Val Pro Thr Thr Val Ser Pro Ile Ser Ser Ile Phe Ser Arg
            35                  40                  45

Ile Gly Asp Pro Ala Leu Asn
        50                  55
```

<210> SEQ ID NO 19
<211> LENGTH: 226
<212> TYPE: PRT
<213> ORGANISM: Artificial Sequence
<220> FEATURE:
<223> OTHER INFORMATION: Synthetic sequence EpiD Surface Antigen (S)

<400> SEQUENCE: 19

```
Met Glu Asn Ile Thr Ser Gly Phe Leu Gly Pro Leu Leu Val Leu Gln
1               5                   10                  15

Ala Gly Phe Phe Leu Leu Thr Arg Ile Leu Thr Ile Pro Gln Ser Leu
                20                  25                  30

Asp Ser Trp Trp Thr Ser Leu Asn Phe Leu Gly Gly Thr Thr Val Cys
            35                  40                  45

Leu Gly Gln Asn Ser Gln Ser Pro Thr Ser Asn His Ser Pro Thr Ser
        50                  55                  60

Cys Pro Pro Thr Cys Pro Gly Tyr Arg Trp Met Cys Leu Arg Arg Phe
65                  70                  75                  80

Ile Ile Phe Leu Phe Ile Leu Leu Cys Leu Ile Phe Leu Leu Val
                85                  90                  95

Leu Leu Asp Tyr Gln Gly Met Leu Pro Val Cys Pro Leu Ile Pro Gly
            100                 105                 110

Ser Ser Thr Thr Ser Thr Gly Pro Cys Arg Thr Cys Thr Thr Pro Ala
        115                 120                 125

Gln Gly Thr Ser Met Tyr Pro Ser Cys Cys Cys Thr Lys Pro Ser Asp
            130                 135                 140
```

-continued

```
Gly Asn Cys Thr Cys Ile Pro Ile Pro Ser Ser Trp Ala Phe Gly Lys
145                 150                 155                 160

Phe Leu Trp Glu Trp Ala Ser Ala Arg Phe Ser Trp Leu Ser Leu Leu
                165                 170                 175

Val Pro Phe Val Gln Trp Phe Val Gly Leu Ser Pro Thr Val Trp Leu
            180                 185                 190

Ser Val Ile Trp Met Met Trp Tyr Trp Gly Pro Ser Leu Tyr Ser Ile
            195                 200                 205

Leu Ser Pro Phe Leu Pro Leu Leu Pro Ile Phe Phe Cys Leu Trp Val
        210                 215                 220

Tyr Ile
225

<210> SEQ ID NO 20
<211> LENGTH: 832
<212> TYPE: PRT
<213> ORGANISM: Artificial Sequence
<220> FEATURE:
<223> OTHER INFORMATION: Synthetic sequence EpiD polymerase (P)

<400> SEQUENCE: 20

Met Pro Leu Ser Tyr Gln His Phe Arg Arg Leu Leu Leu Leu Asp Asp
1               5                   10                  15

Glu Ala Gly Pro Leu Glu Glu Leu Pro Arg Leu Ala Asp Glu Gly Gly
                20                  25                  30

Leu Asn Arg Arg Val Ala Glu Asp Leu Asn Leu Gly Asn Leu Asn Val
            35                  40                  45

Ser Ile Pro Trp Thr His Lys Val Gly Asn Phe Thr Gly Leu Tyr Ser
50                  55                  60

Ser Thr Val Pro Val Phe Asn Pro His Trp Lys Thr Pro Ser Phe Pro
65                  70                  75                  80

Asn Ile His Leu His Gln Asp Ile Ile Lys Lys Cys Glu Gln Phe Val
                85                  90                  95

Gly Pro Leu Thr Val Asn Glu Lys Arg Arg Leu Gln Leu Ile Met Pro
                100                 105                 110

Ala Arg Phe Tyr Pro Asn Val Thr Lys Tyr Leu Pro Leu Asp Lys Gly
            115                 120                 125

Ile Lys Pro Tyr Tyr Pro Glu His Leu Val Asn His Tyr Phe Gln Thr
        130                 135                 140

Arg His Tyr Leu His Thr Leu Trp Lys Ala Gly Ile Leu Tyr Lys Arg
145                 150                 155                 160

Glu Thr Thr His Ser Ala Ser Phe Cys Gly Ser Pro Tyr Ser Trp Glu
                165                 170                 175

Gln Glu Leu Gln His Gly Ala Glu Ser Phe His Gln Ser Ser Gly
                180                 185                 190

Ile Leu Ser Arg Pro Pro Val Gly Ser Ser Leu Gln Ser Lys His Arg
            195                 200                 205

Lys Ser Arg Leu Gly Leu Gln Ser Gln Gln Gly His Leu Ala Arg Arg
        210                 215                 220

Gln Gln Gly Arg Ser Trp Ser Ile Arg Ala Gly Ile His Pro Thr Ala
225                 230                 235                 240

Arg Arg Pro Phe Gly Val Glu Pro Ser Gly Ser Gly His Thr Thr Asn
                245                 250                 255

Leu Ala Ser Lys Ser Ala Ser Cys Leu Tyr Gln Ser Pro Val Arg Lys
            260                 265                 270
```

```
Ala Ala Tyr Pro Ala Val Ser Thr Phe Glu Lys His Ser Ser Gly
        275                 280                 285

His Ala Val Glu Leu His Asn Leu Pro Pro Asn Ser Ala Arg Ser Gln
    290                 295                 300

Ser Glu Arg Pro Val Phe Pro Cys Trp Trp Leu Gln Phe Arg Asn Ser
305                 310                 315                 320

Lys Pro Cys Ser Asp Tyr Cys Leu Ser His Ile Val Asn Leu Leu Glu
                325                 330                 335

Asp Trp Gly Pro Cys Ala Glu His Gly Glu His His Ile Arg Ile Pro
            340                 345                 350

Arg Thr Pro Ala Arg Val Thr Gly Gly Val Phe Leu Val Asp Lys Asn
        355                 360                 365

Pro His Asn Thr Ala Glu Ser Arg Leu Val Val Asp Phe Ser Gln Phe
    370                 375                 380

Ser Arg Gly Asn Tyr Arg Val Ser Trp Pro Lys Phe Ala Val Pro Asn
385                 390                 395                 400

Leu Gln Ser Leu Thr Asn Leu Ser Ser Asn Leu Ser Trp Leu Ser
                405                 410                 415

Leu Asp Val Ser Ala Ala Phe Tyr His Leu Pro Leu His Pro Ala Ala
            420                 425                 430

Met Pro His Leu Leu Val Gly Ser Ser Gly Leu Ser Arg Tyr Val Ala
        435                 440                 445

Arg Leu Ser Ser Asn Ser Arg Ile Phe Asn His Gln His Gly Thr Met
    450                 455                 460

Gln Asn Leu His Asp Ser Cys Ser Arg Asn Leu Tyr Val Ser Leu Leu
465                 470                 475                 480

Leu Leu Tyr Gln Thr Phe Gly Arg Lys Leu His Leu Tyr Ser His Pro
                485                 490                 495

Ile Ile Leu Gly Phe Arg Lys Ile Pro Met Gly Val Gly Leu Ser Pro
            500                 505                 510

Phe Leu Leu Ala Gln Phe Thr Ser Ala Ile Cys Ser Val Val Arg Arg
        515                 520                 525

Ala Phe Pro His Cys Leu Ala Phe Ser Tyr Met Asp Asp Val Val Leu
    530                 535                 540

Gly Ala Lys Ser Val Gln His Leu Glu Ser Leu Phe Thr Ala Val Thr
545                 550                 555                 560

Asn Phe Leu Leu Ser Leu Gly Ile His Leu Asn Pro Asn Lys Thr Lys
                565                 570                 575

Arg Trp Gly Tyr Ser Leu His Phe Met Gly Tyr Val Ile Gly Cys Tyr
            580                 585                 590

Gly Ser Leu Pro Gln Asp His Ile Ile Gln Lys Ile Lys Glu Cys Phe
        595                 600                 605

Arg Lys Leu Pro Val Asn Arg Pro Ile Asp Trp Lys Val Cys Gln Arg
    610                 615                 620

Ile Val Gly Leu Leu Gly Phe Ala Ala Pro Phe Thr Gln Cys Gly Tyr
625                 630                 635                 640

Pro Ala Leu Met Pro Leu Tyr Ala Cys Ile Gln Ser Lys Gln Ala Phe
                645                 650                 655

Thr Phe Ser Pro Thr Tyr Lys Ala Phe Leu Cys Lys Gln Tyr Leu Asn
            660                 665                 670

Leu Tyr Pro Val Ala Arg Gln Arg Pro Gly Leu Cys Gln Val Phe Ala
        675                 680                 685
```

```
Asp Ala Thr Pro Thr Gly Trp Gly Leu Val Met Gly His Gln Arg Met
    690             695                 700

Arg Gly Thr Phe Leu Ala Pro Leu Pro Ile His Thr Ala Glu Leu Leu
705             710                 715                 720

Ala Ala Cys Phe Ala Arg Ser Arg Ser Gly Ala Asn Ile Leu Gly Thr
                725                 730                 735

Asp Asn Ser Val Val Leu Ser Arg Lys Tyr Thr Ser Phe Pro Trp Leu
            740                 745                 750

Leu Gly Cys Ala Ala Asn Trp Ile Leu Arg Gly Thr Ser Phe Val Tyr
        755                 760                 765

Val Pro Ser Ala Leu Asn Pro Ala Asp Asp Pro Ser Arg Gly Arg Leu
770                 775                 780

Gly Leu Ser Arg Pro Leu Leu Arg Leu Pro Phe Arg Pro Thr Thr Gly
785             790                 795                 800

Arg Thr Ser Leu Tyr Ala Asp Ser Pro Ser Val Pro Ser His Leu Pro
                805                 810                 815

Asp Arg Val His Phe Ala Ser Pro Leu His Val Ala Trp Arg Pro Pro
            820                 825                 830

<210> SEQ ID NO 21
<211> LENGTH: 183
<212> TYPE: PRT
<213> ORGANISM: Artificial Sequence
<220> FEATURE:
<223> OTHER INFORMATION: Synthetic sequence Conserved region of EpiD
      core(C); shortened

<400> SEQUENCE: 21

Met Asp Ile Asp Pro Tyr Lys Glu Phe Gly Ala Thr Val Glu Leu Leu
1               5                   10                  15

Ser Phe Leu Pro Ser Asp Phe Phe Pro Ser Val Arg Asp Leu Leu Asp
            20                  25                  30

Thr Ala Ser Ala Leu Tyr Arg Glu Ala Leu Glu Ser Pro Glu His Cys
        35                  40                  45

Ser Pro His His Thr Ala Leu Arg Gln Ala Ile Leu Cys Trp Gly Glu
    50                  55                  60

Leu Met Thr Leu Ala Thr Trp Val Gly Gly Asn Leu Glu Asp Pro Ile
65              70                  75                  80

Ser Arg Asp Leu Val Val Ser Tyr Val Asn Thr Asn Met Gly Leu Lys
                85                  90                  95

Phe Arg Gln Leu Leu Trp Phe His Ile Ser Cys Leu Thr Phe Gly Arg
            100                 105                 110

Glu Thr Val Ile Glu Tyr Leu Val Ser Phe Gly Val Trp Ile Arg Thr
        115                 120                 125

Pro Pro Ala Tyr Arg Pro Pro Asn Ala Pro Ile Leu Ser Thr Leu Pro
    130                 135                 140

Glu Thr Thr Val Val Arg Arg Arg Gly Arg Ser Pro Arg Arg Arg Thr
145                 150                 155                 160

Pro Ser Pro Arg Arg Arg Arg Ser Gln Ser Pro Arg Arg Arg Arg Ser
                165                 170                 175

Lys Ser Arg Glu Ser Gln Cys
            180

<210> SEQ ID NO 22
<211> LENGTH: 475
<212> TYPE: PRT
<213> ORGANISM: Artificial Sequence
```

-continued

```
<220> FEATURE:
<223> OTHER INFORMATION: Synthetic sequence Conserved region of EpiD
      polymerase (P)

<400> SEQUENCE: 22

Val Thr Gly Gly Val Phe Leu Val Asp Lys Asn Pro His Asn Thr Ala
1               5                   10                  15

Glu Ser Arg Leu Val Val Asp Phe Ser Gln Phe Ser Arg Gly Asn Tyr
            20                  25                  30

Arg Val Ser Trp Pro Lys Phe Ala Val Pro Asn Leu Gln Ser Leu Thr
        35                  40                  45

Asn Leu Leu Ser Ser Asn Leu Ser Trp Leu Ser Leu Asp Val Ser Ala
50                  55                  60

Ala Phe Tyr His Leu Pro Leu His Pro Ala Met Pro His Leu Leu
65                  70                  75                  80

Val Gly Ser Ser Gly Leu Ser Arg Tyr Val Ala Arg Leu Ser Ser Asn
                85                  90                  95

Ser Arg Ile Phe Asn His Gln His Gly Thr Met Gln Asn Leu His Asp
            100                 105                 110

Ser Cys Ser Arg Asn Leu Tyr Val Ser Leu Leu Leu Tyr Gln Thr
        115                 120                 125

Phe Gly Arg Lys Leu His Leu Tyr Ser His Pro Ile Ile Leu Gly Phe
    130                 135                 140

Arg Lys Ile Pro Met Gly Val Gly Leu Ser Pro Phe Leu Leu Ala Gln
145                 150                 155                 160

Phe Thr Ser Ala Ile Cys Ser Val Val Arg Arg Ala Phe Pro His Cys
                165                 170                 175

Leu Ala Phe Ser Tyr Met Asp Asp Val Val Leu Gly Ala Lys Ser Val
            180                 185                 190

Gln His Leu Glu Ser Leu Phe Thr Ala Val Thr Asn Phe Leu Leu Ser
        195                 200                 205

Leu Gly Ile His Leu Asn Pro Asn Lys Thr Lys Arg Trp Gly Tyr Ser
    210                 215                 220

Leu His Phe Met Gly Tyr Val Ile Gly Cys Tyr Gly Ser Leu Pro Gln
225                 230                 235                 240

Asp His Ile Ile Gln Lys Ile Lys Glu Cys Phe Arg Lys Leu Pro Val
                245                 250                 255

Asn Arg Pro Ile Asp Trp Lys Val Cys Gln Arg Ile Val Gly Leu Leu
            260                 265                 270

Gly Phe Ala Ala Pro Phe Thr Gln Cys Gly Tyr Pro Ala Leu Met Pro
        275                 280                 285

Leu Tyr Ala Cys Ile Gln Ser Lys Gln Ala Phe Thr Phe Ser Pro Thr
    290                 295                 300

Tyr Lys Ala Phe Leu Cys Lys Gln Tyr Leu Asn Leu Tyr Pro Val Ala
305                 310                 315                 320

Arg Gln Arg Pro Gly Leu Cys Gln Val Phe Ala Asp Ala Thr Pro Thr
                325                 330                 335

Gly Trp Gly Leu Val Met Gly His Gln Arg Met Arg Gly Thr Phe Leu
            340                 345                 350

Ala Pro Leu Pro Ile His Thr Ala Glu Leu Leu Ala Ala Cys Phe Ala
        355                 360                 365

Arg Ser Arg Ser Gly Ala Asn Ile Leu Gly Thr Asp Asn Ser Val Val
    370                 375                 380

Leu Ser Arg Lys Tyr Thr Ser Phe Pro Trp Leu Leu Gly Cys Ala Ala
```

```
                        385                 390                 395                 400
Asn Trp Ile Leu Arg Gly Thr Ser Phe Val Tyr Val Pro Ser Ala Leu
                405                 410                 415

Asn Pro Ala Asp Asp Pro Ser Arg Gly Arg Leu Gly Leu Ser Arg Pro
                420                 425                 430

Leu Leu Arg Leu Pro Phe Arg Pro Thr Thr Gly Arg Thr Ser Leu Tyr
                435                 440                 445

Ala Asp Ser Pro Ser Val Pro Ser His Leu Pro Asp Arg Val His Phe
                450                 455                 460

Ala Ser Pro Leu His Val Ala Trp Arg Pro Pro
465                 470                 475

<210> SEQ ID NO 23
<211> LENGTH: 471
<212> TYPE: PRT
<213> ORGANISM: Artificial Sequence
<220> FEATURE:
<223> OTHER INFORMATION: Synthetic sequence Conserved region of EpiD
      mutant polymerase(P)with mutations from Table 1

<400> SEQUENCE: 23

Val Thr Gly Gly Val Phe Leu Val Asp Lys Asn Pro His Asn Thr Ala
1               5                   10                  15

Glu Ser Arg Leu Val Val Asp Phe Ser Gln Phe Ser Arg Gly Asn Tyr
                20                  25                  30

Arg Val Ser Trp Pro Lys Phe Ala Val Pro Asn Leu Gln Ser Leu Thr
            35                  40                  45

Asn Leu Leu Ser Ser Asn Leu Ser Trp Leu Ser Leu Asp Val Ser Ala
        50                  55                  60

Ala Phe Tyr His Leu Pro Leu His Pro Ala Ala Met Pro His Leu Leu
65                  70                  75                  80

Val Gly Ser Ser Gly Leu Ser Arg Tyr Val Ala Arg Leu Ser Ser Asn
                85                  90                  95

Ser Arg Ile Phe Asn His Gln His Gly Thr Met Gln Asn Leu His Asp
            100                 105                 110

Ser Cys Ser Arg Asn Leu Tyr Val Ser Leu Leu Leu Tyr Gln Thr
            115                 120                 125

Phe Gly Arg Lys Leu His Leu Tyr Ser His Pro Ile Ile Leu Gly Phe
        130                 135                 140

Arg Lys Ile Pro Met Gly Val Gly Leu Ser Pro Phe Leu Leu Ala Gln
145                 150                 155                 160

Phe Thr Ser Ala Ile Cys Ser Val Val Arg Arg Ala Phe Pro His Cys
                165                 170                 175

Leu Ala Phe Ser Val Val Leu Gly Ala Lys Ser Val Gln His Leu Glu
            180                 185                 190

Ser Leu Phe Thr Ala Val Thr Asn Phe Leu Leu Ser Leu Gly Ile His
        195                 200                 205

Leu Asn Pro Asn Lys Thr Lys Arg Trp Gly Tyr Ser Leu His Phe Met
        210                 215                 220

Gly Tyr Val Ile Gly Cys Tyr Gly Ser Leu Pro Gln Asp His Ile Ile
225                 230                 235                 240

Gln Lys Ile Lys Glu Cys Phe Arg Lys Leu Pro Val Asn Arg Pro Ile
                245                 250                 255

Asp Trp Lys Val Cys Gln Arg Ile Val Gly Leu Leu Gly Phe Ala Ala
            260                 265                 270
```

```
Pro Phe Thr Gln Cys Gly Tyr Pro Ala Leu Met Pro Leu Tyr Ala Cys
        275                 280                 285

Ile Gln Ser Lys Gln Ala Phe Thr Phe Ser Pro Thr Tyr Lys Ala Phe
290                 295                 300

Leu Cys Lys Gln Tyr Leu Asn Leu Tyr Pro Val Ala Arg Gln Arg Pro
305                 310                 315                 320

Gly Leu Cys Gln Val Phe Ala Ala Thr Pro Thr Gly Trp Gly Leu
            325                 330                 335

Val Met Gly His Gln Arg Met Arg Gly Thr Phe Leu Ala Pro Leu Pro
            340                 345                 350

Ile His Thr Ala Ala Leu Leu Ala Ala Cys Phe Ala Arg Ser Arg Ser
        355                 360                 365

Gly Ala Asn Ile Leu Gly Thr Val Asn Ser Val Val Leu Ser Arg Lys
370                 375                 380

Tyr Thr Ser Phe Pro Trp Leu Leu Gly Cys Ala Ala Asn Trp Ile Leu
385                 390                 395                 400

Arg Gly Thr Ser Phe Val Tyr Val Pro Ser Ala Leu Asn Pro Ala Ala
                405                 410                 415

Asp Pro Ser Arg Gly Arg Leu Gly Leu Ser Arg Pro Leu Leu Arg Leu
            420                 425                 430

Pro Phe Arg Pro Thr Thr Gly Arg Thr Ser Leu Tyr Ala Asp Ser Pro
        435                 440                 445

Ser Val Pro Ser His Leu Pro Asp Arg Val His Phe Ala Ser Pro Leu
            450                 455                 460

His Val Ala Trp Arg Pro Pro
465                 470

<210> SEQ ID NO 24
<211> LENGTH: 1410
<212> TYPE: PRT
<213> ORGANISM: Artificial Sequence
<220> FEATURE:
<223> OTHER INFORMATION: Synthetic sequence HBV EpiC SPC FL

<400> SEQUENCE: 24

Met Gly Gly Trp Ser Ser Lys Pro Arg Gln Gly Met Gly Thr Asn Leu
1               5                   10                  15

Ser Val Pro Asn Pro Leu Gly Phe Phe Pro Asp His Gln Leu Asp Pro
            20                  25                  30

Ala Phe Gly Ala Asn Ser Asn Asn Pro Asp Trp Asp Phe Asn Pro Asn
        35                  40                  45

Lys Asp His Trp Pro Glu Ala Asn Gln Val Gly Ala Gly Ala Phe Gly
50                  55                  60

Pro Gly Phe Thr Pro Pro His Gly Gly Leu Leu Gly Trp Ser Pro Gln
65                  70                  75                  80

Ala Gln Gly Ile Leu Thr Thr Val Pro Ala Ala Pro Pro Pro Ala Ser
                85                  90                  95

Thr Asn Arg Gln Ser Gly Arg Gln Pro Thr Pro Ile Ser Pro Pro Leu
            100                 105                 110

Arg Asp Ser His Pro Gln Ala Gln Trp Asn Ser Thr Thr Phe His Gln
        115                 120                 125

Ala Leu Leu Asp Pro Arg Val Arg Gly Leu Tyr Phe Pro Ala Gly Gly
    130                 135                 140

Ser Ser Ser Gly Thr Val Asn Pro Val Pro Thr Thr Ala Ser Pro Ile
145                 150                 155                 160
```

-continued

Ser Ser Ile Phe Ser Arg Thr Gly Asp Pro Ala Pro Asn Glu Asn Thr
            165                 170                 175

Thr Ser Gly Phe Leu Gly Pro Leu Leu Val Leu Gln Ala Gly Phe Phe
            180                 185                 190

Leu Leu Thr Arg Ile Leu Thr Ile Pro Gln Ser Leu Asp Ser Trp Trp
            195                 200                 205

Thr Ser Leu Asn Phe Leu Gly Gly Ala Pro Thr Cys Pro Gly Gln Asn
            210                 215                 220

Ser Gln Ser Pro Thr Ser Asn His Ser Pro Thr Ser Cys Pro Pro Ile
225                 230                 235                 240

Cys Pro Gly Tyr Arg Trp Met Cys Leu Arg Arg Phe Ile Ile Phe Leu
            245                 250                 255

Phe Ile Leu Leu Leu Cys Leu Ile Phe Leu Leu Val Leu Leu Asp Tyr
            260                 265                 270

Gln Gly Met Leu Pro Val Cys Pro Leu Leu Pro Gly Thr Ser Thr Thr
            275                 280                 285

Ser Thr Gly Pro Cys Lys Thr Cys Thr Ile Pro Ala Gln Gly Thr Ser
            290                 295                 300

Met Phe Pro Ser Cys Cys Cys Thr Lys Pro Ser Asp Gly Asn Cys Thr
305                 310                 315                 320

Cys Ile Pro Ile Pro Ser Ser Trp Ala Phe Ala Arg Phe Leu Trp Glu
            325                 330                 335

Trp Ala Ser Val Arg Phe Ser Trp Leu Ser Leu Leu Val Pro Phe Val
            340                 345                 350

Gln Trp Phe Val Gly Leu Ser Pro Thr Val Trp Leu Ser Val Ile Trp
            355                 360                 365

Met Met Trp Tyr Trp Gly Pro Ser Leu Tyr Asn Ile Leu Ser Pro Phe
370                 375                 380

Leu Pro Leu Leu Pro Ile Phe Phe Cys Leu Trp Val Tyr Ile Pro Leu
385                 390                 395                 400

Ser Tyr Gln His Phe Arg Lys Leu Leu Leu Leu Asp Asp Glu Ala Gly
            405                 410                 415

Pro Leu Glu Glu Glu Leu Pro Arg Leu Ala Asp Glu Gly Leu Asn Arg
            420                 425                 430

Arg Val Ala Glu Asp Leu Asn Leu Gly Asn Leu Asn Val Ser Ile Pro
            435                 440                 445

Trp Thr His Lys Val Gly Asn Phe Thr Gly Leu Tyr Ser Ser Thr Val
450                 455                 460

Pro Val Phe Asn Pro Glu Trp Gln Thr Pro Ser Phe Pro His Ile His
465                 470                 475                 480

Leu Gln Glu Asp Ile Ile Asn Arg Cys Gln Gln Tyr Val Gly Pro Leu
            485                 490                 495

Thr Val Asn Glu Lys Arg Arg Leu Lys Leu Ile Met Pro Ala Arg Phe
            500                 505                 510

Tyr Pro Asn Leu Thr Lys Tyr Leu Pro Leu Asp Lys Gly Ile Lys Pro
            515                 520                 525

Tyr Tyr Pro Glu His Ala Val Asn His Tyr Phe Lys Thr Arg His Tyr
530                 535                 540

Leu His Thr Leu Trp Lys Ala Gly Ile Leu Tyr Lys Arg Glu Thr Thr
545                 550                 555                 560

Arg Ser Ala Ser Phe Cys Gly Ser Pro Tyr Ser Trp Glu Gln Glu Leu
            565                 570                 575

Gln His Gly Arg Leu Val Phe Gln Thr Ser Thr Arg His Gly Asp Glu

-continued

```
                580             585                 590
    Ser Phe Cys Ser Gln Ser Ser Gly Ile Leu Ser Arg Ser Pro Val Gly
                595                 600                 605

Pro Cys Val Arg Ser Gln Leu Lys Gln Ser Arg Leu Gly Leu Gln Pro
    610                 615                 620

Gln Gln Gly Ser Leu Ala Arg Gly Lys Ser Gly Arg Ser Gly Ser Ile
    625                 630                 635                 640

Arg Ala Arg Val His Pro Thr Thr Arg Arg Ser Phe Gly Val Glu Pro
                    645                 650                 655

Ser Gly Ser Gly His Ile Asp Asn Ser Ala Ser Thr Ser Ser Cys
                    660                 665                 670

Leu His Gln Ser Ala Val Arg Lys Thr Ala Tyr Ser His Leu Ser Thr
                675                 680                 685

Ser Lys Arg Gln Ser Ser Gly His Ala Val Glu Leu His Asn Ile
    690                 695                 700

Pro Pro Ser Ser Ala Arg Ser Gln Ser Glu Gly Pro Ile Phe Ser Cys
    705                 710                 715                 720

Trp Trp Leu Gln Phe Arg Asn Ser Lys Pro Cys Ser Asp Tyr Cys Leu
                    725                 730                 735

Thr His Ile Val Asn Leu Leu Glu Asp Trp Gly Pro Cys Thr Glu His
                    740                 745                 750

Gly Glu His Asn Ile Arg Ile Pro Arg Thr Pro Ala Arg Val Thr Gly
                    755                 760                 765

Gly Val Phe Leu Val Asp Lys Asn Pro His Asn Thr Thr Glu Ser Arg
    770                 775                 780

Leu Val Val Asp Phe Ser Gln Phe Ser Arg Gly Ser Thr His Val Ser
    785                 790                 795                 800

Trp Pro Lys Phe Ala Val Pro Asn Leu Gln Ser Leu Thr Asn Leu Leu
                    805                 810                 815

Ser Ser Asn Leu Ser Trp Leu Ser Leu Asp Val Ser Ala Ala Phe Tyr
                    820                 825                 830

His Ile Pro Leu His Pro Ala Ala Met Pro His Leu Leu Val Gly Ser
                    835                 840                 845

Ser Gly Leu Pro Arg Tyr Val Ala Arg Leu Ser Ser Thr Ser Arg Asn
    850                 855                 860

Ile Asn Tyr Gln His Gly Thr Met Gln Asp Leu His Asp Ser Cys Ser
    865                 870                 875                 880

Arg Asn Leu Tyr Val Ser Leu Leu Leu Tyr Lys Thr Phe Gly Arg
                    885                 890                 895

Lys Leu His Leu Tyr Ser His Pro Ile Ile Leu Gly Phe Arg Lys Ile
                    900                 905                 910

Pro Met Gly Val Gly Leu Ser Pro Phe Leu Leu Ala Gln Phe Thr Ser
                    915                 920                 925

Ala Ile Cys Ser Val Val Arg Arg Ala Phe Pro His Cys Leu Ala Phe
    930                 935                 940

Ser Val Val Leu Gly Ala Lys Ser Val Gln His Leu Glu Ser Leu Phe
    945                 950                 955                 960

Thr Ser Ile Thr Asn Phe Leu Leu Ser Leu Gly Ile His Leu Asn Pro
                    965                 970                 975

Asn Lys Thr Lys Arg Trp Gly Tyr Ser Leu Asn Phe Met Gly Tyr Val
                    980                 985                 990

Ile Gly Ser Trp Gly Thr Leu Pro Gln Glu His Ile Val Leu Lys Ile
                    995                 1000                1005
```

-continued

```
Lys Gln Cys Phe Arg Lys Leu Pro Val Asn Arg Pro Ile Asp Trp Lys
    1010                1015                1020
Val Cys Gln Arg Ile Val Gly Leu Leu Gly Phe Ala Ala Pro Phe Thr
1025                1030                1035                1040
Gln Cys Gly Tyr Pro Ala Leu Met Pro Leu Tyr Ala Cys Ile Gln Ser
                1045                1050                1055
Lys Gln Ala Phe Thr Phe Ser Pro Thr Tyr Lys Ala Phe Leu Cys Lys
                1060                1065                1070
Gln Tyr Leu Asn Leu Tyr Pro Val Ala Arg Gln Arg Ser Gly Leu Cys
                1075                1080                1085
Gln Val Phe Ala Ala Ala Thr Pro Thr Gly Trp Gly Leu Ala Ile Gly
    1090                1095                1100
His Arg Arg Met Arg Gly Thr Phe Val Ala Pro Leu Pro Ile His Thr
1105                1110                1115                1120
Ala Ala Leu Leu Ala Ala Cys Phe Ala Arg Ser Arg Ser Gly Ala Lys
                1125                1130                1135
Leu Ile Gly Thr Val Asn Ser Val Val Leu Ser Arg Lys Tyr Thr Ser
                1140                1145                1150
Phe Pro Trp Leu Leu Gly Cys Ala Ala Asn Trp Ile Leu Arg Gly Thr
    1155                1160                1165
Ser Phe Val Tyr Val Pro Ser Ala Leu Asn Pro Ala Ala Asp Pro Ser
    1170                1175                1180
Arg Gly Arg Leu Gly Leu Tyr Arg Pro Leu Leu His Leu Pro Phe Arg
1185                1190                1195                1200
Pro Thr Thr Gly Arg Thr Ser Leu Tyr Ala Val Ser Pro Ser Val Pro
                1205                1210                1215
Ser His Leu Pro Asp Arg Val His Phe Ala Ser Pro Leu His Val Ala
                1220                1225                1230
Trp Arg Pro Pro Asp Ile Asp Pro Tyr Lys Glu Phe Gly Ala Ser Val
                1235                1240                1245
Glu Leu Leu Ser Phe Leu Pro Ser Asp Phe Phe Pro Ser Ile Arg Asp
    1250                1255                1260
Leu Leu Asp Thr Ala Ser Ala Leu Tyr Arg Glu Ala Leu Glu Ser Pro
1265                1270                1275                1280
Glu His Cys Ser Pro His His Thr Ala Leu Arg Gln Ala Ile Leu Cys
                1285                1290                1295
Trp Gly Glu Leu Met Asn Leu Ala Thr Trp Val Gly Ser Asn Leu Glu
                1300                1305                1310
Asp Pro Ala Ser Arg Glu Leu Val Val Ser Tyr Val Asn Val Asn Met
                1315                1320                1325
Gly Leu Lys Ile Arg Gln Leu Leu Trp Phe His Ile Ser Cys Leu Thr
                1330                1335                1340
Phe Gly Arg Glu Thr Val Leu Glu Tyr Leu Val Ser Phe Gly Val Trp
1345                1350                1355                1360
Ile Arg Thr Pro Pro Ala Tyr Arg Pro Pro Asn Ala Pro Ile Leu Ser
                1365                1370                1375
Thr Leu Pro Glu Thr Thr Val Val Arg Arg Arg Gly Arg Ser Pro Arg
                1380                1385                1390
Arg Arg Thr Pro Ser Pro Arg Arg Arg Arg Ser Gln Ser Arg Glu Ser
                1395                1400                1405
Gln Cys
    1410
```

<210> SEQ ID NO 25
<211> LENGTH: 1183
<212> TYPE: PRT
<213> ORGANISM: Artificial Sequence
<220> FEATURE:
<223> OTHER INFORMATION: Synthetic sequence HBV EpiC SPC deltapol612-838

<400> SEQUENCE: 25

```
Met Gly Gly Trp Ser Ser Lys Pro Arg Gln Gly Met Gly Thr Asn Leu
1               5                   10                  15

Ser Val Pro Asn Pro Leu Gly Phe Phe Pro Asp His Gln Leu Asp Pro
            20                  25                  30

Ala Phe Gly Ala Asn Ser Asn Asn Pro Asp Trp Asp Phe Asn Pro Asn
        35                  40                  45

Lys Asp His Trp Pro Glu Ala Asn Gln Val Gly Ala Gly Ala Phe Gly
    50                  55                  60

Pro Gly Phe Thr Pro Pro His Gly Gly Leu Leu Gly Trp Ser Pro Gln
65                  70                  75                  80

Ala Gln Gly Ile Leu Thr Thr Val Pro Ala Ala Pro Pro Pro Ala Ser
                85                  90                  95

Thr Asn Arg Gln Ser Gly Arg Gln Pro Thr Pro Ile Ser Pro Pro Leu
            100                 105                 110

Arg Asp Ser His Pro Gln Ala Gln Trp Asn Ser Thr Thr Phe His Gln
        115                 120                 125

Ala Leu Leu Asp Pro Arg Val Arg Gly Leu Tyr Phe Pro Ala Gly Gly
    130                 135                 140

Ser Ser Ser Gly Thr Val Asn Pro Val Pro Thr Thr Ala Ser Pro Ile
145                 150                 155                 160

Ser Ser Ile Phe Ser Arg Thr Gly Asp Pro Ala Pro Asn Glu Asn Thr
                165                 170                 175

Thr Ser Gly Phe Leu Gly Pro Leu Leu Val Leu Gln Ala Gly Phe Phe
            180                 185                 190

Leu Leu Thr Arg Ile Leu Thr Ile Pro Gln Ser Leu Asp Ser Trp Trp
        195                 200                 205

Thr Ser Leu Asn Phe Leu Gly Gly Ala Pro Thr Cys Pro Gly Gln Asn
    210                 215                 220

Ser Gln Ser Pro Thr Ser Asn His Ser Pro Thr Ser Cys Pro Pro Ile
225                 230                 235                 240

Cys Pro Gly Tyr Arg Trp Met Cys Leu Arg Arg Phe Ile Ile Phe Leu
                245                 250                 255

Phe Ile Leu Leu Leu Cys Leu Ile Phe Leu Leu Val Leu Leu Asp Tyr
            260                 265                 270

Gln Gly Met Leu Pro Val Cys Pro Leu Leu Pro Gly Thr Ser Thr Thr
        275                 280                 285

Ser Thr Gly Pro Cys Lys Thr Cys Thr Ile Pro Ala Gln Gly Thr Ser
    290                 295                 300

Met Phe Pro Ser Cys Cys Cys Thr Lys Pro Ser Asp Gly Asn Cys Thr
305                 310                 315                 320

Cys Ile Pro Ile Pro Ser Ser Trp Ala Phe Ala Arg Phe Leu Trp Glu
                325                 330                 335

Trp Ala Ser Val Arg Phe Ser Trp Leu Ser Leu Leu Val Pro Phe Val
            340                 345                 350

Gln Trp Phe Val Gly Leu Ser Pro Thr Val Trp Leu Ser Val Ile Trp
        355                 360                 365
```

```
Met Met Trp Tyr Trp Gly Pro Ser Leu Tyr Asn Ile Leu Ser Pro Phe
370             375                 380

Leu Pro Leu Leu Pro Ile Phe Phe Cys Leu Trp Val Tyr Ile Pro Leu
385             390                 395                 400

Ser Tyr Gln His Phe Arg Lys Leu Leu Leu Asp Asp Glu Ala Gly
                405             410                 415

Pro Leu Glu Glu Glu Leu Pro Arg Leu Ala Asp Glu Gly Leu Asn Arg
            420             425                 430

Arg Val Ala Glu Asp Leu Asn Leu Gly Asn Leu Asn Val Ser Ile Pro
                435             440                 445

Trp Thr His Lys Val Gly Asn Phe Thr Gly Leu Tyr Ser Ser Thr Val
450             455                 460

Pro Val Phe Asn Pro Glu Trp Gln Thr Pro Ser Phe Pro His Ile His
465             470                 475                 480

Leu Gln Glu Asp Ile Ile Asn Arg Cys Gln Gln Tyr Val Gly Pro Leu
                485             490                 495

Thr Val Asn Glu Lys Arg Arg Leu Lys Leu Ile Met Pro Ala Arg Phe
                500             505                 510

Tyr Pro Asn Leu Thr Lys Tyr Leu Pro Leu Asp Lys Gly Ile Lys Pro
            515             520                 525

Tyr Tyr Pro Glu His Ala Val Asn His Tyr Phe Lys Thr Arg His Tyr
530             535                 540

Leu His Thr Leu Trp Lys Ala Gly Ile Leu Tyr Lys Arg Glu Thr Thr
545             550                 555                 560

Arg Ser Ala Ser Phe Cys Gly Ser Pro Tyr Ser Trp Glu Gln Glu Leu
                565             570                 575

Gln His Gly Arg Leu Val Phe Gln Thr Ser Thr Arg His Gly Asp Glu
            580             585                 590

Ser Phe Cys Ser Gln Ser Ser Gly Ile Leu Ser Arg Ser Pro Val Gly
        595             600                 605

Pro Cys Val Arg Ser Gln Leu Lys Gln Ser Arg Leu Gly Leu Gln Pro
            610             615                 620

Gln Gln Gly Ser Leu Ala Arg Gly Lys Ser Gly Arg Ser Gly Ser Ile
625             630                 635                 640

Arg Ala Arg Val His Pro Thr Thr Arg Arg Ser Phe Gly Val Glu Pro
                645             650                 655

Ser Gly Ser Gly His Ile Asp Asn Ser Ala Ser Ser Thr Ser Ser Cys
            660             665                 670

Leu His Gln Ser Ala Val Arg Lys Thr Ala Tyr Ser His Leu Ser Thr
            675             680                 685

Ser Lys Arg Gln Ser Ser Ser Gly His Ala Val Glu Leu His Asn Ile
        690             695                 700

Pro Pro Ser Ser Ala Arg Ser Gln Ser Glu Gly Pro Ile Phe Ser Cys
705             710                 715                 720

Trp Trp Leu Gln Phe Arg Asn Ser Lys Pro Cys Ser Asp Tyr Cys Leu
                725             730                 735

Thr His Ile Val Asn Leu Leu Glu Asp Trp Gly Pro Cys Thr Glu His
            740             745                 750

Gly Glu His Asn Ile Arg Ile Pro Arg Thr Pro Ala Arg Val Thr Gly
            755             760                 765

Gly Val Phe Leu Val Asp Lys Asn Pro His Asn Thr Thr Glu Ser Arg
770             775                 780

Leu Val Val Asp Phe Ser Gln Phe Ser Arg Gly Ser Thr His Val Ser
```

```
                785                 790                 795                 800
Trp Pro Lys Phe Ala Val Pro Asn Leu Gln Ser Leu Thr Asn Leu Leu
                805                 810                 815

Arg Ser Asn Leu Ser Trp Leu Ser Leu Asp Val Ser Ala Ala Phe Tyr
                820                 825                 830

His Ile Pro Leu His Pro Ala Ala Met Pro His Leu Leu Val Gly Ser
                835                 840                 845

Ser Gly Leu Pro Arg Tyr Val Ala Arg Leu Ser Ser Thr Ser Arg Asn
            850                 855                 860

Ile Asn Tyr Gln His Gly Thr Met Gln Asp Leu His Asp Ser Cys Ser
865                 870                 875                 880

Arg Asn Leu Tyr Val Ser Leu Leu Leu Tyr Lys Thr Phe Gly Arg
                885                 890                 895

Lys Leu His Leu Tyr Ser His Pro Ile Ile Leu Gly Phe Arg Lys Ile
                900                 905                 910

Pro Met Gly Val Gly Leu Ser Pro Phe Leu Leu Ala Gln Phe Thr Ser
                915                 920                 925

Ala Ile Cys Ser Val Val Arg Arg Ala Phe Pro His Cys Leu Ala Phe
            930                 935                 940

Ser Val Val Leu Gly Ala Lys Ser Val Gln His Leu Glu Ser Leu Phe
945                 950                 955                 960

Thr Ser Ile Thr Asn Phe Leu Leu Ser Leu Gly Ile His Leu Asn Pro
                965                 970                 975

Asn Lys Thr Lys Arg Trp Gly Tyr Ser Leu Asn Phe Met Gly Tyr Val
            980                 985                 990

Ile Gly Ser Trp Gly Thr Leu Pro Gln Glu His Ile Val Leu Lys Ile
            995                 1000                1005

Lys Asp Ile Asp Pro Tyr Lys Glu Phe Gly Ala Ser Val Glu Leu Leu
            1010                1015                1020

Ser Phe Leu Pro Ser Asp Phe Phe Pro Ser Ile Arg Asp Leu Leu Asp
1025                1030                1035                1040

Thr Ala Ser Ala Leu Tyr Arg Glu Ala Leu Glu Ser Pro Glu His Cys
                1045                1050                1055

Ser Pro His His Thr Ala Leu Arg Gln Ala Ile Leu Cys Trp Gly Glu
                1060                1065                1070

Leu Met Asn Leu Ala Thr Trp Val Gly Ser Asn Leu Glu Asp Pro Ala
            1075                1080                1085

Ser Arg Glu Leu Val Val Ser Tyr Val Asn Val Asn Met Gly Leu Lys
            1090                1095                1100

Ile Arg Gln Leu Leu Trp Phe His Ile Ser Cys Leu Thr Phe Gly Arg
1105                1110                1115                1120

Glu Thr Val Leu Glu Tyr Leu Val Ser Phe Gly Val Trp Ile Arg Thr
                1125                1130                1135

Pro Pro Ala Tyr Arg Pro Pro Asn Ala Pro Ile Leu Ser Thr Leu Pro
                1140                1145                1150

Glu Thr Thr Val Val Arg Arg Gly Arg Ser Pro Arg Arg Thr
                1155                1160                1165

Pro Ser Pro Arg Arg Arg Ser Gln Ser Arg Glu Ser Gln Cys
            1170                1175                1180

<210> SEQ ID NO 26
<211> LENGTH: 1169
<212> TYPE: PRT
<213> ORGANISM: Artificial Sequence
```

<220> FEATURE:
<223> OTHER INFORMATION: Synthetic sequence HBV EpiD SPC detlapol601-827

<400> SEQUENCE: 26

```
Met Gly Gln Asn Leu Ser Thr Ser Asn Pro Leu Gly Phe Phe Pro Asp
1               5                   10                  15

His Gln Leu Asp Pro Ala Phe Arg Ala Asn Thr Ala Asn Pro Asp Trp
            20                  25                  30

Asp Phe Asn Pro Asn Lys Asp Thr Trp Pro Asp Ala Asn Lys Val Gly
        35                  40                  45

Ala Gly Ala Phe Gly Leu Gly Phe Thr Pro Pro His Gly Gly Leu Leu
    50                  55                  60

Gly Trp Ser Pro Gln Ala Gln Gly Ile Leu Gln Thr Leu Pro Ala Asn
65                  70                  75                  80

Pro Pro Pro Ala Ser Thr Asn Arg Gln Ser Gly Arg Gln Pro Thr Pro
                85                  90                  95

Leu Ser Pro Pro Leu Arg Asn Thr His Pro Gln Ala Gln Trp Asn Ser
            100                 105                 110

Thr Thr Phe His Gln Thr Leu Gln Asp Pro Arg Val Arg Gly Leu Tyr
        115                 120                 125

Phe Pro Ala Gly Gly Ser Ser Ser Gly Thr Val Asn Pro Val Pro Thr
    130                 135                 140

Thr Val Ser His Ile Ser Ser Ile Phe Ser Arg Ile Gly Asp Pro Ala
145                 150                 155                 160

Leu Asn Glu Asn Ile Thr Ser Gly Phe Leu Gly Pro Leu Leu Val Leu
                165                 170                 175

Gln Ala Gly Phe Phe Leu Leu Thr Arg Ile Leu Thr Ile Pro Gln Ser
            180                 185                 190

Leu Asp Ser Trp Trp Thr Ser Leu Asn Phe Leu Gly Gly Thr Thr Val
        195                 200                 205

Cys Leu Gly Gln Asn Ser Gln Ser Pro Thr Ser Asn His Ser Pro Thr
    210                 215                 220

Ser Cys Pro Pro Thr Cys Pro Gly Tyr Arg Trp Met Cys Leu Arg Arg
225                 230                 235                 240

Phe Ile Ile Phe Leu Phe Ile Leu Leu Leu Cys Leu Ile Phe Leu Leu
                245                 250                 255

Val Leu Leu Asp Tyr Gln Gly Met Leu Pro Val Cys Pro Leu Ile Pro
            260                 265                 270

Gly Ser Ser Thr Thr Ser Thr Gly Pro Cys Arg Thr Cys Thr Thr Pro
        275                 280                 285

Ala Gln Gly Thr Ser Met Tyr Pro Ser Cys Cys Cys Thr Lys Pro Ser
    290                 295                 300

Asp Gly Asn Cys Thr Cys Ile Pro Ile Pro Ser Ser Trp Ala Phe Gly
305                 310                 315                 320

Lys Phe Leu Trp Glu Trp Ala Ser Ala Arg Phe Ser Trp Leu Ser Leu
                325                 330                 335

Leu Val Pro Phe Val Gln Trp Phe Val Gly Leu Ser Pro Thr Val Trp
            340                 345                 350

Leu Ser Val Ile Trp Met Met Trp Tyr Trp Gly Pro Ser Leu Tyr Ser
        355                 360                 365

Ile Leu Ser Pro Phe Leu Pro Leu Leu Pro Ile Phe Phe Cys Leu Trp
    370                 375                 380

Val Tyr Ile Pro Leu Ser Tyr Gln His Phe Arg Arg Leu Leu Leu Leu
385                 390                 395                 400
```

```
Asp Asp Glu Ala Gly Pro Leu Glu Glu Leu Pro Arg Leu Ala Asp
            405                 410                 415

Glu Gly Leu Asn Arg Arg Val Ala Glu Asp Leu Asn Leu Gly Asn Leu
                420                 425                 430

Asn Val Ser Ile Pro Trp Thr His Lys Val Gly Asn Phe Thr Gly Leu
            435                 440                 445

Tyr Ser Ser Thr Val Pro Val Phe Asn Pro His Trp Lys Thr Pro Ser
        450                 455                 460

Phe Pro Asn Ile His Leu His Gln Asp Ile Ile Lys Lys Cys Glu Gln
465                 470                 475                 480

Phe Val Gly Pro Leu Thr Val Asn Glu Lys Arg Arg Leu Gln Leu Ile
                485                 490                 495

Met Pro Ala Arg Phe Tyr Pro Asn Val Thr Lys Tyr Leu Pro Leu Asp
                500                 505                 510

Lys Gly Ile Lys Pro Tyr Tyr Pro Glu His Leu Val Asn His Tyr Phe
        515                 520                 525

Gln Thr Arg His Tyr Leu His Thr Leu Trp Lys Ala Gly Ile Leu Tyr
            530                 535                 540

Lys Arg Glu Thr Thr His Ser Ala Ser Phe Cys Gly Ser Pro Tyr Ser
545                 550                 555                 560

Trp Glu Gln Glu Leu Gln His Gly Ala Glu Ser Phe His Gln Gln Ser
                565                 570                 575

Ser Gly Ile Leu Ser Arg Pro Pro Val Gly Ser Ser Leu Gln Ser Lys
            580                 585                 590

His Arg Lys Ser Arg Leu Gly Leu Gln Ser Gln Gln Gly His Leu Ala
        595                 600                 605

Arg Arg Gln Gln Gly Arg Ser Trp Ser Ile Arg Ala Gly Ile His Pro
610                 615                 620

Thr Ala Arg Arg Pro Phe Gly Val Glu Pro Ser Gly Ser Gly His Thr
625                 630                 635                 640

Thr Asn Leu Ala Ser Lys Ser Ala Ser Cys Leu Tyr Gln Ser Pro Val
                645                 650                 655

Arg Lys Ala Ala Tyr Pro Ala Val Ser Thr Phe Glu Lys His Ser Ser
                660                 665                 670

Ser Gly His Ala Val Glu Leu His Asn Leu Pro Pro Asn Ser Ala Arg
            675                 680                 685

Ser Gln Ser Glu Arg Pro Val Phe Pro Cys Trp Trp Leu Gln Phe Arg
        690                 695                 700

Asn Ser Lys Pro Cys Ser Asp Tyr Cys Leu Ser His Ile Val Asn Leu
705                 710                 715                 720

Leu Glu Asp Trp Gly Pro Cys Ala Glu His Gly Glu His His Ile Arg
                725                 730                 735

Ile Pro Arg Thr Pro Ala Arg Val Thr Gly Gly Val Phe Leu Val Asp
                740                 745                 750

Lys Asn Pro His Asn Thr Ala Glu Ser Arg Leu Val Val Asp Phe Ser
        755                 760                 765

Gln Phe Ser Arg Gly Asn Tyr Arg Val Ser Trp Pro Lys Phe Ala Val
    770                 775                 780

Pro Asn Leu Gln Ser Leu Thr Asn Leu Leu Ser Ser Asn Leu Ser Trp
785                 790                 795                 800

Leu Ser Leu Asp Val Ser Ala Ala Phe Tyr His Leu Pro Leu His Pro
                805                 810                 815
```

```
Ala Ala Met Pro His Leu Leu Val Gly Ser Ser Gly Leu Ser Arg Tyr
            820                 825                 830

Val Ala Arg Leu Ser Ser Asn Ser Arg Ile Phe Asn His Gln His Gly
            835                 840                 845

Thr Met Gln Asn Leu His Asp Ser Cys Ser Arg Asn Leu Tyr Val Ser
            850                 855                 860

Leu Leu Leu Leu Tyr Gln Thr Phe Gly Arg Lys Leu His Leu Tyr Ser
865                 870                 875                 880

His Pro Ile Ile Leu Gly Phe Arg Lys Ile Pro Met Gly Val Gly Leu
                885                 890                 895

Ser Pro Phe Leu Leu Ala Gln Phe Thr Ser Ala Ile Cys Ser Val Val
            900                 905                 910

Arg Arg Ala Phe Pro His Cys Leu Ala Phe Ser Val Val Leu Gly Ala
            915                 920                 925

Lys Ser Val Gln His Leu Glu Ser Leu Phe Thr Ala Val Thr Asn Phe
            930                 935                 940

Leu Leu Ser Leu Gly Ile His Leu Asn Pro Asn Lys Thr Lys Arg Trp
945                 950                 955                 960

Gly Tyr Ser Leu His Phe Met Gly Tyr Val Ile Gly Cys Tyr Gly Ser
                965                 970                 975

Leu Pro Gln Asp His Ile Ile Gln Lys Ile Lys Asp Ile Asp Pro Tyr
            980                 985                 990

Lys Glu Phe Gly Ala Thr Val Glu Leu Leu Ser Phe Leu Pro Ser Asp
            995                 1000                1005

Phe Phe Pro Ser Val Arg Asp Leu Leu Asp Thr Ala Ser Ala Leu Tyr
            1010                1015                1020

Arg Glu Ala Leu Glu Ser Pro Glu His Cys Ser Pro His His Thr Ala
1025                1030                1035                1040

Leu Arg Gln Ala Ile Leu Cys Trp Gly Glu Leu Met Thr Leu Ala Thr
            1045                1050                1055

Trp Val Gly Gly Asn Leu Glu Asp Pro Ile Ser Arg Asp Leu Val Val
            1060                1065                1070

Ser Tyr Val Asn Thr Asn Met Gly Leu Lys Phe Arg Gln Leu Leu Trp
            1075                1080                1085

Phe His Ile Ser Cys Leu Thr Phe Gly Arg Glu Thr Val Ile Glu Tyr
            1090                1095                1100

Leu Val Ser Phe Gly Val Trp Ile Arg Thr Pro Pro Ala Tyr Arg Pro
1105                1110                1115                1120

Pro Asn Ala Pro Ile Leu Ser Thr Leu Pro Glu Thr Thr Val Val Arg
            1125                1130                1135

Arg Arg Gly Arg Ser Pro Arg Arg Thr Pro Ser Pro Arg Arg Arg
            1140                1145                1150

Arg Ser Gln Ser Pro Arg Arg Arg Ser Lys Ser Arg Glu Ser Gln
            1155                1160                1165

Cys

<210> SEQ ID NO 27
<211> LENGTH: 67
<212> TYPE: PRT
<213> ORGANISM: Artificial Sequence
<220> FEATURE:
<223> OTHER INFORMATION: Synthetic sequence 1epi_C1

<400> SEQUENCE: 27

Met Asp Ile Asp Pro Tyr Lys Glu Phe Gly Ala Ser Val Glu Leu Leu
```

```
1               5                   10                  15
Ser Phe Leu Pro Ser Asp Phe Phe Pro Ser Val Arg Asp Leu Leu Asp
                20                  25                  30

Thr Ala Ser Ala Leu Tyr Arg Glu Ala Leu Glu Ser Pro Glu His Cys
                35                  40                  45

Ser Pro His His Thr Ala Leu Arg Gln Ala Ile Leu Cys Trp Gly Glu
                50                  55                  60

Leu Met Asn
65
```

<210> SEQ ID NO 28
<211> LENGTH: 79
<212> TYPE: PRT
<213> ORGANISM: Artificial Sequence
<220> FEATURE:
<223> OTHER INFORMATION: Synthetic sequence 1epi_C2

<400> SEQUENCE: 28

```
Arg Gln Leu Leu Trp Phe His Ile Ser Cys Leu Thr Phe Gly Arg Glu
1               5                   10                  15

Thr Val Leu Glu Tyr Leu Val Ser Phe Gly Val Trp Ile Arg Thr Pro
                20                  25                  30

Pro Ala Tyr Arg Pro Pro Asn Ala Pro Ile Leu Ser Thr Leu Pro Glu
                35                  40                  45

Thr Thr Val Val Arg Arg Arg Gly Arg Ser Pro Arg Arg Thr Pro
                50                  55                  60

Ser Pro Arg Arg Arg Arg Ser Gln Ser Pro Arg Arg Arg Ser
65                  70                  75
```

<210> SEQ ID NO 29
<211> LENGTH: 158
<212> TYPE: PRT
<213> ORGANISM: Artificial Sequence
<220> FEATURE:
<223> OTHER INFORMATION: Synthetic sequence 1epi_S1

<400> SEQUENCE: 29

```
Cys Pro Gly Tyr Arg Trp Met Cys Leu Arg Arg Phe Ile Ile Phe Leu
1               5                   10                  15

Phe Ile Leu Leu Leu Cys Leu Ile Phe Leu Leu Val Leu Leu Asp Tyr
                20                  25                  30

Gln Gly Met Leu Pro Val Cys Pro Leu Ile Pro Gly Ser Ser Thr Thr
                35                  40                  45

Ser Thr Gly Pro Cys Lys Thr Cys Thr Thr Pro Ala Gln Gly Thr Ser
                50                  55                  60

Met Phe Pro Ser Cys Cys Cys Thr Lys Pro Ser Asp Gly Asn Cys Thr
65                  70                  75                  80

Cys Ile Pro Ile Pro Ser Ser Trp Ala Phe Ala Lys Tyr Leu Trp Glu
                85                  90                  95

Trp Ala Ser Val Arg Phe Ser Trp Leu Ser Leu Leu Val Pro Phe Val
                100                 105                 110

Gln Trp Phe Val Gly Leu Ser Pro Thr Val Trp Leu Ser Val Ile Trp
                115                 120                 125

Met Met Trp Tyr Trp Gly Pro Ser Leu Tyr Asn Ile Leu Ser Pro Phe
                130                 135                 140

Leu Pro Leu Leu Pro Ile Phe Phe Cys Leu Trp Val Tyr Ile
145                 150                 155
```

```
<210> SEQ ID NO 30
<211> LENGTH: 68
<212> TYPE: PRT
<213> ORGANISM: Artificial Sequence
<220> FEATURE:
<223> OTHER INFORMATION: Synthetic sequence 1epi_P1

<400> SEQUENCE: 30

Met Pro Leu Ser Tyr Gln His Phe Arg Lys Leu Leu Leu Asp Asp
1               5                   10                  15

Glu Ala Gly Pro Leu Glu Glu Leu Pro Arg Leu Ala Asp Glu Gly
                20                  25                  30

Leu Asn Arg Arg Val Ala Glu Asp Leu Asn Leu Gly Asn Leu Asn Val
            35                  40                  45

Ser Ile Pro Trp Thr His Lys Val Gly Asn Phe Thr Gly Leu Tyr Ser
    50                  55                  60

Ser Thr Val Pro
65

<210> SEQ ID NO 31
<211> LENGTH: 104
<212> TYPE: PRT
<213> ORGANISM: Artificial Sequence
<220> FEATURE:
<223> OTHER INFORMATION: Synthetic sequence 1epi_P2a

<400> SEQUENCE: 31

Pro Arg Thr Pro Ala Arg Val Thr Gly Gly Val Phe Leu Val Asp Lys
1               5                   10                  15

Asn Pro His Asn Thr Thr Glu Ser Arg Leu Val Val Asp Phe Ser Gln
                20                  25                  30

Phe Ser Arg Gly Asn Thr Arg Val Ser Trp Pro Lys Phe Ala Val Pro
            35                  40                  45

Asn Leu Gln Ser Leu Thr Asn Leu Leu Ser Ser Asn Leu Ser Trp Leu
    50                  55                  60

Ser Leu Asp Val Ser Ala Ala Phe Tyr His Leu Pro Leu His Pro Ala
65                  70                  75                  80

Ala Met Pro His Leu Leu Val Gly Ser Ser Gly Leu Ser Arg Tyr Val
                85                  90                  95

Ala Arg Leu Ser Ser Asn Ser Arg
            100

<210> SEQ ID NO 32
<211> LENGTH: 69
<212> TYPE: PRT
<213> ORGANISM: Artificial Sequence
<220> FEATURE:
<223> OTHER INFORMATION: Synthetic sequence 1epiP2b

<400> SEQUENCE: 32

Gly Arg Lys Leu His Leu Tyr Ser His Pro Ile Ile Leu Gly Phe Arg
1               5                   10                  15

Lys Ile Pro Met Gly Val Gly Leu Ser Pro Phe Leu Leu Ala Gln Phe
                20                  25                  30

Thr Ser Ala Ile Cys Ser Val Val Arg Arg Ala Phe Pro His Cys Leu
            35                  40                  45

Ala Phe Ser Tyr Met Asp Asp Val Val Leu Gly Ala Lys Ser Val Gln
    50                  55                  60

His Leu Glu Ser Leu
```

<210> SEQ ID NO 33
<211> LENGTH: 226
<212> TYPE: PRT
<213> ORGANISM: Artificial Sequence
<220> FEATURE:
<223> OTHER INFORMATION: Synthetic sequence 1epi_P2c

<400> SEQUENCE: 33

```
Cys Phe Arg Lys Leu Pro Val Asn Arg Pro Ile Asp Trp Lys Val Cys
1               5                   10                  15

Gln Arg Ile Val Gly Leu Leu Gly Phe Ala Ala Pro Phe Thr Gln Cys
            20                  25                  30

Gly Tyr Pro Ala Leu Met Pro Leu Tyr Ala Cys Ile Gln Ser Lys Gln
        35                  40                  45

Ala Phe Thr Phe Ser Pro Thr Tyr Lys Ala Phe Leu Cys Lys Gln Tyr
    50                  55                  60

Leu Asn Leu Tyr Pro Val Ala Arg Gln Arg Pro Gly Leu Cys Gln Val
65                  70                  75                  80

Phe Ala Asp Ala Thr Pro Thr Gly Trp Gly Leu Ala Ile Gly His Gln
                85                  90                  95

Arg Met Arg Gly Thr Phe Val Ala Pro Leu Pro Ile His Thr Ala Glu
            100                 105                 110

Leu Leu Ala Ala Cys Phe Ala Arg Ser Arg Ser Gly Ala Lys Leu Ile
        115                 120                 125

Gly Thr Asp Asn Ser Val Val Leu Ser Arg Lys Tyr Thr Ser Phe Pro
    130                 135                 140

Trp Leu Leu Gly Cys Ala Ala Asn Trp Ile Leu Arg Gly Thr Ser Phe
145                 150                 155                 160

Val Tyr Val Pro Ser Ala Leu Asn Pro Ala Asp Asp Pro Ser Arg Gly
                165                 170                 175

Arg Leu Gly Leu Tyr Arg Pro Leu Leu Arg Leu Pro Phe Arg Pro Thr
            180                 185                 190

Thr Gly Arg Thr Ser Leu Tyr Ala Asp Ser Pro Ser Val Pro Ser His
        195                 200                 205

Leu Pro Asp Arg Val His Phe Ala Ser Pro Leu His Val Ala Trp Arg
    210                 215                 220

Pro Pro
225
```

<210> SEQ ID NO 34
<211> LENGTH: 176
<212> TYPE: PRT
<213> ORGANISM: Artificial Sequence
<220> FEATURE:
<223> OTHER INFORMATION: Synthetic sequence 1epi_C

<400> SEQUENCE: 34

```
Met Asp Ile Asp Pro Tyr Lys Glu Phe Gly Ala Ser Val Glu Leu Leu
1               5                   10                  15

Ser Phe Leu Pro Ser Asp Phe Phe Pro Ser Val Arg Asp Leu Leu Asp
            20                  25                  30

Thr Ala Ser Ala Leu Tyr Arg Glu Ala Leu Glu Ser Pro Glu His Cys
        35                  40                  45

Ser Pro His His Thr Ala Leu Arg Gln Ala Ile Leu Cys Trp Gly Glu
    50                  55                  60
```

```
Leu Met Asn Leu Ala Thr Trp Val Gly Ser Asn Leu Glu Asp Pro Ala
 65                  70                  75                  80

Ser Arg Asp Leu Val Val Ser Tyr Val Asn Thr Asn Met Gly Leu Lys
                 85                  90                  95

Ile Arg Gln Leu Leu Trp Phe His Ile Ser Cys Leu Thr Phe Gly Arg
            100                 105                 110

Glu Thr Val Leu Glu Tyr Leu Val Ser Phe Gly Val Trp Ile Arg Thr
        115                 120                 125

Pro Pro Ala Tyr Arg Pro Pro Asn Ala Pro Ile Leu Ser Thr Leu Pro
    130                 135                 140

Glu Thr Thr Val Val Arg Arg Arg Gly Arg Ser Pro Arg Arg Arg Thr
145                 150                 155                 160

Pro Ser Pro Arg Arg Arg Arg Ser Gln Ser Pro Arg Arg Arg Arg Ser
                165                 170                 175

<210> SEQ ID NO 35
<211> LENGTH: 481
<212> TYPE: PRT
<213> ORGANISM: Artificial Sequence
<220> FEATURE:
<223> OTHER INFORMATION: Synthetic sequence 1epi_P2

<400> SEQUENCE: 35

Pro Arg Thr Pro Ala Arg Val Thr Gly Gly Val Phe Leu Val Asp Lys
  1               5                  10                  15

Asn Pro His Asn Thr Thr Glu Ser Arg Leu Val Val Asp Phe Ser Gln
             20                  25                  30

Phe Ser Arg Gly Asn Thr Arg Val Ser Trp Pro Lys Phe Ala Val Pro
         35                  40                  45

Asn Leu Gln Ser Leu Thr Asn Leu Leu Ser Ser Asn Leu Ser Trp Leu
     50                  55                  60

Ser Leu Asp Val Ser Ala Ala Phe Tyr His Leu Pro Leu His Pro Ala
 65                  70                  75                  80

Ala Met Pro His Leu Leu Val Gly Ser Ser Gly Leu Ser Arg Tyr Val
                 85                  90                  95

Ala Arg Leu Ser Ser Asn Ser Arg Ile Phe Asn His Gln His Gly Thr
            100                 105                 110

Met Gln Asn Leu His Asp Ser Cys Ser Arg Asn Leu Tyr Val Ser Leu
        115                 120                 125

Leu Leu Leu Tyr Lys Thr Phe Gly Arg Lys Leu His Leu Tyr Ser His
    130                 135                 140

Pro Ile Ile Leu Gly Phe Arg Lys Ile Pro Met Gly Val Gly Leu Ser
145                 150                 155                 160

Pro Phe Leu Leu Ala Gln Phe Thr Ser Ala Ile Cys Ser Val Val Arg
                165                 170                 175

Arg Ala Phe Pro His Cys Leu Ala Phe Ser Tyr Met Asp Asp Val Val
            180                 185                 190

Leu Gly Ala Lys Ser Val Gln His Leu Glu Ser Leu Tyr Thr Ala Val
        195                 200                 205

Thr Asn Phe Leu Leu Ser Leu Gly Ile His Leu Asn Pro Asn Lys Thr
    210                 215                 220

Lys Arg Trp Gly Tyr Ser Leu Asn Phe Met Gly Tyr Val Ile Gly Ser
225                 230                 235                 240

Trp Gly Thr Leu Pro Gln Glu His Ile Val Gln Lys Ile Lys Met Cys
                245                 250                 255
```

```
Phe Arg Lys Leu Pro Val Asn Arg Pro Ile Asp Trp Lys Val Cys Gln
            260                 265                 270

Arg Ile Val Gly Leu Leu Gly Phe Ala Ala Pro Phe Thr Gln Cys Gly
        275                 280                 285

Tyr Pro Ala Leu Met Pro Leu Tyr Ala Cys Ile Gln Ser Lys Gln Ala
    290                 295                 300

Phe Thr Phe Ser Pro Thr Tyr Lys Ala Phe Leu Cys Lys Gln Tyr Leu
305                 310                 315                 320

Asn Leu Tyr Pro Val Ala Arg Gln Arg Pro Gly Leu Cys Gln Val Phe
                325                 330                 335

Ala Asp Ala Thr Pro Thr Gly Trp Gly Leu Ala Ile Gly His Gln Arg
            340                 345                 350

Met Arg Gly Thr Phe Val Ala Pro Leu Pro Ile His Thr Ala Glu Leu
        355                 360                 365

Leu Ala Ala Cys Phe Ala Arg Ser Arg Ser Gly Ala Lys Leu Ile Gly
    370                 375                 380

Thr Asp Asn Ser Val Val Leu Ser Arg Lys Tyr Thr Ser Phe Pro Trp
385                 390                 395                 400

Leu Leu Gly Cys Ala Ala Asn Trp Ile Leu Arg Gly Thr Ser Phe Val
                405                 410                 415

Tyr Val Pro Ser Ala Leu Asn Pro Ala Asp Pro Ser Arg Gly Arg
            420                 425                 430

Leu Gly Leu Tyr Arg Pro Leu Leu Arg Leu Pro Phe Arg Pro Thr Thr
        435                 440                 445

Gly Arg Thr Ser Leu Tyr Ala Asp Ser Pro Ser Val Pro Ser His Leu
    450                 455                 460

Pro Asp Arg Val His Phe Ala Ser Pro Leu His Val Ala Trp Arg Pro
465                 470                 475                 480

Pro

<210> SEQ ID NO 36
<211> LENGTH: 254
<212> TYPE: PRT
<213> ORGANISM: Artificial Sequence
<220> FEATURE:
<223> OTHER INFORMATION: Synthetic sequence 1epi_P2 minus P2c

<400> SEQUENCE: 36

Pro Arg Thr Pro Ala Arg Val Thr Gly Gly Val Phe Leu Val Asp Lys
1               5                   10                  15

Asn Pro His Asn Thr Thr Glu Ser Arg Leu Val Val Asp Phe Ser Gln
            20                  25                  30

Phe Ser Arg Gly Asn Thr Arg Val Ser Trp Pro Lys Phe Ala Val Pro
        35                  40                  45

Asn Leu Gln Ser Leu Thr Asn Leu Leu Ser Ser Asn Leu Ser Trp Leu
    50                  55                  60

Ser Leu Asp Val Ser Ala Ala Phe Tyr His Leu Pro Leu His Pro Ala
65                  70                  75                  80

Ala Met Pro His Leu Leu Val Gly Ser Ser Gly Leu Ser Arg Tyr Val
                85                  90                  95

Ala Arg Leu Ser Ser Asn Ser Arg Ile Phe Asn His Gln His Gly Thr
            100                 105                 110

Met Gln Asn Leu His Asp Ser Cys Ser Arg Asn Leu Tyr Val Ser Leu
        115                 120                 125

Leu Leu Leu Tyr Lys Thr Phe Gly Arg Lys Leu His Leu Tyr Ser His
```

```
                130                 135                 140
Pro Ile Ile Leu Gly Phe Arg Lys Ile Pro Met Gly Val Gly Leu Ser
145                 150                 155                 160

Pro Phe Leu Leu Ala Gln Phe Thr Ser Ala Ile Cys Ser Val Val Arg
                165                 170                 175

Arg Ala Phe Pro His Cys Leu Ala Phe Ser Tyr Met Asp Asp Val Val
                180                 185                 190

Leu Gly Ala Lys Ser Val Gln His Leu Glu Ser Leu Tyr Thr Ala Val
                195                 200                 205

Thr Asn Phe Leu Leu Ser Leu Gly Ile His Leu Asn Pro Asn Lys Thr
                210                 215                 220

Lys Arg Trp Gly Tyr Ser Leu Asn Phe Met Gly Tyr Val Ile Gly Ser
225                 230                 235                 240

Trp Gly Thr Leu Pro Gln Glu His Ile Val Gln Lys Ile Lys
                245                 250
```

HEPATITIS B VIRUS VACCINES

STATEMENT OF GOVERNMENTAL INTEREST

This invention was made with U.S. Government support under Contract Number 89233218CNA000001 between the United States Department of Energy and TRIAD National Security, LLC for the operation of Los Alamos National Laboratory. The U.S. Government has certain rights in the invention.

STATEMENT REGARDING SEQUENCE LISTING

The Sequence Listing associated with this application is provided in text format in lieu of a paper copy, and is hereby incorporated by reference into the specification. The name of the text file containing the Sequence Listing is 930185_414USPC_SEQUENCE_LISTING.txt. The text file is 186 KB, was created on Feb. 22, 2022, and is being submitted electronically via EFS-Web.

BACKGROUND

Field of the Invention

The present subject matter relates, in general, to Hepatitis B virus (HBV) and, in particular, to HBV vaccines.

Description of the Related Art

Hepatitis B virus (HBV) infection represents a major global health burden. HBV infection results in chronic liver disease in 5-10% of infected adults, while the rate is inverted for perinatal transmission with >90% progressing to chronic disease. Untreated chronic hepatitis B (CHB) infection frequently progresses to necrotic inflammation and ongoing liver damage leading to cirrhosis and hepatocellular carcinoma (HCC). CHB is estimated to increase the risk of developing HCC by 20-fold and accounts for about 54% of HCC cases. HCC is the third most lethal form of cancer with about 800,000 new cases diagnosed annually. Highly effective (>95%) prophylactic vaccines were implemented in the early 1980's; however these HBV vaccines are inefficient once infection is established. Despite the wide use of prophylactic vaccines, there are 240-340 million chronic HBV carriers and over 780,000 related deaths per year worldwide. The vast majority of new HBV infections occur in highly endemic regions, such as China, Southeast Asia, and sub-Saharan Africa. HBV infection occurs through sexual, nosocomial, or blood-borne transmission.

The HBV genome is a 3.2 KB double-stranded DNA molecule that is organized into four overlapping open reading frames: a polymerase (P, or Pol), a Core (C), a surface antigen (HBsAg) (S), and a gene called "X," whose function is not fully understood but which has been implicated in development of liver cancer. Locarnini et al. *Antivir Ther.* 2010; 15 Suppl 3:3-14. And, unlike other small chronic viruses such as HIV or HCV that display high mutation rates resulting in quasispecies, the small (3.2 kb) DNA genome of HBV is more constrained in its ability to mutate due to overlapping open reading frames (ORFs). While there is limited intra-host mutation, distinct genotypes of HBV are found globally that need to be taken into account when designing treatments, such as a vaccine.

The current standard of care for chronic HBV infection is treatment with antivirals and interferon-α.

To date, therapeutic vaccinations for HBV have been ineffective. There are a number of potential reasons. Identifying the HBV sequence that infects an individual is useful in determining which specific vaccines will provide efficacious treatment. An HBV database called "HBVdb," developed as a collaborative consortium that sequences and examines HBV genomes, has identified about 5000 HBV complete genomes. See Hayer et al. *Nucleic Acids Res.*, 41:D566-D570 2013, the entirety of which is herein incorporated by reference. However, because of general overlap of sequences, and because multiple sequences were isolated from the same patient or from highly tight clusters, the number of truly unique total HBV complete genomes that HBVdb has identified is roughly 3000. The HBV genomes identified by HBVdb can be categorized into different genotypes (A, B, C, CB, D, DC, DE, E, and F). The distribution of genotypes varies throughout the world population. For example, nearly 75% of the dataset sequences available on HBVdb in samples of individuals from Asia and in particular China comprise genotypes B and C. On the other hand, more than half of HBV infections in Europe represent infections by genotypes A and D.

While treatments with antivirals and interferon-α inhibit viral replication and stimulate the innate immune system, they rarely clear the virus (1-4% per year) and patients often require life-long treatment. Moreover, individual responses to these therapies vary as the disease progresses, and prolonged treatments can result in both resistance mutations and a wide spectrum of side effects. The most effective direct antiviral therapies, tenofovir and entecavir, are expensive, and are only used in a subset of patients using expert guidelines and algorithms. As therapies fail or are not used, liver inflammation becomes chronic, and the damage and regeneration cycle can lead to fibrosis, abnormal liver architecture, and possibly HCC. Thus, there is an urgent need for an effective immunotherapy that mounts an effective immune response leading to elimination of HBV and ultimate cure.

A minority of individuals with chronic HBV will have spontaneous clearance of their infection, as documented by loss of measured surface antigen in the blood. The rate is as low as 1% per year and is minimally improved with direct acting antiviral agents. The most effective clearance occurs in individuals with a low quantitative level of circulating surface antigens who undergo treatment with type 1 interferons, which have severe side effects and are often poorly tolerated.

Therapeutic vaccination has also been in part ineffective, as the T cells that are needed to clear infection have become exhausted or tolerized and do not lead to effective clearance of HBV in the liver. Thus there is a need to elicit T cells that are not induced by natural infection, but that still recognize peptide sequences displayed on the surface of infected hepatocytes.

CMV/HBV vaccines offer an avenue to mount an effective response leading to elimination of HBV and ultimate cure. The induction of active liver resident effector CD8+ T cell (TEM) responses is crucial for HBV clearance. Thus, the induction of sustained, effector HBV-specific CD8+ T cells recognizing novel epitopes in the liver of CHB patients should suffice to control and eventually eliminate HBV.

Therefore, there remains a need in the art to identify effective vaccinations for people infected with different genotypes of HBV. And, because of the ineffectiveness of currently available vaccines against chronic HBV infections, there is a need in the art to develop a vaccine that could be used to treat such infections. There also remains a need to design, manufacture, and test therapeutic HBV vaccines in preparation for clinical testing. The compositions and methods disclosed herein address these needs.

BRIEF SUMMARY

In certain aspects, the present disclosure provides a polypeptide comprising the amino acid sequence as set forth in SEQ ID NOs:1-11 or SEQ ID NOs:14-36. In some embodiments, the polypeptide comprises two or more amino acid sequences as set forth in SEQ ID NOs:16-36. In some embodiments, the aforementioned polypeptides, or polynucleotides encoding the polypeptides, may be used in an HBV vaccine. In some embodiments, the present disclosure provides an immunogenic composition comprising a polypeptide comprising the amino acid sequence as set forth in SEQ ID NOs:1-11 or SEQ ID NOs:14-36. In still further embodiments, the present disclosure provides for the use of the aforementioned polypeptides or immunogenic compositions comprising the polypeptides generating an immune response to HBV, or treating or preventing an HBV infection.

In some embodiments, the present disclosure provides a viral vector comprising a cytomegalovirus (CMV) vector comprising a polynucleotide comprising the sequence encoding one or more amino acid sequences as set forth in SEQ ID NOs:1-36. In some embodiments, the polynucleotide encodes one or more amino acid sequences that comprise one or more of SEQ ID NOs:1-11, SEQ ID NOs:14-15, and SEQ ID NOs:24-26. In some embodiments, the sequences encoded by the polynucleotide are ordered for improved expression. In some embodiments, the present disclosure provides an immunogenic composition comprising a CMV vector that encodes a polynucleotide comprising the sequence encoding one or more amino acid sequences as set forth in SEQ ID NOs:1-36. In still further embodiments, the present disclosure provides for the use of the aforementioned vectors or immunogenic compositions comprising the vectors in generating an immune response to HBV, or treating or preventing an HBV infection.

Also provided herein is an immunogenic composition or vaccine comprising one or more HBV episensus antigens. In some embodiments, the antigens of the vaccine are provided as polypeptides. In some embodiments the antigens are encoded by a polynucleotide. In some embodiments, a viral vector comprises the polynucleotides. In some embodiments, the antigens are encoded by two or more polynucleotides, which may be expressed by the same or different promoters. In some embodiments, the antigens are encoded by different viral vectors. In some embodiments, the HBV vaccine comprises two or more HBV episensus antigens. In some embodiments, the HBV vaccine comprises a cytomegalovirus (CMV) vector and a polynucleotide encoding one or more HBV episensus antigens.

In some embodiments, the vaccine is a prophylactic vaccine. In some embodiments, the vaccine is a therapeutic vaccine.

In some embodiments, the immunogenic composition or vaccine further comprises a pharmaceutically acceptable carrier or excipient.

In certain aspects, the present disclosure provides a composition, e.g., an immunogenic composition, comprising two or more of the aforementioned polypeptides, polynucleotides, vectors, or vaccines.

Also provided herein are methods of treating HBV in a subject comprising administering an effective amount of the aforementioned polypeptides, vectors, vaccines, or compositions to a subject in need thereof. Further provided herein are methods of protecting a subject from an HBV infection comprising administering an effective amount of the aforementioned polypeptides, vectors, vaccines, or compositions to a subject in need thereof. Further provided herein are methods of generating an immune response to HBV comprising administering an effective amount of the aforementioned polypeptides, vectors, vaccines, or compositions to a subject in need thereof.

Also provided herein are some embodiments wherein the aforementioned polypeptides, vectors, vaccines, or compositions are for use in treating HBV, protecting a subject from an HBV infection, or inducing an immune response to HBV.

The present disclosure also provides for the use of the aforementioned polypeptides, vectors, vaccines, or compositions for the manufacture of a medicament for use in treatment of an HBV infection. The present disclosure also provides for the use of the aforementioned polypeptides, vectors, vaccines, or compositions for the manufacture of a medicament for use in protecting a subject from an HBV infection. The present disclosure also provides for the use of the aforementioned polypeptides, vectors, vaccines, or compositions for the manufacture of a medicament for use in generating or inducing an immune response to HBV.

Provided herein are HBV polypeptides comprising one or more episensus antigens that have amino acid sequences derived from HBV C, S, P, including full-length sequences, regions thereof, or any combination thereof.

Further provided herein are immunogenic compositions or vaccines comprising one or more pharmaceutically acceptable carriers and one or more episensus antigens. Also provided herein are immunogenic compositions or vaccines comprising a vector capable of expressing one or more episensus antigens. In some embodiments, the HBV episensus antigen comprises two or more episensus sequences. In some embodiments, the HBV vaccines are prophylactic vaccines. In some embodiments, the HBV vaccines are therapeutic vaccines.

The present disclosure further provides methods of preventing or treating HBV infection in a subject comprising administering an effective amount of the aforementioned immunogenic compositions or vaccines to the subject in need thereof. Further provided are methods of designing and producing an immunogenic composition or vaccine for a subject comprising sequencing HBV viruses in the subject, selecting vaccine antigens designed to cover the diversity within the viruses present in the subject, and inserting the vaccine antigens into a vector. Also provided herein are methods of treating an HBV infection in a subject, comprising administering an effective amount of the disclosed immunogenic compositions or vaccines to the subject in need thereof.

Also provided herein is a method of inducing an effector memory T cell response comprising: (a) designing one or more episensus antigens; (b) producing an immunogenic composition or vaccine comprising a CMV backbone and a polynucleotide encoding the one or more episensus antigens; and (c) administering the vaccine to a subject in need thereof.

In certain embodiments, the episensus antigens of the methods provided herein comprise one or more of the amino acid sequences selected from the group consisting of SEQ ID NOs:1-11 and SEQ ID NOs:14-36.

BRIEF DESCRIPTION OF THE DRAWINGS

FIG. 4A: Whole proteome coverage of HBV using one, two, and three episensus sequences. FIG. 4A shows that single episensus sequences provide varying and limited coverage over the genome of HBV (top panel). Coverage is improved with the use of two episensus sequences (middle panel) or three episensus sequences (bottom panel). FIG. 4B: Three episensus sequences provide better coverage than one or two episensus sequences, as shown by the number of exact 9-mer matches.

Figure 7A:
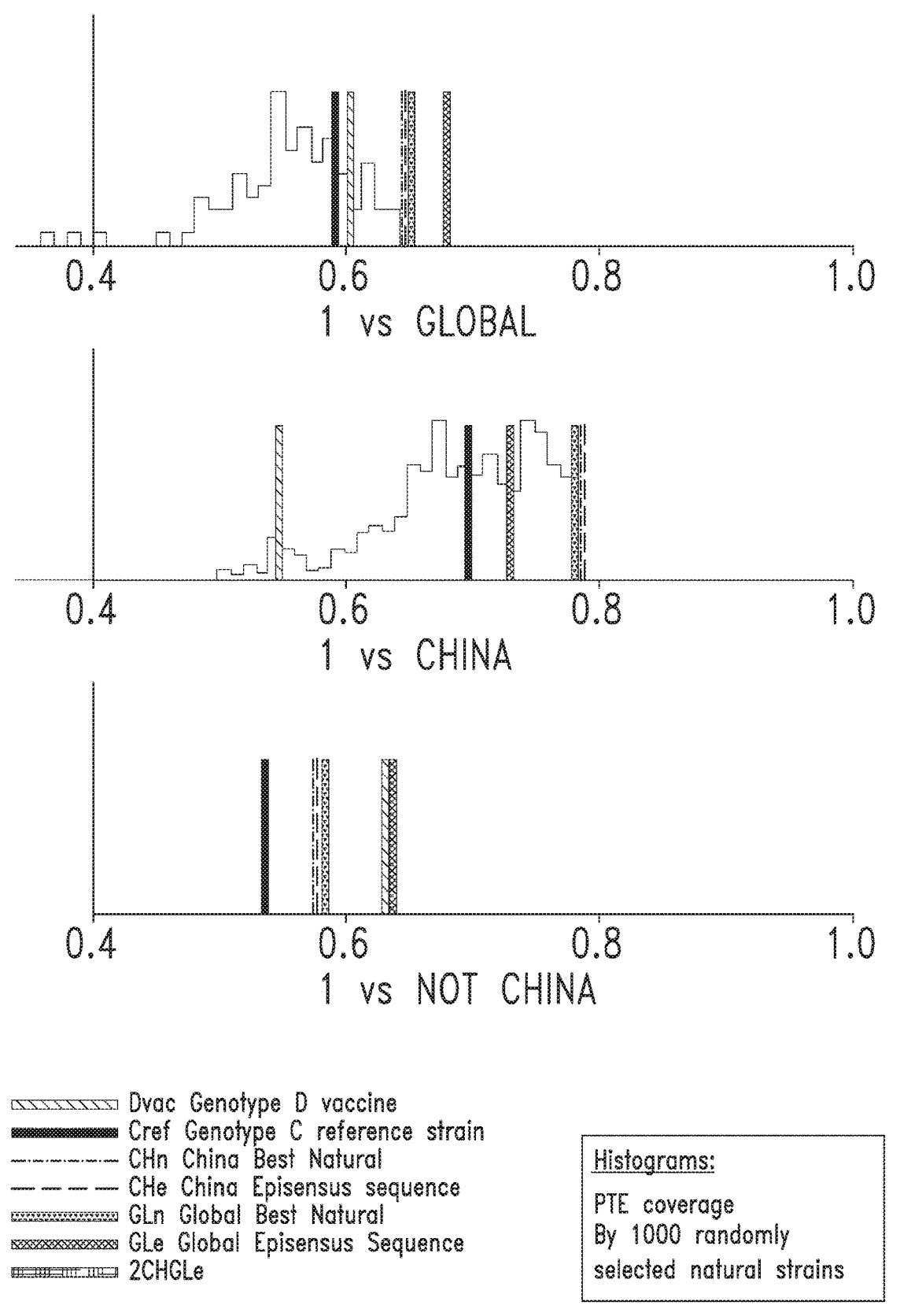

FIG. 7A-7B. Coverage of potential T cell epitopes (PTE) when one (FIG. 7A) or two (FIG. 7B) episensus sequences are used in samples from China, samples not from China, and a cohort of Global samples. X-axis indicates percentage of coverage. The grey histograms indicate the potential T cell epitopes coverage by 1000 randomly selected natural strains.

FIG. 8. Comparison of coverage for various episensus sequences. The 2_ChinaGlobal_Epi (2_CHGL_epi) sequences provides 0.809 (80.9%) exact full sequence coverage of Global samples. The 2_CHGL_epi sequence provides 0.879 (87.9%) exact full sequence coverage in samples from China and 0.772 (77.2%) exact full sequence coverage in samples not from China.

FIG. 9B depicts conserved region coverage of 1_D.vac, 1_GL_epi, and 2_CHGL_epi in all major genotypes.

Figure 10A:
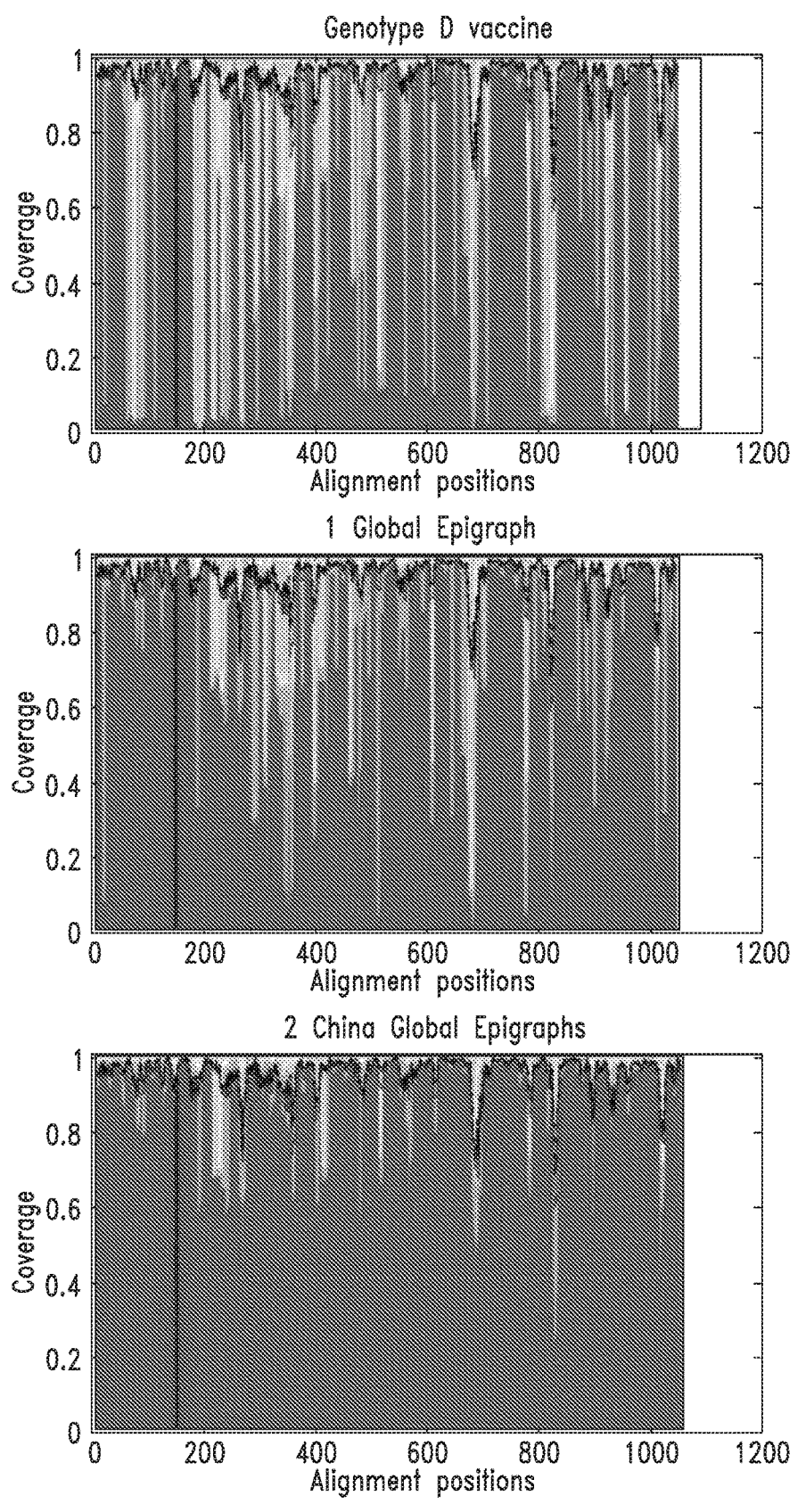

FIG. 10A-10B. Conserved region coverage of 1089 Chinese HBV sequences (FIG. 10A) and of all 3041 Global HBV Sequences (FIG. 10B) using the 2_CHGL_epi sequences compared to for the wild type Genotype D sequence and the 1_GL_epi sequence. The Genotype D sequence is used in vaccines by Transgene and GlobeImmune.

FIG. 11A and FIG. 11B show HBV genotype D episensus antigens developed for efficient epitope coverage in the U.S. and Europe; the antigen constructs begin in FIG. 11A and continue in FIG. 11B. The HBV genotype D episensus antigens derived from the core (C), the PreS1 and PreS2, the surface antigen(S), and the polymerase (P) sequences are shown in the indicated orders. Variants of the episensus antigens derived from sequences with deletions in transmembrane (TM) domains or having the antigens reordered relative to the order of the proteins in HBV are developed to minimize aggregation and maximize expression. FIG. 11C shows constructs for the same antigens, each including a hemagglutinin (HA) epitope tag inserted at the C-terminus. FIG. 11D shows viral expression of the antigens as measured by SDS poly-acrylamide gel electrophoresis (SDS-page) followed by immunoblots developed with antibodies directed to the HA epitope tag engineered into each construct.

FIG. 12A-12B. FIG. 12A shows HBV genotype D episensus antigens derived from the PreS1 and PreS2, the surface antigen(S), the polymerase (P), and/or the core (C) sequences. Four of the antigens have deletions in the sequence derived from the P protein, as shown. V5 or hemagglutinin (HA) epitope tags engineered into the constructs; the V5 tag was inserted at the N'-terminus and the HA tag was inserted at the C'-terminus. FIG. 12B shows viral expression of the antigens as measured by SDS-page followed by immunoblots developed with antibodies directed to the V5 or HA epitope tag engineered into each construct.

DETAILED DESCRIPTION

I. Definitions

Various terms relating to aspects of the description are used throughout the specification and claims. Such terms are to be given their ordinary meaning in the art unless otherwise indicated. Other specifically defined terms are to be construed in a manner consistent with the definitions provided herein.

As used in this specification and the appended claims, the singular forms “a,” “an,” and “the” include plural referents unless the content clearly dictates otherwise. Thus, for example, reference to “a cell” includes a combination of two or more cells, and the like. The use of the alternative (e.g., “or”) should be understood to mean either one, both, or any combination thereof of the alternatives, and may be used synonymously with “and/or”. As used herein, the terms “include” and “have” are used synonymously, which terms and variants thereof are intended to be construed as non-limiting.

The term “about” as used herein when referring to a measurable value such as an amount, a temporal duration, and the like, is meant to encompass variations of up to ±20% from the specified value, as such variations are appropriate to perform the disclosed methods. Unless otherwise indicated, all numbers expressing quantities of ingredients, properties such as molecular weight, reaction conditions, and so forth used in the specification and claims are to be understood as being modified in all instances by the term “about.” Accordingly, unless indicated to the contrary, the numerical parameters set forth in the following specification and attached claims are approximations that may vary depending upon the desired properties sought to be obtained. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of this disclosure are approximations, the numerical values set forth in the specific examples are reported as precisely as possible. Any numerical values, however, inherently contain certain errors necessarily resulting from the standard deviation found in their respective testing measurements.

Figure 1:
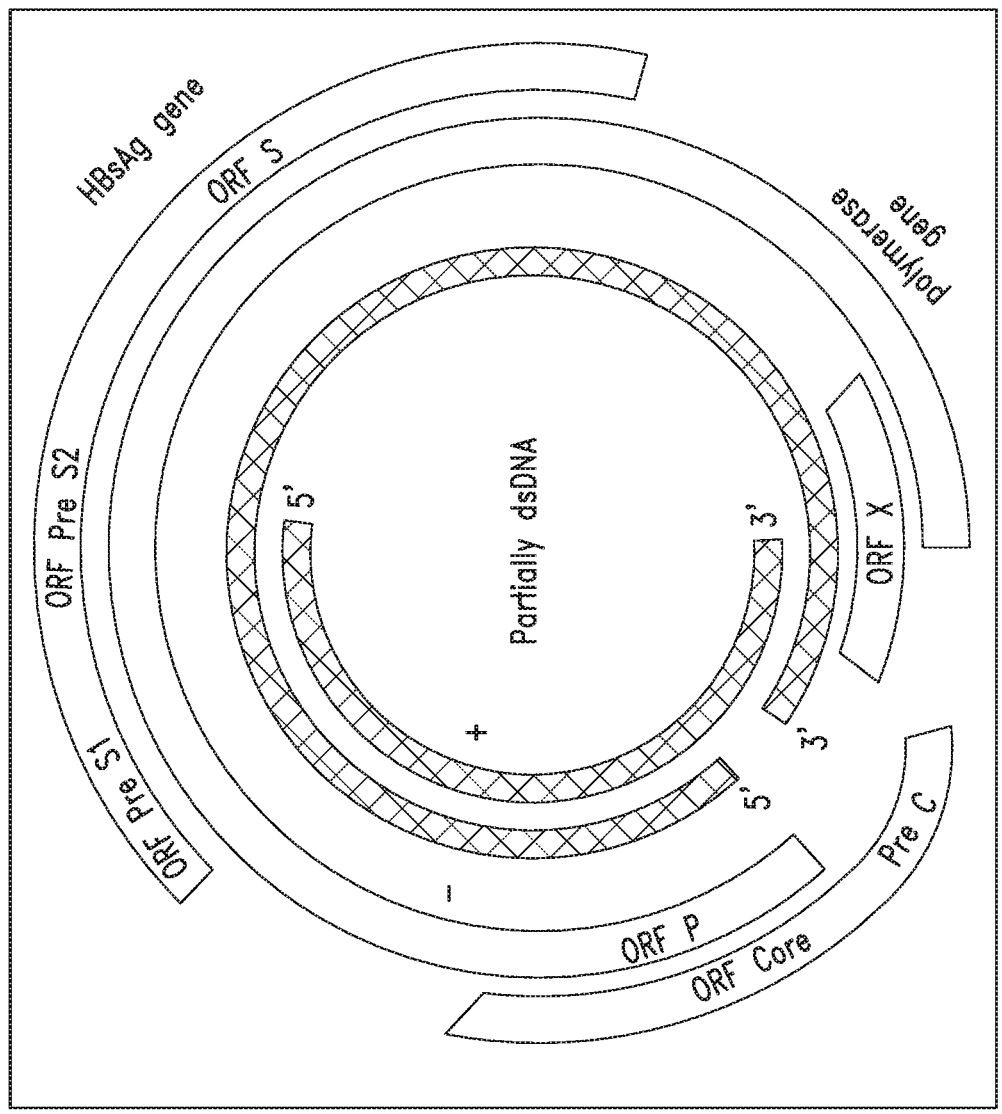
FIG. 1. HBV Genome Organization. Unlike other small chronic viruses such as HIV or HCV that display high mutations rates resulting in a quasispecies, the small (3.2 kb) DNA genome of HBV is more constrained in its ability to mutate due to overlapping open reading frames (ORFs).
Figure 2A:
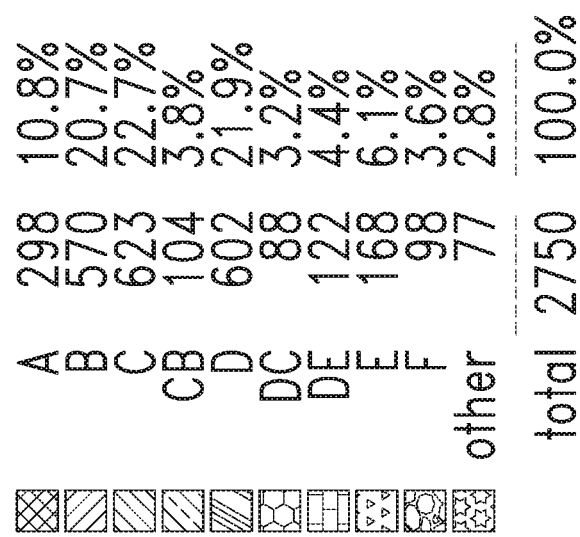
FIG. 2A-2B. World distribution of 3041 HBV sequences available from HBVdb. Genotypes of HBV are distributed throughout the world. Only sequences with a known sampling country are shown on the map.
Figure 2A:
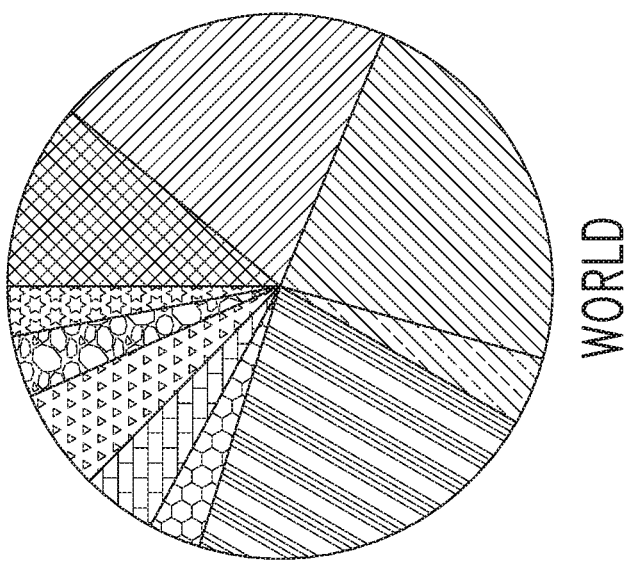
Figure 2B:
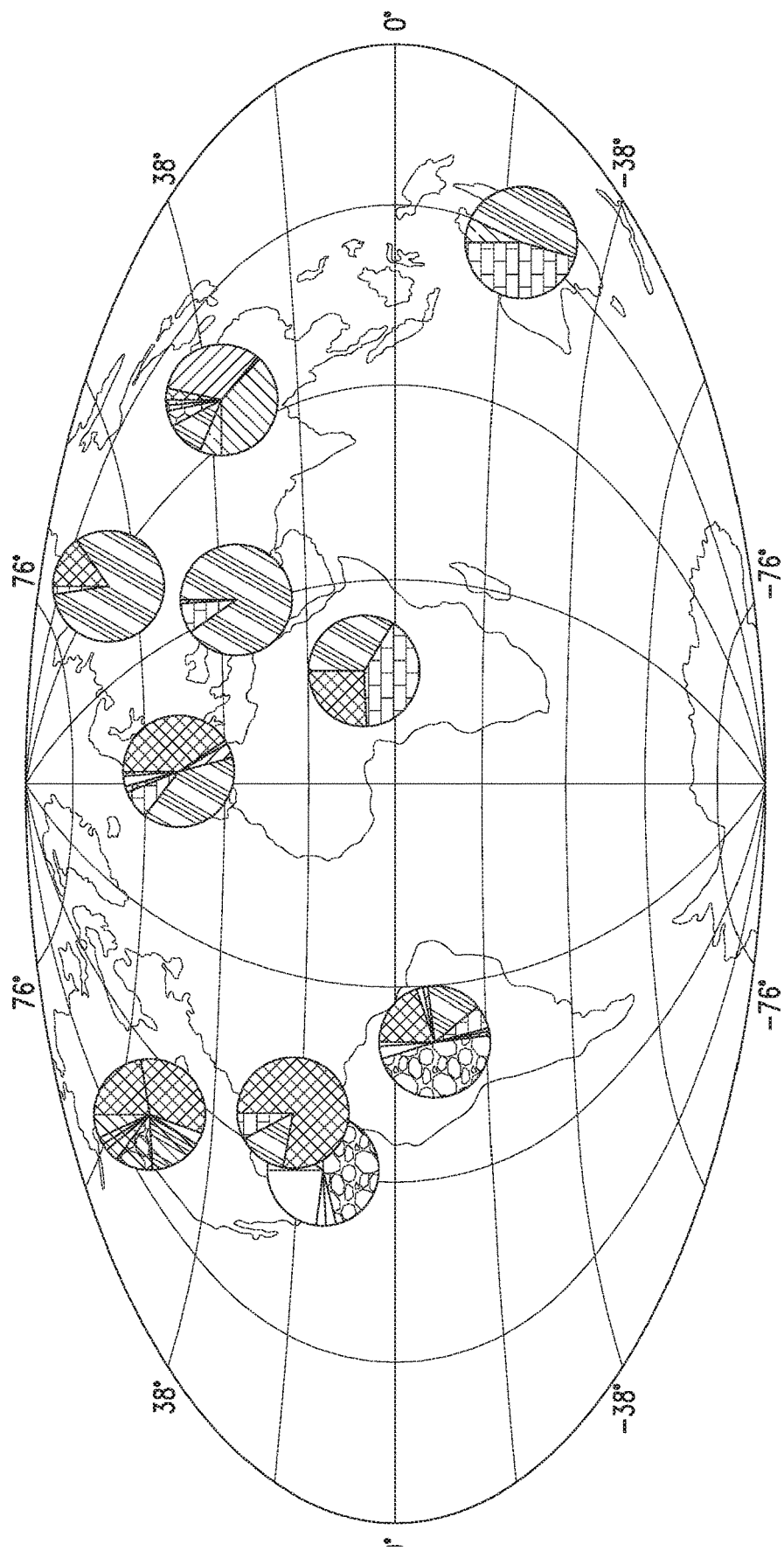
Figure 3A:
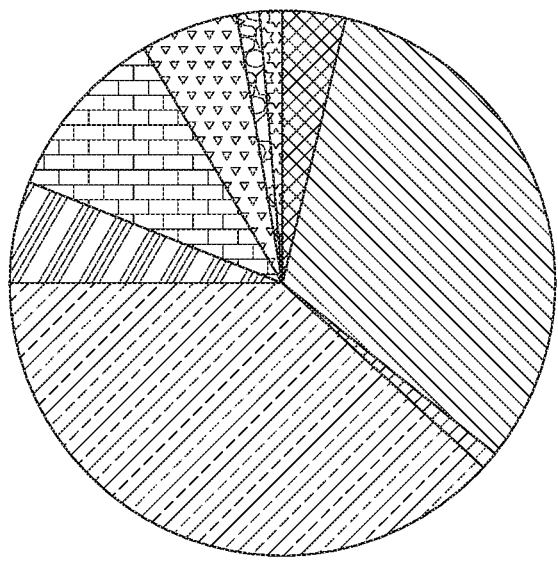
FIG. 3A-3B. Distribution of HBV sequences in Asia and in China that are available from HBVdb. Approximately 75% of the genotypes in Asia and particularly in China are genotypes B and C.
Figure 3A:
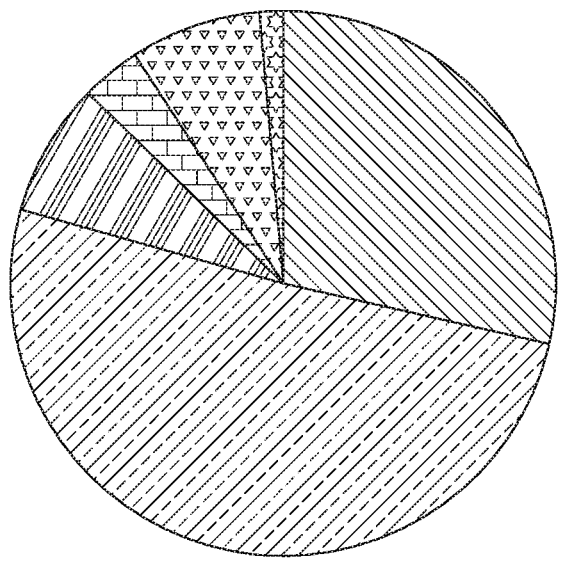
Figure 3B:
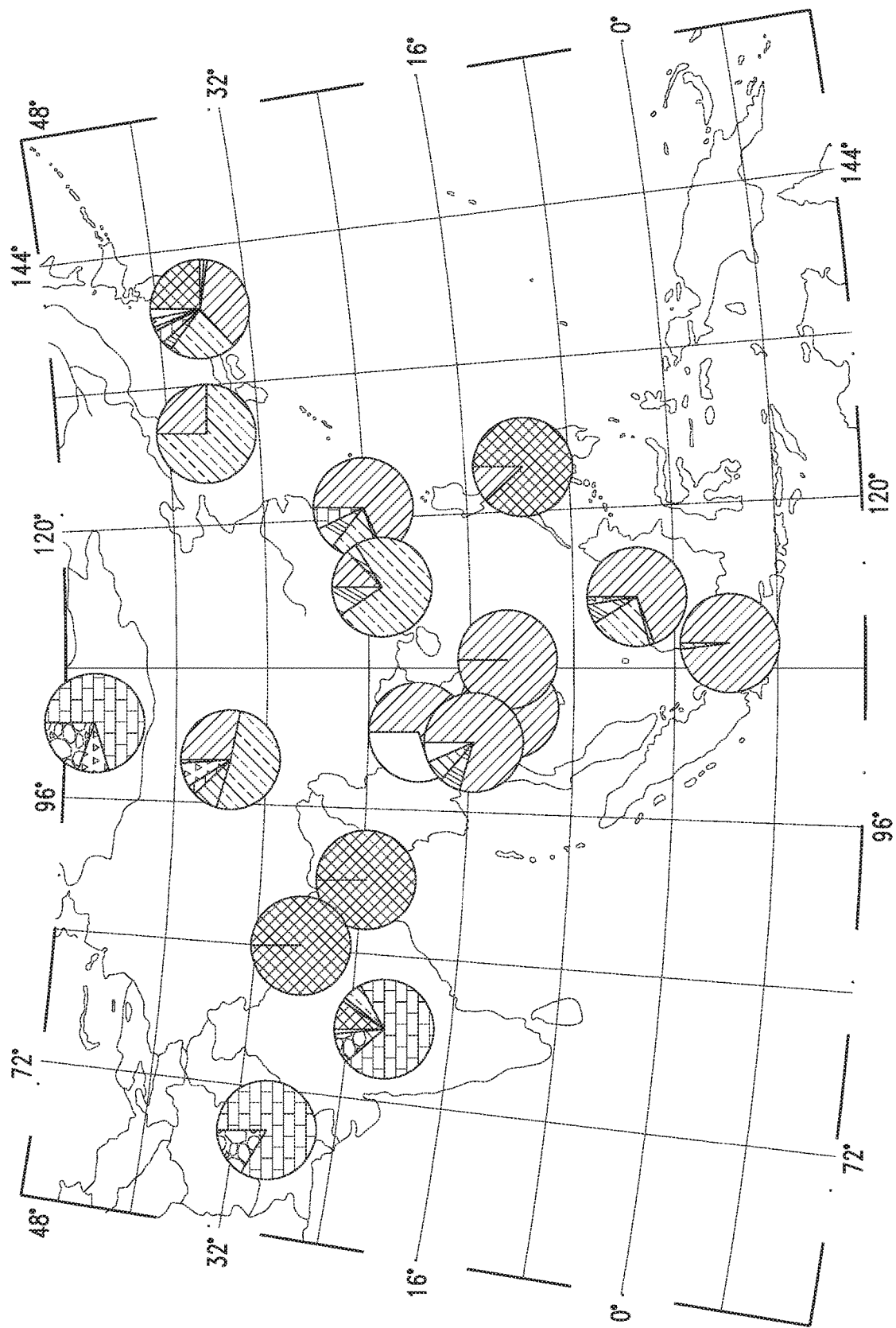

The term "comprise" means the presence of the stated features, integers, steps, or components as referred to in the claims, but does not preclude the presence or addition of one or more other features, integers, steps, components, or groups thereof. The term "consisting essentially of" limits the scope of a claim to the specified materials or steps and those that do not materially affect the basic and novel characteristics of the claimed subject matter.

The word "substantially" does not exclude "completely"; e.g., a composition which is "substantially free" from Y may be completely free from Y. Where necessary, the word "substantially" may be omitted from definitions provided herein.

As employed above and throughout the disclosure the term "effective amount" refers to an amount effective, at dosages, and for periods of time necessary, to achieve the desired result with respect to the treatment of the relevant disorder, condition, or side effect. It will be appreciated that the effective amount of components will vary from patient to patient not only with the particular vaccine, component or composition selected, the route of administration, and the ability of the components to elicit a desired result in the individual, but also with factors such as the disease state or severity of the condition to be alleviated, hormone levels, age, sex, weight of the individual, the state of being of the patient, and the severity of the pathological condition being treated, concurrent medication or special diets then being followed by the particular patient, and other factors which those skilled in the art will recognize, with the appropriate dosage being at the discretion of the attending physician. Dosage regimes may be adjusted to provide the improved therapeutic response. An effective amount is also one in which any toxic or detrimental effects of the components are outweighed by the therapeutically beneficial effects.

The term "administering" means either directly administering a compound or composition, or administering a prodrug, derivative or analog which will form an equivalent amount of the active compound or substance within the body.

The terms "subject," "individual," and "patient" are used interchangeably herein, and refer to an animal, for example a human, to whom treatment, including prophylactic treatment, with the pharmaceutical compositions disclosed herein, is provided. The term "subject" as used herein refers to human and non-human animals. The term "non-human animals" includes all vertebrates, e.g., mammals, such as non-human primates, (particularly higher primates), sheep, dog, rodent, (e.g., mouse or rat), guinea pig, goat, pig, cat, rabbits, cows, horses and non-mammals such as reptiles, amphibians, chickens, and turkeys.

The term "episensus" refers to an epitope-based consensus sequence. It is a sequence whose epitopes match, as closely as possible, the epitopes in a reference set of natural sequences. The terms "epitope" and "potential epitope" refer to a sequence of k characters (typically k is in the range of 8-12), often in the context of a k-character subsequence of a much longer natural or vaccine antigen sequence. T cells can recognize such peptides in an immune response.

The term "EpiGraph" refers to a computational strategy developed to create sequences that provide an optimal episensus sequence, or a set of sequences that when combined provide optimal coverage of a population of diverse viral sequences. The EpiGraph method was previously described in PCT Application No. WO 2016/054654 A1, and in Theiler, et al., *Sci. Rep.* 6:33987 (2016), the entireties of which are herein incorporated by reference. The EpiGraph method produces sets of artificial but intact antigens with maximized coverage of potential T cell epitopes (PTE, typically 9 mer peptide sequences) found in a diverse viral population. The EpiGraph is the next step over previous mosaic vaccine design methods. The graph-based EpiGraph method is much more computationally powerful than mosaics that use genetic algorithm, thus allowing an improved PTE coverage through substantially more combinations considered. Both EpiGraph and mosaic methods produce protein antigens with greater coverage of T cell epitope diversity than natural strains. HBV, HIV, and HCV mosaics elicited cellular immune responses of greater breadth and depth than combinations of natural strains or consensus immunogens. HBV mosaics, and HIV mosaics are in phase I clinical trials. In some embodiments, the EpiGraph algorithm is used to design "episensus" sequences corresponding to the conserved regions of HBV.

The term "episensus sequence" refers to the amino acid sequence of an artificial antigen that is designed using the EpiGraph algorithm based on a population of HBV sequences. An episensus sequence that is "central" to a population of HBV sequences is a computationally derived sequence that provides the maximal average epitope coverage of the population. An "episensus antigen" is an antigen comprising an episensus amino acid sequence.

As used herein, the terms "treatment" or "therapy" (as well as different forms thereof, including curative or palliative) refer to treatment of an infected person. As used herein, the term "treating" includes alleviating or reducing at least one adverse or negative effect or symptom of a condition, disease, or disorder. This condition, disease, or disorder can be HBV infection.

As used herein, the terms "prevention" or "prophylaxis" refer to preventing a subject from becoming infected with, or reducing the risk of a subject from becoming infected with, or halting transmission of, or the reducing the risk of transmission of, for example, HBV, or a related virus.

"Pharmaceutically acceptable" refers to those compounds, materials, compositions, and/or dosage forms that are, within the scope of sound medical judgment, suitable for contact with the tissues of human beings and animals without excessive toxicity, irritation, allergic response, or other problem complications commensurate with a reasonable benefit/risk ratio.

As used herein, the terms "vaccine," "immunogenic compound," and "immunogenic composition" are used interchangeably to refer to a compound or composition that induces an immune response in a subject. A prophylactic vaccine provides some degree of protection against new infections. A therapeutic vaccine assists in the treatment of an existing infection.

II. Antigens

Provided herein are polypeptides comprising sequences derived from certain HBV populations. In some embodiments, the polypeptide comprises the amino acid sequence as set forth in SEQ ID NOs:1-11 or SEQ ID NOs:14-36. In some embodiments, the polypeptide comprises two or more amino acid sequences as set forth in SEQ ID NOs:16-36. In some embodiments, the polypeptide comprises the amino acid sequence as set forth in SEQ ID NO:19 or 29, the amino acid sequence as set forth in SEQ ID NOs:16, 21, 27, 28, or 34, and the amino acid sequence as set forth in SEQ ID NOs:20, 22, 23, 30, 31, 33, 35, or 36. In some embodiments, the polypeptide comprises the amino acid sequence as set forth in SEQ ID NO:1. In some embodiments, the polypeptide comprises the amino acid sequence as set forth in SEQ ID NO:2. In some embodiments, the polypeptide comprises the amino acid sequence as set forth in SEQ ID NO:3. In some embodiments, the polypeptide comprises the amino acid sequence as set forth in SEQ ID NO:4. In some embodiments, the polypeptide comprises the amino acid sequence as set forth in SEQ ID NO:5. In some embodiments, the polypeptide comprises the amino acid sequence as set forth in SEQ ID NO:6. In some embodiments, the polypeptide comprises the amino acid sequence as set forth in SEQ ID NO:7. In some embodiments, the polypeptide comprises the amino acid sequence as set forth in SEQ ID NO:8. In some embodiments, the polypeptide comprises the amino acid sequence as set forth in SEQ ID NO:9. In some embodiments, the polypeptide comprises the amino acid sequence as set forth in SEQ ID NO:10. In some embodiments, the polypeptide comprises the amino acid sequence as set forth in SEQ ID NO:11. In some embodiments, the polypeptide comprises the amino acid sequence as set forth in SEQ ID NO:14. In some embodiments, the polypeptide comprises the amino acid sequence as set forth in SEQ ID NO:15. In some embodiments, the polypeptide comprises the amino acid sequence as set forth in SEQ ID NO:24. In some embodiments, the polypeptide comprises the amino acid sequence as set forth in SEQ ID NO:25. In some embodiments, the polypeptide comprises the amino acid sequence as set forth in SEQ ID NO:26. In some embodiments, the polypeptide comprises the amino acid sequence as set forth in SEQ ID NO:3 and the amino acid sequence as set forth in SEQ ID NO:4. In some embodiments, the polypeptide comprises the amino acid sequence as set forth in SEQ ID NO:5 and the amino acid sequence as set forth in SEQ ID NO:6. In some embodiments, the polypeptide comprises the amino acid sequence as set forth in SEQ ID NO:7 and the amino acid sequence as set forth in SEQ ID NO:8. In some embodiments, the polypeptide comprises the amino acid sequence as set forth in SEQ ID NO:9, the amino acid sequence as set forth in SEQ ID NO:10, and the amino acid sequence as set forth in SEQ ID NO:11. In any of the aforementioned embodiments, the polypeptide may further comprise one or more amino acid sequences as set forth in SEQ ID NOs:17 and 18.

In some embodiments, the present disclosure provides an immunogenic composition or vaccine comprising one or more of the aforementioned polypeptides. In certain embodiments, the immunogenic compositions comprise one of the aforementioned polypeptides. In other embodiments, the immunogenic compositions comprise two or more of the aforementioned polypeptides, which may be provided as a single polypeptide or as two or more polypeptides.

In certain embodiments, the polypeptides are episensus antigens, which comprise sequences derived from wild type HBV sequences using the EpiGraph method. In the Epi-Graph algorithm, the natural sequences are characterized by a large graph of nodes, each node corresponding to an epitope that appears in the natural sequences. Directed edges connect two nodes when the corresponding two epitope strings are "consistent", meaning the last k−1 characters in the first string agree with the first k−1 characters in the second string. If two strings are consistent, then together they form a string of length k+1. More generally, a path through this graph of nodes and edges corresponds to a single string that contains k-mer substrings corresponding to each of the nodes in the graph. Each node is weighted according to how many sequences in the reference set exhibit a substring corresponding to that node. The EpiGraph algorithm uses a dynamic programming scheme to find the path through this full graph that maximizes the sum of these weights, and therefore provides the greatest coverage.

In some embodiments, the episensus antigen is derived from the HBV C protein. In some embodiments, the episensus antigen is derived from the HBV Pol (P) or S protein, or another HBV protein. The episensus antigens may be derived from full-length protein sequences, regions of full-length protein sequences, or any combination thereof. In some embodiments, the episensus antigen comprises epitopes derived from two or more of the HBV C, P, and S protein. In some embodiments, the episensus antigen further comprises one or more epitopes derived from the PreS1 domain or the PreS2 domain. In some embodiments, the episensus antigen is derived from a conserved region of HBV. In some embodiments, the episensus antigen is derived from a conserved region of one or more of HBV C, S, and P.

In some embodiments, the episensus antigen comprises sequences derived from two or more of the HBV C, P, and S proteins, with the sequences reordered relative to their order in the HBV genome. Reordering of the sequences within the episensus antigen may provide for more efficient or otherwise improved in vitro expression of the antigen.

In some embodiments, the episensus antigen is derived from an HBV protein that has contains one or more mutations, such as deletions or substitutions of amino acids. In some embodiments, the mutation inactivates at least one function present in the wild type protein. For example, PreS1 may be inactivated by removing the myristoylation sequence in the N terminus of the protein, or Pol may be inactivated by deleting or mutating enzymatic active sites. In some embodiments, one or more mutations are present in the active site of the HBV ribonuclease H (RNAseH) and result in loss of RNAseH activity. Exemplary mutations are shown in Table 1.

In certain embodiments, the episensus antigen is developed using a selected HBV population, which results in an episensus antigen that is central to that population. For example, the HBV population may be HBV genotypes present in a selected geographic location, such as Asia, North America, South America, Europe, Africa, or Australia. In some embodiments, the episensus antigen is central to the HBV B regional epidemic in Asia or, more specifically, in China. In other embodiments, the episensus antigen is central to the HBV C regional epidemic in Asia or, more specifically, in China. In some embodiments, the episensus antigen is central to the HBV A regional epidemic in Asia or, more specifically, in China. In some embodiments, the episensus antigen is central to the HBV CB regional epidemic in Asia or, more specifically, in China. In some embodiments, the episensus antigen is central to the HBV D regional epidemic in Asia or, more specifically, in China. In some embodiments, the episensus antigen is central to the HBV DC regional epidemic in Asia or, more specifically, in China. In some embodiments, the episensus antigen is central to the HBV DE regional epidemic in Asia or, more specifically, in China. In some embodiments, the episensus antigen is central to the HBV E regional epidemic in Asia or, more specifically, in China. In some embodiments, the episensus antigen is central to the HBV F regional epidemic in Asia or, more specifically, in China.

In other embodiments, the episensus antigen is central to the HBV multi-genotype regional epidemic in North America. In some embodiments, the episensus antigen is central to the HBV A regional epidemic in North America. In some embodiments, the population episensus antigen is central to the HBV B regional epidemic in North America. In some embodiments, the episensus antigen is central to the HBV C regional epidemic in North America. In some embodiments, the episensus antigen is central to the HBV CB regional epidemic in North America. In some embodiments, the episensus antigen is central to the HBV D regional epidemic in North America. In some embodiments, the episensus antigen is central to the HBV DC regional epidemic in North America. In some embodiments, the episensus antigen is central to the HBV DE regional epidemic in North America. In some embodiments, the episensus antigen is central to the HBV E regional epidemic in North America. In some embodiments, the episensus antigen is central to the HBV F regional epidemic in North America.

In other embodiments, the episensus antigen is central to the HBV multi-genotype regional epidemic in South America. In some embodiments, the episensus antigen is central to the HBV A regional epidemic in South America. In some embodiments, the episensus antigen is central to the HBV B regional epidemic in South America. In some embodiments, the episensus antigen is central to the HBV C regional epidemic in South America. In some embodiments, the episensus antigen is central to the HBV CB regional epidemic in South America. In some embodiments, the episensus antigen is central to the HBV D regional epidemic in South America. In some embodiments, the episensus antigen is central to the HBV DC regional epidemic in South America. In some embodiments, the episensus antigen is central to the HBV DE regional epidemic in South America. In some embodiments, the episensus antigen is central to the HBV E regional epidemic in South America. In some embodiments, the episensus antigen is central to the HBV F regional epidemic in South America.

In other embodiments, the episensus antigen is central to the HBV multi-genotype regional epidemic in Europe. In some embodiments, the episensus antigen is central to the HBV A regional epidemic in Europe. In some embodiments, the episensus antigen is central to the HBV B regional epidemic in Europe. In some embodiments, the episensus antigen is central to the HBV C regional epidemic in Europe. In some embodiments, the episensus antigen is central to the HBV CB regional epidemic in Europe. In some embodiments, the episensus antigen is central to the HBV D regional epidemic in Europe. In some embodiments, the population episensus antigen is central to the HBV DC regional epidemic in Europe. In some embodiments, the episensus antigen is central to the HBV DE regional epidemic in Europe. In some embodiments, the episensus antigen is central to the HBV E regional epidemic in Europe. In some embodiments, the episensus antigen is central to the HBV F regional epidemic in Europe.

In other embodiments, the episensus antigen is central to the HBV multi-genotype regional epidemic in Africa. In some embodiments, the episensus antigen is central to the HBV A regional epidemic in Africa. In some embodiments, the episensus antigen is central to the HBV B regional epidemic in Africa. In some embodiments, the episensus antigen is central to the HBV C regional epidemic in Africa. In some embodiments, the episensus antigen is central to the HBV CB regional epidemic in Africa. In some embodiments, the episensus antigen is central to the HBV D regional epidemic in Africa. In some embodiments, the episensus antigen is central to the HBV DC regional epidemic in Africa. In some embodiments, the episensus antigen is central to the HBV DE regional epidemic in Africa. In some embodiments, the episensus antigen is central to the HBV E regional epidemic in Africa. In some embodiments, the episensus antigen is central to the HBV F regional epidemic in Africa.

In other embodiments, the episensus antigen is central to the HBV multi-genotype regional epidemic in Australia. In some embodiments, the episensus antigen is central to the HBV A regional epidemic in Australia. In some embodiments, the episensus antigen is central to the HBV B regional epidemic in Australia. In some embodiments, the episensus antigen is central to the HBV C regional epidemic in Australia. In some embodiments, the episensus antigen is central to the HBV CB regional epidemic in Australia. In some embodiments, the episensus antigen is central to the HBV D regional epidemic. In some embodiments, the episensus antigen is central to the HBV DC regional epidemic. In some embodiments, the episensus antigen is central to the HBV DE regional epidemic. In some embodiments, the episensus antigen is central to the HBV E regional epidemic. In some embodiments, the episensus antigen is central to the HBV F regional epidemic.

In other embodiments, the episensus antigen is central to the HBV Global set in the disclosed vaccines.

In some embodiments, the HBV episensus antigen is 1_CH_epi (SEQ ID NO:1), which was developed using 1044 HBV sequences from China. In some embodiments, the HBV episensus antigen is 1_GL_epi (SEQ ID NO:2), developed using the Global set of 3041 HBV sequences. In some embodiments, the episensus antigen is a combination of two or more individual episensus antigens. For example, in some embodiments, the episensus antigen comprises 2_CH_epi, which comprises two episensus antigens developed using 1044 HBV sequences from China (SEQ ID NO:3 and SEQ ID NO:4). In some embodiments, the episensus antigen comprises 2_CHGL_epi, which comprises a first episensus antigen, Epi1 (SEQ ID NO:5), developed using 1044 HBV sequences from China, and a second episensus antigen, Epi2 (SEQ ID NO:6), developed using the Global set of 3041 HBV sequences, with Epi1 already fixed in the solution. In other words, Epi2 is complementary to Epi1, developed with Epi1 already present. In some embodiments, the episensus antigen comprises a modified version of 2_CHGL_epi, which comprises Epi3 (SEQ ID NO:7) and Epi4 (SEQ ID NO:8). In some embodiments, the episensus antigen comprises 3_GL_epi, which comprises three episensus antigens (SEQ ID NO:9; SEQ ID NO:10; and SEQ ID NO:11), developed using the Global set of 3041 HBV sequences. In some embodiments, the episensus antigen comprises natural D subtype sequence (SEQ ID NO:12), GenBank accession number Y07587. In some embodiments, the episensus antigen comprises natural C subtype reference sequence (SEQ ID NO:13), GenBank accession number GQ358158. Each of the reference genes of accession numbers Y07587 and GQ358158 is incorporated by reference herein in its entirety. In some embodiments, the episensus antigen is a modified genotype D sequence of SEQ ID NO:14. In some embodiments, the episensus antigen is a re-ordered genotype D sequence of SEQ ID NO:15. In some embodiments, the episensus antigen comprises one or more of the sequences set forth in SEQ ID NOs:16-23 and SEQ ID NOs: 27-36. In some embodiments, the HBV episensus antigen comprises two or more of the sequences set forth in SEQ ID NO:1-SEQ ID NO:36.

Further provided herein are immunogenic compositions or vaccines comprising one or more of the aforementioned episensus antigens. The episensus antigens may be delivered as DNA, RNA, or polypeptides. In certain embodiments, the vaccines comprise a single antigen. In other embodiments, the vaccines comprise two or more antigens, which may be provided as a single polypeptide or as two or more polypeptides. In certain embodiments, the vaccines comprise episensus antigens that provide efficient epitope coverage for selected HBV genotypes, such as the genotypes present in a selected geographic location. The vaccines provided herein may be prophylactic vaccines or therapeutic vaccines. In some embodiments, the vaccine comprises one or more polypeptides and a pharmaceutically acceptable carrier or excipient.

In some embodiments, the vaccine comprises two episensus antigens developed using HBV sequences from China. In certain embodiments, the vaccine comprises episensus antigens comprising the sequences set forth in SEQ ID NO:3 and SEQ ID NO:4, which may be provided as one polypeptide or as two polypeptides. In some embodiments, the vaccine comprises an episensus antigen developed using HBV sequences from China and an episensus antigen developed using HBV sequences from the Global set. In certain embodiments, the vaccine comprises episensus antigens comprising the sequences set forth in SEQ ID NO:5 and SEQ ID NO:6, which may be provided as one polypeptide or as two polypeptides. In certain embodiments, the vaccine comprises episensus antigens comprising the sequences set forth in SEQ ID NO:7 and SEQ ID NO:8, which may be provided as one polypeptide or as two polypeptides. In some embodiments, the vaccine comprises three episensus antigens developed using HBV sequences from the Global set. In certain embodiments, the vaccine comprises episensus antigens comprising the sequences set forth in SEQ ID NO:9, SEQ ID NO:10, and SEQ ID NO:11, which may be provided as one polypeptide, as two polypeptides, or as three polypeptides.

III. Polynucleotides and Vectors

In some embodiments, the present disclosure provides a polynucleotide sequence that encodes a polypeptide. The polynucleotide may be DNA or RNA, and may encode any of the aforementioned antigens. In some embodiments, the polynucleotide encodes a polypeptide comprising the amino acid sequence as set forth in one or more of SEQ ID NOs:1-36. In some embodiments, the polynucleotide sequence is codon optimized for expression in a particular host.

In some embodiments, the polynucleotide encodes a polypeptide comprising the amino acid sequence as set forth in SEQ ID NOs:1-11 or SEQ ID NOs:14-36. In some embodiments, the polynucleotide encodes a polypeptide comprising two or more amino acid sequences as set forth in SEQ ID NOs:16-36. In some embodiments, the polynucleotide encodes a polypeptide comprising the amino acid sequence as set forth in SEQ ID NOs:19 or 29, the amino acid sequence as set forth in SEQ ID NOs:16, 21, 27, 28, or 34, and the amino acid sequence as set forth in SEQ ID NOs:20, 22, 23, 30, 31, 33, 35, or 36. In some embodiments, the polynucleotide encodes a polypeptide comprising the amino acid sequence as set forth in SEQ ID NO:1. In some embodiments, the polynucleotide encodes a polypeptide comprising the amino acid sequence as set forth in SEQ ID NO:2. In some embodiments, the polynucleotide encodes a polypeptide comprising the amino acid sequence as set forth in SEQ ID NO:3. In some embodiments, the polynucleotide encodes a polypeptide comprising the amino acid sequence as set forth in SEQ ID NO:4. In some embodiments the polynucleotide encodes a polypeptide comprising the amino acid sequence as set forth in SEQ ID NO:5. In some embodiments, the polynucleotide encodes a polypeptide comprising the amino acid sequence as set forth in SEQ ID NO:6. In some embodiments, the polynucleotide encodes a polypeptide comprising the amino acid sequence as set forth in SEQ ID NO:7. In some embodiments, the polynucleotide encodes a polypeptide comprising the amino acid sequence as set forth in SEQ ID NO:8. In some embodiments, the polynucleotide encodes a polypeptide comprising the amino acid sequence as set forth in SEQ ID NO:9. In some embodiments, the polynucleotide encodes a polypeptide comprising the amino acid sequence as set forth in SEQ ID NO:10. In some embodiments, the polynucleotide encodes a polypeptide comprising the amino acid sequence as set forth in SEQ ID NO:11. In some embodiments, the polynucleotide encodes a polypeptide comprising the amino acid sequence as set forth in SEQ ID NO:14. In some embodiments, the polynucleotide encodes a polypeptide comprising the amino acid sequence as set forth in SEQ ID NO:15. In some embodiments, the polynucleotide encodes a polypeptide comprising the amino acid sequence as set forth in SEQ ID NO:24. In some embodiments, the polynucleotide encodes a polypeptide comprising the amino acid sequence as set forth in SEQ ID NO:25. In some embodiments, the polynucleotide encodes a polypeptide comprising the amino acid sequence as set forth in SEQ ID NO:26. In some embodiments, the polynucleotide encodes a polypeptide comprising the amino acid sequence as set forth in SEQ ID NO:3 and the amino acid sequence as set forth in SEQ ID NO:4. In some embodiments, the polynucleotide encodes a polypeptide comprising the amino acid sequence as set forth in SEQ ID NO:5 and the amino acid sequence as set forth in SEQ ID NO:6. In some embodiments, the polynucleotide encodes a polypeptide comprising the amino acid sequence as set forth in SEQ ID NO:7 and the amino acid sequence as set forth in SEQ ID NO:8. In some embodiments, the polynucleotide encodes a polypeptide comprising the amino acid sequence as set forth in SEQ ID NO:9, the amino acid sequence as set forth in SEQ ID NO:10, and the amino acid sequence as set forth in SEQ ID NO:11. In any of the aforementioned embodiments, the polynucleotide may further encode a polypeptide comprising one or more amino acid sequences as set forth in SEQ ID NOs:17 and 18.

In some embodiments, the present disclosure provides a composition, e.g., an immunogenic composition, comprising two or more of the aforementioned polynucleotides.

In some embodiments, the present disclosure provides a vaccine comprising one or more of the aforementioned polynucleotides. In certain embodiments, the vaccine further comprises an pharmaceutically acceptable carrier or excipient.

Further provided herein are vectors that comprise any of the aforementioned polynucleotides. Vectors that can be used include, but are not limited to, plasmids, bacterial vectors, and viral vectors. Viral vectors include cytomegalovirus vectors. An advantage of CMV vectors for use in therapeutic vaccine delivery is that they can be used to elicit particular CD8+ T cell responses and induce more potent and enduring responses. It has been shown in animal models that vaccines based on these viral vectors can clear viral infections (Hansen et al., *Science* 340:1237874 (2013)), and so these approaches have promise for a therapeutic vaccine (also: Hansen et al, *Science* 351:714-720 (2016))

Other viral vectors can include poxvirus, including vaccinia Ankara and canary pox; adenoviruses, including adenovirus type 5 (Ad5); rubella; sendai virus; rhabdovirus;

alphaviruses; and adeno-associated viruses. Alternatively, vaccine antigens could be delivered as DNA, RNA or protein components of a vaccine. Episensus antigens would be compatible with essentially any mode of vaccine antigen delivery.

In some aspects, the present disclosure provides vector-based immunogenic compositions or vaccines in which an expression vector is used to deliver a nucleic acid encoding one or more antigens disclosed herein. For example, the expression vector may be a poxvirus, adenovirus, rubella, sendai virus, rhabdovirus, alphavirus, or adeno-associated virus backbone.

In some embodiments, a CMV vector is used in the compositions and methods disclosed herein. Several aspects render chronic HBV infection particularly suited for immunotherapeutic intervention by CMV vectors.

First, the vast majority of individuals with a mature immune system readily mount an effective immune response and clear acute infection. Since this immune clearance is mostly mediated by cytokine-producing CD8+ T cells, it appears that the induction of active liver resident effector CD8+ T cell (TEM) responses is crucial for HBV clearance. Thus, the induction of sustained, effector HBV-specific CD8+ T cells in the liver of CHB patients should suffice to control and eventually eliminate HBV. TEM-frequencies induced by CMV-based vectors are particularly high in the liver of inoculated rhesus macaques (RM) (Hansen et al., *Nature* 473:523-527 (2011), at supplemental FIG. 1).

Second, unlike other small chronic viruses such as HIV or HCV that display high mutations rates resulting in a quasispecies, the small (3.2 kb) DNA genome of HBV is more constrained in its ability to mutate due to overlapping open reading frames (ORFs) (FIG. 1).

Unfortunately, T cells elicited by traditional vaccination approaches (e.g., peptide-based, protein-based, DNA, and even heterologous prime-boost T cell inducing regimens involving both DNA and pox viral vectors) are no longer detectable in the periphery after a few months, which may be too short to completely prevent the survival of residual HBV genomes that can potentially provide a source for viral rebound. In contrast, only CMV-vector induced TEM are persistently maintained in circulation and in the liver at high frequencies for years (Hansen et al., *Nature* 2011).

In certain embodiments, the vector comprises a human CMV (HCMV) vector or a rhesus CMV (RhCMV) vector comprising a HCMV or RhCMV backbone and one or more polynucleotides encoding an antigen. The one or more polynucleotides may encode any of the aforementioned antigens. In some embodiments, the polynucleotide encodes two or more of the aforementioned antigens. In some embodiments, the vector comprises two or more polynucleotides, each polynucleotide encoding one or more of the aforementioned antigens.

The present disclosure further provides for compositions comprising two or more vectors, each comprising one or more polynucleotides encoding one or more of the aforementioned antigens.

In some embodiments, the CMV vector lacks the UL82 gene, which encodes the tegument protein pp71. In some embodiments, the UL82 gene is replaced with one or more polynucleotides encoding one or more of the aforementioned antigens. In some embodiments, the CMV vector lacks the UL128-UL130 gene region. In some embodiments, the CMV vector lacks the UL146-UL147 gene region. In some embodiments, the CMV vector lacks the UL128-UL130 gene region and lacks the UL146-147 gene region. In some embodiments, the CMV vector has an intact UL128-UL130 gene region and an intact UL146-UL147 gene region. The UL128-UL130 gene region includes the UL128 gene, the UL130 gene, and any region in between the UL128 gene and the UL130 gene. The UL146-UL147 gene region includes the UL146 gene, the UL147 gene, and any region in between the UL146 gene and the UL147 gene.

In certain aspects, the present disclosure provides for immunogenic compositions or vaccines comprising the aforementioned vectors. Immune responses elicited by CMV vectors are not affected by pre-existing anti-vector immunity, thus enabling the sequential use of the same vector for different antigens (Hansen et al., *Nature Medicine* 15:293-299 (2009)). In part, the ability to super-infect is due to viral inhibitors of MHC-I-mediated antigen presentation to CD8+ T cells (Hansen et al., *Science* 328:102-106 (2010)). Since almost the entire human population, including most CHB patients, is chronically infected with HCMV, super-infection is an important feature, enabling the use of CMV vectors regardless of recipient CMV-status. CMV vectors have unique immunology. A surprising and unexpected feature of certain modified RhCMV/SIV vectors was the finding that these vectors elicited CD8+ T cells that did not recognize any of the epitopes recognized by conventional MHCIa-restricted CD8+ T cells in response to SIV infection itself, or in response to any other vector platform expressing SIV antigens. Nevertheless, CMV-vector-elicited CD8+ T cells recognized 3× as many peptides within a given antigen, as shown in PCT/US2016/017373, the entirety of which is herein incorporated by reference (see also Hansen et al., *Science* 2013, 2016).

The underlying reason for this remarkable breadth was determined by analyzing the restriction elements for individual peptides of given antigens (CMV, SIV, TB) in more than 100 animals, and demonstrates an astonishing feature of CMV vectors: each of the peptides induced by the Rh 68-1 vector was either presented by MHC-II, which is normally recognized by CD4+ T cells, or by MHC-E, a non-polymorphic MHC-I molecule that normally binds the MHC-I-derived peptide VMAPRTLLL (VL9) and acts as a ligand for inhibitory NKG2A NK cell receptors. (Of note, the CD4+ T cells are all conventional, i.e., restricted by MHC-II.) Remarkably, strain 68-1 RhCMV-induced CD8+ T cell responses to overlapping peptide pools covering entire antigens can be completely blocked by addition of VL9 (inhibiting MHC-E) or invariant-chain derived CLIP (inhibiting MHC-II), thus demonstrating that all CD8+ T cell epitopes are "unconventional" (Hansen et al., *Science* 2016). While both MHC-II and MHC-E-restricted CD8+ T cells have been observed occasionally in other infectious diseases and cancer, the abundant presence of such T cells in RhCMV-immunized animals is unprecedented and truly paradigm-breaking. Importantly, RhCMV-vector induced MHC-II and MHC-E and MHC-Ia-non-canonical (discussed below) restricted CD8+ T cells recognize SIV-infected CD4+ T cells, suggesting that unconventional antigen presentation can occur in SIV-infected cells, even if SIV is unable to prime such a response. Since many chronic viruses, including HCV, upregulate HLA-E, presumably as a defense against NK cells, this highly conserved MHC molecule represents a new target for immunotherapy. (The expression of HLA-E in HBV-infected hepatocytes is less well known compared to HCV, but high levels of circulating HLA-E are found in chronic HBV carriers). The ability to elicit MHC-E restricted CD8+ T cells thus opens the possibility to target HBV via this highly conserved restriction element.

Particular patterns of gene modifications in CMV vectors are associated with various T cell responses. Unconventional CD8+ T cells are induced by vectors that lack the UL128-UL130 gene region and the UL146-UL147 gene region (Hansen et al., Science 2013, 2016, OHSU2346). In contrast, CD8+ T cell responses induced by natural RhCMV infection or to a UL128-UL130-repaired version of RhCMV (Rh68-1) are conventional, i.e., MHC-I restricted (Hansen et al., Science 2013). However, even the conventional CD8+ T cell responses elicited by UL128-UL130-intact vectors are still significantly broader than those induced by non-CMV vectors (Hansen et al., Science 2013). Moreover, this broad conventional CD8+ T cell response is entirely directed to subdominant ("non-canonical") epitopes, as the immune evasion gene US11 prevents induction of T cells recognizing "canonical" (i.e., immunodominant) MHC-I epitopes (Hansen et al., Science 2013). Thus, genetically modified CMV vectors are able to elicit four different CD8+ T cell populations that each recognize a set of non-overlapping epitopes and classified as follows: 1. Unconventional, MHC-II restricted; 2. Unconventional, MHC-E restricted; 3. Conventional MHC-I restricted, non-canonical (=subdominant); 4. Conventional, MHC-I restricted, canonical (=immunodominant). The presence or absence of the UL128-UL130 and UL146-UL147 gene regions determines the switch from conventional to unconventional CD8+ T cells, whereas canonical CD8+ T cells are induced in the absence of US11 in both vectors in which UL128-UL130 and UL146-UL147 are present and vectors in which UL128-130 and UL146-UL147 are absent.

In some embodiments, the present disclosure provides an immunogenic composition or vaccine comprising any of the aforementioned vectors and one or more polynucleotides encoding an antigen. The one or more polynucleotides may encode any of the aforementioned antigens. In some embodiments, the polynucleotide encodes two or more of the aforementioned antigens. The two or more polypeptides may be expressed by the same or different promoters. In some embodiments, the vector comprises two or more polynucleotides, each polynucleotide encoding one or more of the aforementioned antigens. In certain embodiments, the vaccine comprises one or more of the aforementioned vectors and a pharmaceutically acceptable carrier or excipient.

III. Methods of Treatment

In certain embodiments, methods of treating HBV in a subject comprising administering an effective amount of an immunogenic composition or vaccine comprising one or more of the aforementioned polypeptides, polynucleotides, vectors, or compositions to the subject in need thereof are provided. In some embodiments, the vaccine comprises one or more antigens or polynucleotides encoding antigens that are selected to efficiently cover the HBV genotype diversity within a geographical area. In some embodiments, the vaccine is provided in the form of one or more polypeptides. In other embodiments, the vaccine is provided in the form of one or more polynucleotides, which may be provided in a recombinant viral vector. In any of the aforementioned embodiments, the vaccine may further comprise one or more pharmaceutically acceptable carriers or excipients.

In some embodiments, methods of inducing or generating an immune response in a subject are provided. Such methods comprise administering an effective amount of an immunogenic composition or vaccine comprising one or more of the aforementioned polypeptides, polynucleotides, vectors, or compositions to the subject in need thereof are provided. In some embodiments, the vaccine comprises one or more antigens or polynucleotides encoding antigens that are selected to efficiently cover the HBV genotype diversity within a geographical area. In some embodiments, the vaccine is provided in the form of one or more polypeptides. In other embodiments, the vaccine is provided in the form of one or more polynucleotides, which may be provided in a recombinant viral vector. In any of the aforementioned embodiments, the vaccine may further comprise one or more pharmaceutically acceptable carriers or excipients.

Some embodiments include methods of treating an HBV infection in a subject comprising administering an effective amount of an immunogenic composition or vaccine comprising one or more of the aforementioned polypeptides, polynucleotides, vectors, or compositions to the subject in need thereof. In some embodiments, the vaccine comprises one or more antigens or polynucleotides encoding antigens that are selected to efficiently cover the HBV genotype diversity within a geographical area. In some embodiments, the vaccine is provided in the form of one or more polypeptides. In other embodiments, the vaccine is provided in the form of one or more polynucleotides, which may be provided in a recombinant viral vector. In any of the aforementioned embodiments, the vaccine may further comprise one or more pharmaceutically acceptable carriers or excipients.

The present disclosure further provides for methods of protecting a subject from an HBV infection comprising administering an effective amount of an immunogenic composition or vaccine comprising one or more of the aforementioned polypeptides, polynucleotides, vectors, or compositions to the subject in need thereof. In some embodiments, the vaccine comprises one or more antigens or polynucleotides encoding antigens that are selected to efficiently cover the HBV genotype diversity within a geographical area. In some embodiments, the vaccine is provided in the form of one or more polypeptides. In other embodiments, the vaccine is provided in the form of one or more polynucleotides, which may be provided in a recombinant viral vector. In any of the aforementioned embodiments, the vaccine may further comprise one or more pharmaceutically acceptable carriers or excipients.

Some embodiments include methods of inducing an effector memory T cell response comprising determining one or more episensus sequences, generating a vaccine comprising a vector comprising one or more polynucleotides encoding the one or more episensus sequences, and administering the vaccine to a subject in need thereof. Some embodiments include methods of inducing an effector memory T cell response comprising determining one or more episensus sequences, generating a vaccine comprising one or more antigens having the amino acid sequence of the one or more episensus sequences, and administering the vaccine to a subject in need thereof. In some embodiments, methods are provided of inducing an effector memory T cell response wherein the one or more episensus sequences comprises 1_CH_epi (SEQ ID NO:1), 1_GL_epi (SEQ ID NO:2), 2_CH_epi, which comprises the amino acid sequences set forth in SEQ ID NO:3 and SEQ ID NO:4, 2_CHGL_epi, which comprises the amino acid sequences set forth in (SEQ ID NO:5 and SEQ ID NO:6, 2_CHGL_epi, which comprises the amino acid sequences set forth in SEQ ID NO:7 and SEQ ID NO:8, 3_GL_epi, which comprises the amino acid sequences set forth in SEQ ID NO:9, SEQ ID NO:10, and SEQ ID NO:11, natural D subtype sequence (SEQ ID NO:12), natural C subtype reference sequence (SEQ ID NO:13), the modified genotype D sequence of SEQ ID NO:14, and the re-ordered genotype D sequence of SEQ ID NO:15. In some embodiments, methods are provided of inducing an effector memory T cell response wherein the one or more episensus sequences comprises one or more of the sequences set forth in SEQ ID NOs:16-23 and SEQ ID NOs:27-36. In some embodiments, methods are provided of inducing an effector memory T cell response wherein the one or more episensus sequences comprise two or more of SEQ ID NO:1-SEQ ID NO:36.

Some embodiments include methods of inducing an effector memory T cell response comprising generating an immunogenic composition or vaccine comprising one or more of the aforementioned polynucleotides encoding one or more episensus antigens and administering the immunogenic composition or vaccine to a subject in need thereof. Some embodiments include methods of inducing an effector memory T cell response comprising generating an immunogenic composition or vaccine comprising one or more of the aforementioned episensus antigens and administering the immunogenic composition or vaccine to a subject in need thereof. In some embodiments, methods are provided of inducing an effector memory T cell response wherein the one or more episensus sequences comprises 1_CH_epi (SEQ ID NO:1), 1_GL_epi (SEQ ID NO:2), 2_CH_epi, which comprises the amino acid sequences set forth in SEQ ID NO:3 and SEQ ID NO:4, 2_CHGL_epi, which comprises the amino acid sequences set forth in (SEQ ID NO:5 and SEQ ID NO:6, 2_CHGL_epi, which comprises the amino acid sequences set forth in SEQ ID NO:7 and SEQ ID NO:8, 3_GL_epi, which comprises the amino acid sequences set forth in SEQ ID NO:9, SEQ ID NO:10, and SEQ ID NO:11, natural D subtype sequence (SEQ ID NO:12), natural C subtype reference sequence (SEQ ID NO:13), the modified genotype D sequence of SEQ ID NO:14, and the re-ordered genotype D sequence of SEQ ID NO:15. In some embodiments, methods are provided of inducing an effector memory T cell response wherein the one or more episensus sequences comprises one or more of the sequences set forth in SEQ ID NOs:16-23 and SEQ ID NOs:27-36. In some embodiments, methods are provided of inducing an effector memory T cell response wherein the one or more episensus sequences comprise two or more of SEQ ID NO:1-SEQ ID NO:36.

In any of the aforementioned embodiments, the immunogenic composition or vaccine may be a prophylactic vaccine or a therapeutic vaccine.

Recent breakthroughs in HBV vaccine research include the concept of an effector memory T cell (TEM)-inducing vaccine to prevent HBV infection. Unlike central memory T cells (TCM) induced by traditional vaccine approaches, TEM are persistently maintained in lymphoid tissues and extralymphoid effector sites and are immediately ready to mediate anti-viral effector function, thus providing a constant immune shield at the portals of viral entry and sites of viral reactivation. The most qualified vector system to induce and indefinitely maintain TEM is derived from CMV. Presumably due to continuous, low-level reactivation and/or gene expression in persistently infected cells, CMV maintains just the right amount of persistent, low level immune stimulation required for TEM maintenance without triggering T cell exhaustion.

In certain embodiments, the immunogenic composition or vaccine can be used in a therapeutic vaccine setting. For example, the vaccine can be designed using a k-means clustering strategy to identify a set of 6-10 antigen sequences that provide good coverage of epitopes in a population of people that are infected with a highly variable pathogen, such as HBV. In some embodiments, the virus infecting a subject is sequenced and two or three vaccines (or one or more vaccine comprising two or three polypeptides or one or more polynucleotides encoding two or three polypeptides) are delivered that provide good coverage of epitopes in the infecting virus. Thus, efficient epitope coverage is provided, while epitope mismatches between the vaccine and the infecting strain are minimized.

Certain embodiments provided include an immunogenic composition or vaccine comprising a HCMV backbone vector, which lacks certain CMV gene regions, and a polynucleotide encoding an episensus antigen. In certain embodiments, the HCMV backbone lacks the UL128-UL130 gene region (which includes the UL128 gene, the UL130 gene, and any region in between the UL128 gene and the UL130 gene) and the UL146-UL147 gene region (which includes the UL146 gene, the UL147 gene, and any region in between the UL146 gene and the UL147 gene). Certain embodiments can also include deletion of the tegument protein pp71 (UL82) gene. (U.S. Patent Application Publication Nos. 2014/0141038; 2008/0199493; 2013/0142823; and International Application Publication No. WO/2014/138209).

In some embodiments, the present disclosure provides any of the aforementioned polypeptides, polynucleotides, vectors, vaccines, or compositions for use in treating HBV infection. In some embodiments, the present disclosure provides any of the aforementioned polypeptides, polynucleotides, vectors, vaccines, or compositions for use in protecting a subject from an HBV infection.

The present disclosure further provides for the use of any of the aforementioned polypeptides, polynucleotides, vectors, vaccines, or compositions for the manufacture of a medicament for use in the treatment of an HBV infection. In some embodiments, present disclosure further provides for the use of any of the aforementioned polypeptides, polynucleotides, vectors, immunogenic compositions, vaccines, or compositions for the manufacture of a medicament for use in protecting a subject from an HBV infection.

Typical routes of administering the polypeptides, polynucleotides, vector, vaccines, or compositions described herein include, without limitation, oral, topical, transdermal, inhalation, parenteral, sublingual, buccal, rectal, vaginal, and intranasal. The term "parenteral", as used herein, includes subcutaneous injections, intravenous, intramuscular, intrasternal injection or infusion techniques. In certain embodiments, administering comprises administering by a route that is selected from oral, intravenous, parenteral, intragastric, intrapleural, intrapulmonary, intrarectal, intradermal, intraperitoneal, intratumoral, subcutaneous, topical, transdermal, intracisternal, intrathecal, intranasal, and intramuscular.

Pharmaceutical compositions according to certain embodiments of the present invention are formulated so as to allow the active ingredients contained therein to be bioavailable upon administration of the composition to a patient. Compositions that will be administered to a subject or patient may take the form of one or more dosage units, where for example, a tablet may be a single dosage unit, and a container of a herein described polypeptides, polynucleotides, vector, vaccines, or compositions in liquid form may hold a plurality of dosage units. Actual methods of preparing such dosage forms are known, or will be apparent, to those skilled in this art; for example, see Remington: The Science and Practice of Pharmacy, 20th Edition (Philadelphia College of Pharmacy and Science, 2000). The composition to be administered will, in any event, contain an effective amount of polypeptide, polynucleotide, vector, vaccine, or composition of the present disclosure, for treatment or prevention of HBV in accordance with teachings herein.

A composition may be in the form of a solid or liquid. In some embodiments, the carrier(s) are particulate, so that the compositions are, for example, in tablet or powder form. The carrier(s) may be liquid, with the compositions being, for example, an oral oil, injectable liquid or an aerosol, which is useful in, for example, inhalatory administration. When intended for oral administration, the pharmaceutical composition is preferably in either solid or liquid form, where semi solid, semi liquid, suspension and gel forms are included within the forms considered herein as either solid or liquid.

As a solid composition for oral administration, the pharmaceutical composition may be formulated into a powder, granule, compressed tablet, pill, capsule, chewing gum, wafer, or the like. Such a solid composition will typically contain one or more inert diluents or edible carriers. In addition, one or more of the following may be present: binders such as carboxymethylcellulose, ethyl cellulose, microcrystalline cellulose, gum tragacanth, or gelatin; excipients such as starch, lactose or dextrins, disintegrating agents such as alginic acid, sodium alginate, Primogel, corn starch, and the like; lubricants such as magnesium stearate or Sterotex; glidants such as colloidal silicon dioxide; sweetening agents such as sucrose or saccharin; a flavoring agent such as peppermint, methyl salicylate, or orange flavoring; and a coloring agent. When the composition is in the form of a capsule, for example, a gelatin capsule, it may contain, in addition to materials of the above type, a liquid carrier such as polyethylene glycol or oil.

The composition may be in the form of a liquid, for example, an elixir, syrup, solution, emulsion, or suspension. The liquid may be for oral administration or for delivery by injection, as two examples. When intended for oral administration, preferred compositions contain, in addition to the present compounds, one or more of a sweetening agent, preservatives, dye/colorant, and flavor enhancer. In a composition intended to be administered by injection, one or more of a surfactant, preservative, wetting agent, dispersing agent, suspending agent, buffer, stabilizer, and isotonic agent may be included.

Liquid pharmaceutical compositions, whether they be solutions, suspensions or other like form, may include one or more of the following adjuvants: sterile diluents such as water for injection, saline solution, preferably physiological saline, Ringer's solution, isotonic sodium chloride, fixed oils such as synthetic mono or diglycerides which may serve as the solvent or suspending medium, polyethylene glycols, glycerin, propylene glycol, or other solvents; antibacterial agents such as benzyl alcohol or methyl paraben; antioxidants such as ascorbic acid or sodium bisulfite; chelating agents such as ethylenediaminetetraacetic acid; buffers such as acetates, citrates, or phosphates and agents for the adjustment of tonicity such as sodium chloride or dextrose. The parenteral preparation can be enclosed in ampoules, disposable syringes, or multiple dose vials made of glass or plastic. Physiological saline is a preferred adjuvant. An injectable pharmaceutical composition is preferably sterile. A liquid composition intended for either parenteral or oral administration should contain an amount of a polypeptide, polynucleotide, vector, vaccine, or composition as herein disclosed such that a suitable dosage will be obtained.

The composition may be intended for topical administration, in which case the carrier may suitably comprise a solution, emulsion, ointment, or gel base. The base, for example, may comprise one or more of the following: petrolatum, lanolin, polyethylene glycols, bee wax, mineral oil, diluents such as water and alcohol, and emulsifiers and stabilizers. Thickening agents may be present in a composition for topical administration. If intended for transdermal administration, the composition may include a transdermal patch or iontophoresis device. The pharmaceutical composition may be intended for rectal administration, in the form, for example, of a suppository, which will melt in the rectum and release the drug. The composition for rectal administration may contain an oleaginous base as a suitable nonirritating excipient. Such bases include, without limitation, lanolin, cocoa butter, and polyethylene glycol.

A composition may include various materials that modify the physical form of a solid or liquid dosage unit. For example, the composition may include materials that form a coating shell around the active ingredients. The materials that form the coating shell are typically inert, and may be selected from, for example, sugar, shellac, and other enteric coating agents. Alternatively, the active ingredients may be encased in a gelatin capsule. The composition in solid or liquid form may include an agent that binds to the polypeptide, polynucleotide, vector, vaccine, or composition of the disclosure and thereby assists in the delivery of the compound. Suitable agents that may act in this capacity include monoclonal or polyclonal antibodies, one or more proteins, or a liposome. The composition may consist essentially of dosage units that can be administered as an aerosol. The term aerosol is used to denote a variety of systems ranging from those of colloidal nature to systems consisting of pressurized packages. Delivery may be by a liquefied or compressed gas or by a suitable pump system that dispenses the active ingredients. Aerosols may be delivered in single phase, bi phasic, or tri phasic systems in order to deliver the active ingredient(s). Delivery of the aerosol includes the necessary container, activators, valves, subcontainers, and the like, which together may form a kit. One of ordinary skill in the art, without undue experimentation, may determine preferred aerosols.

It will be understood that compositions of the present disclosure also encompass carrier molecules for polynucleotides, as described herein (e.g., lipid nanoparticles, nanoscale delivery platforms, and the like).

The pharmaceutical compositions may be prepared by methodology well known in the pharmaceutical art. For example, a composition intended to be administered by injection can be prepared by combining a composition that comprises a polypeptide, polynucleotide, vector, vaccine, or composition as described herein and optionally, one or more of salts, buffers, and/or stabilizers, with sterile, distilled water so as to form a solution. A surfactant may be added to facilitate the formation of a homogeneous solution or suspension. Surfactants are compounds that non-covalently interact with a molecule so as to facilitate dissolution or homogeneous suspension of the molecule in the aqueous delivery system.

In general, an appropriate dose and treatment regimen provide the composition(s) in an amount sufficient to provide therapeutic and/or prophylactic benefit.

Compositions are administered in an effective amount, which will vary depending upon a variety of factors including the activity of the specific compound employed; the metabolic stability and length of action of the compound; the age, body weight, general health, sex, and diet of the subject; the mode and time of administration; the rate of excretion; the drug combination; the severity of the particular disorder or condition; and the subject undergoing therapy.

The following examples are provided to describe the embodiments described herein with greater detail. They are intended to illustrate, not to limit, the embodiments.

All documents, patent, and patent applications cited herein are hereby incorporated by reference, and may be employed in the practice of the methods and compositions disclosed herein.

EXAMPLES

Example 1

Identification of Episensus Antigens for Use as Therapeutic Vaccines

Episensus antigens for HBV were developed using the EpiGraph method, as described in PCT Application No. WO 2016/054654 A1 and in Theiler, et al., *Sci. Rep.* 6:33987 (2016), which are fully incorporated herein by reference. A tool for using the EpiGraph algorithm is also available at hiv.lanl.gov/content/sequence/EPIGRAPH/epigraph.html.

Figure 6:
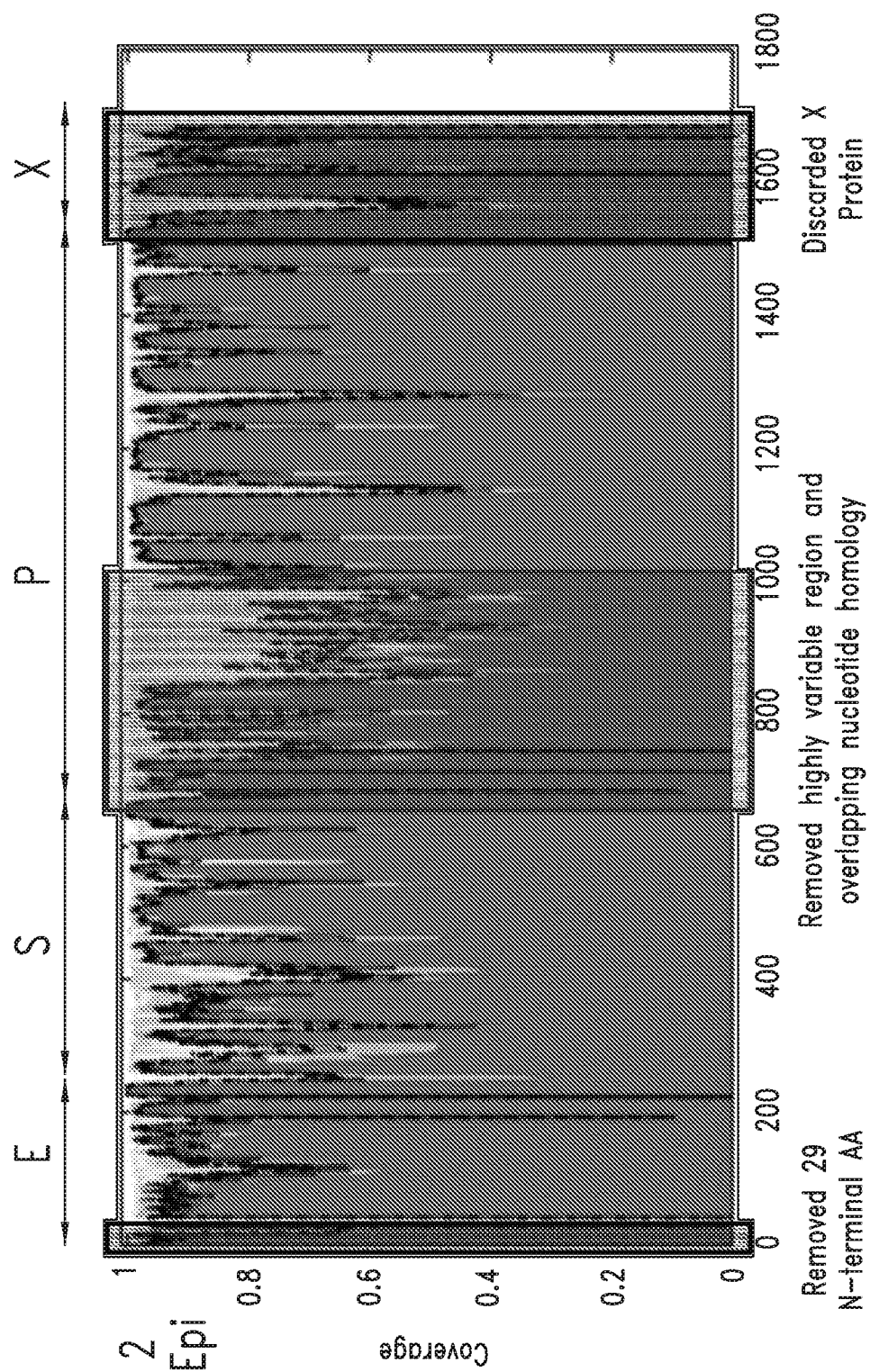
FIG. 6. Whole proteome coverage of HBV using two episensus sequences, in relation to four conserved regions of the HBV genome. Hypervariable regions, including 29 N-terminal amino acids and the N-terminus of the P protein, are illustrated with windows. The hypervariable regions are removed from further analysis.
Figure 9A:
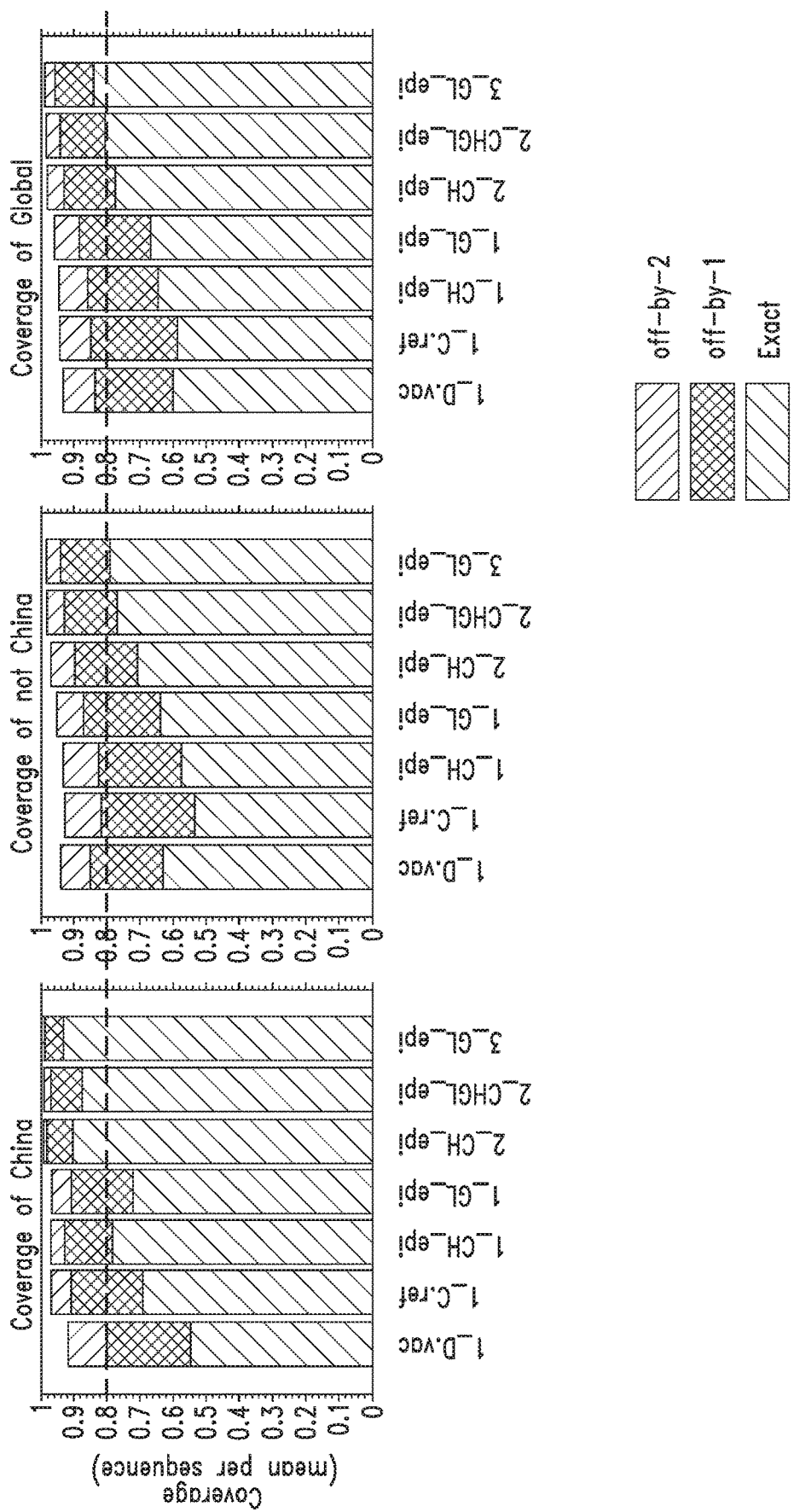
FIG. 9A-9B. Comparison of conserved region coverage of 1_D.vac, 1_C.ref, 1_CH_epi, 1_GL_epi, 2_CH_epi, 2_CHGL_epi, and 3_GL_epi in samples from China (FIG. 9A, left), samples not from China (FIG. 9A, middle), and a cohort of Global samples (FIG. 9A, right).
Figure 9B:
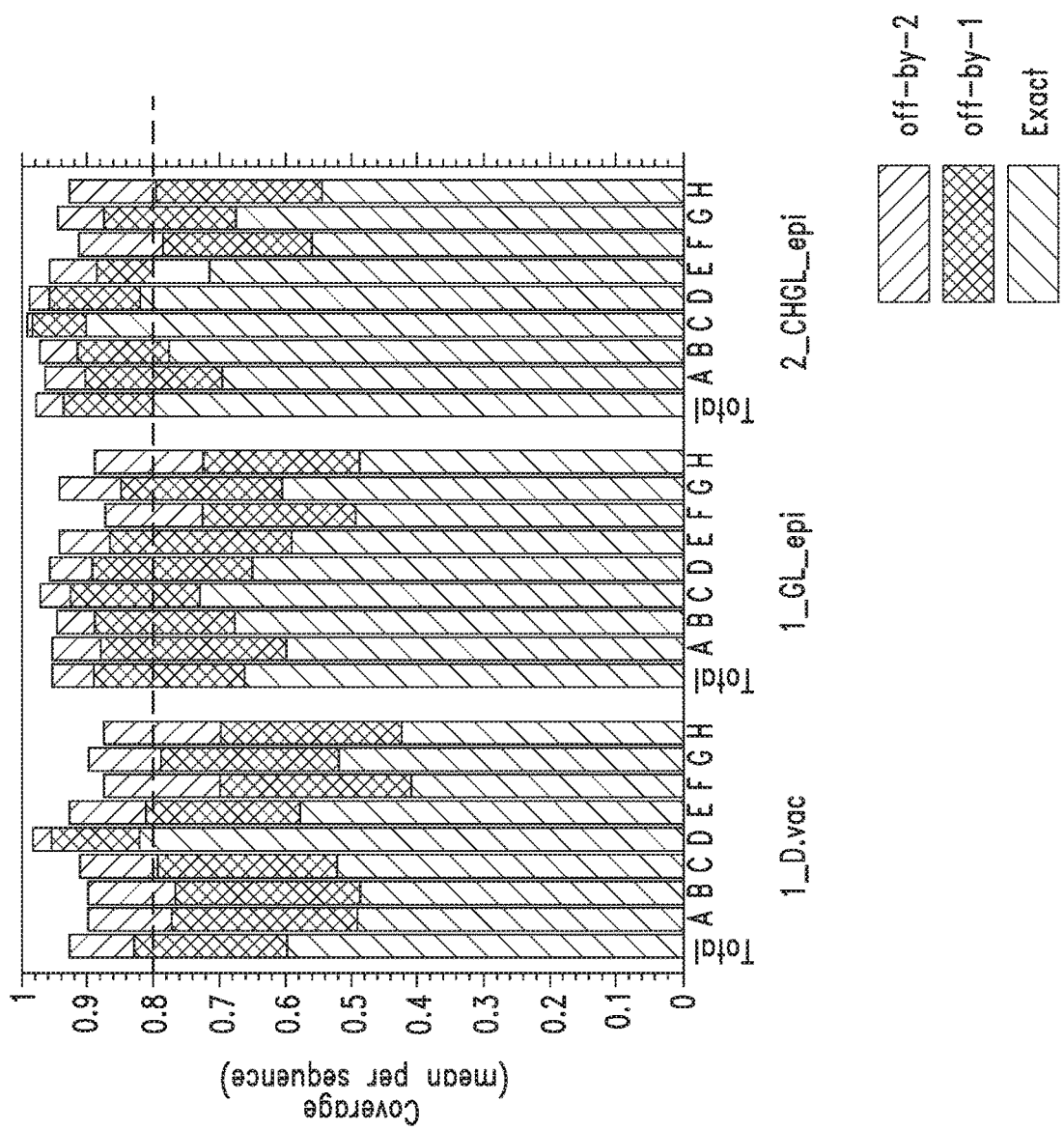
Figure 10B:
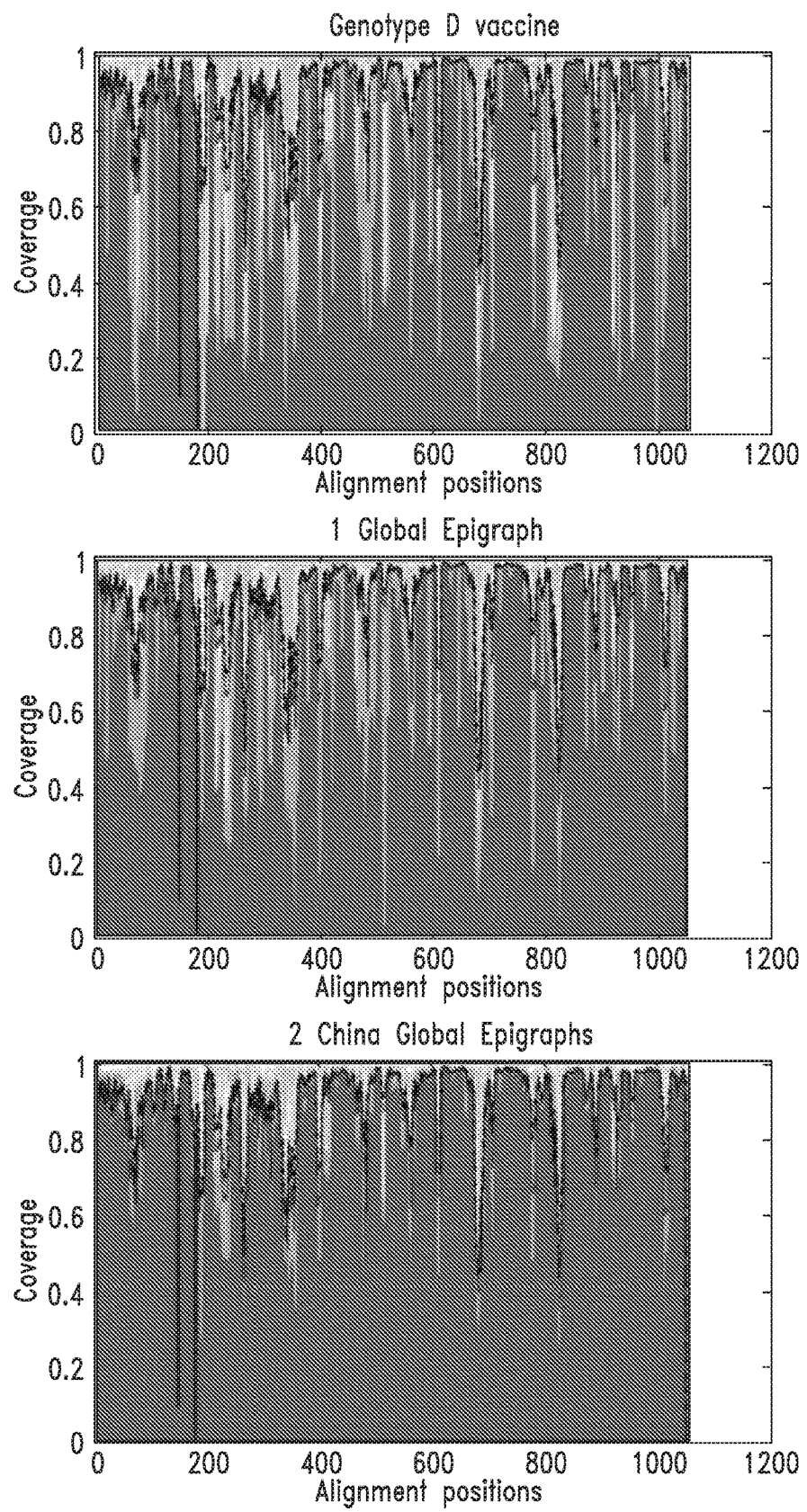

While it is not feasible to build a designer vaccine for each subject, it is feasible to sequence virus from that subject to try to get a good match from within a small reference set of vaccine options. A China-based HBV B genotype trial population was used to identify vaccines that would provide therapeutic effects. An Asian-based reference vaccine set and a Global vaccine set were designed, as well as an updated Asian-based genotypes. Conserved regions of the HBV genome are found in the C protein (minus the first 29 amino acids on the N-terminus), the S protein, and the P protein. The highly variable region of the N-terminus of the P protein was removed from consideration (see FIG. 6).

Unlike in the case of a prophylactic vaccine, where it is not known which viruses might be encountered by the subject, in the case of a therapeutic vaccine, the infecting virus sequence can be obtained and matched.

Selection of the antigen for use in an immunogenic composition or vaccine takes two factors into account: the antigen epitopes should match as many epitopes of the subject's infecting viruses as possible and the epitope mismatches between the antigen and the subject's infecting viruses should be as few as possible, so that the vaccine response is as targeted as possible on the relevant epitopes.

The phylogeny within HBV major genotypes tends to have little clear structure. Rather it is a "starburst" with very long external branches, and very short, poorly defined internal branches near the base. Part of this structure is likely due to intra-subtype recombination. While that is hard to quantify, recombination is certainly occurring relatively frequently, and by analogy with what is seen in terms of inter-subtype recombination, it is likely to be extensive. Given the structure of the tree, simply using clustering on a phylogenic tree to define the reference set of possible vaccines will not be as effective because within-genotype associations are of limited meaning from an epitope perspective. Instead, sequence relationships should be considered by the relevant measure, and the reference set should be selected based on potential epitope similarities between natural strains and putative vaccine designs.

Figure 4A:
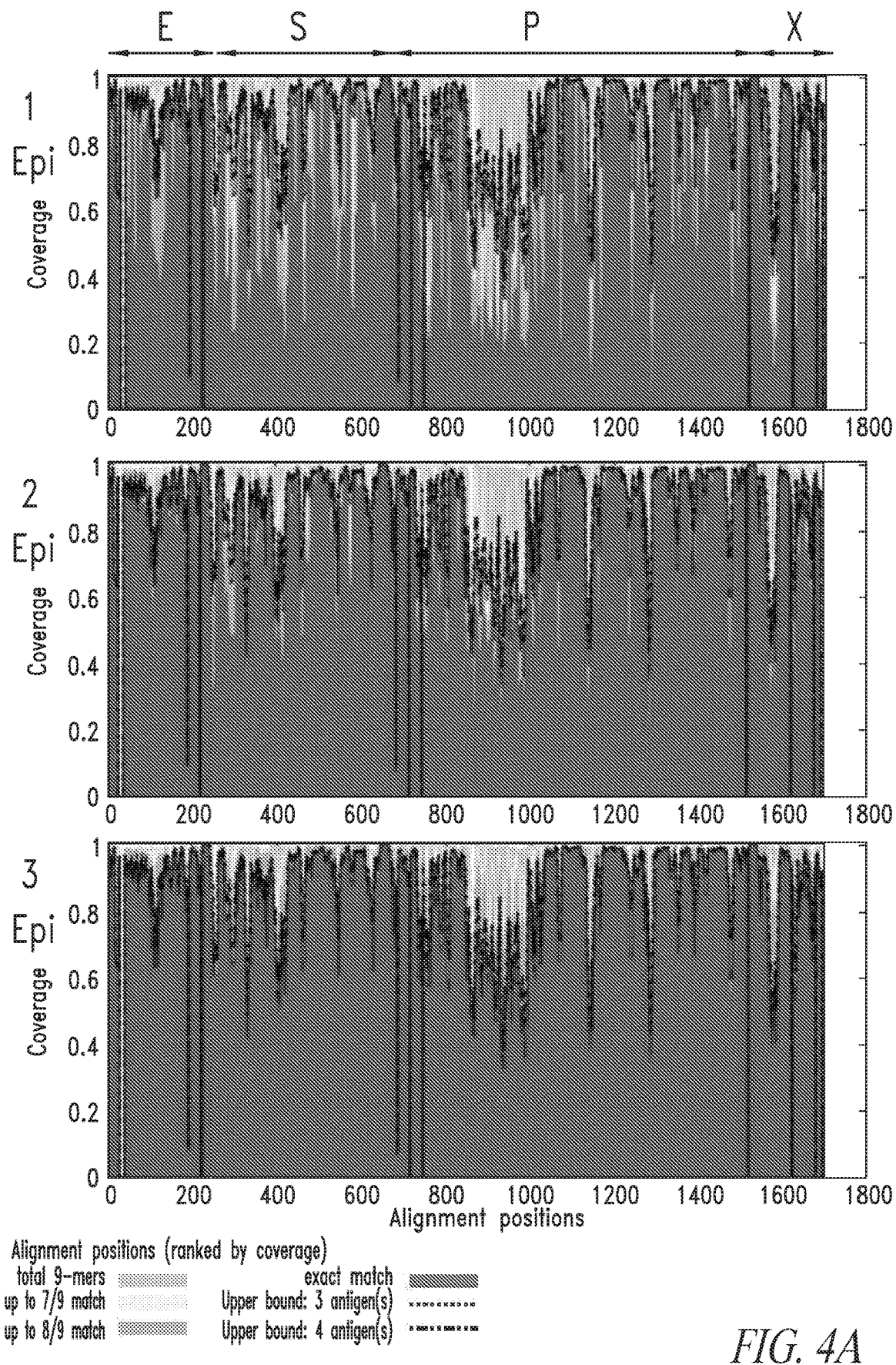
FIG. 4A-4B.
Figure 4B:
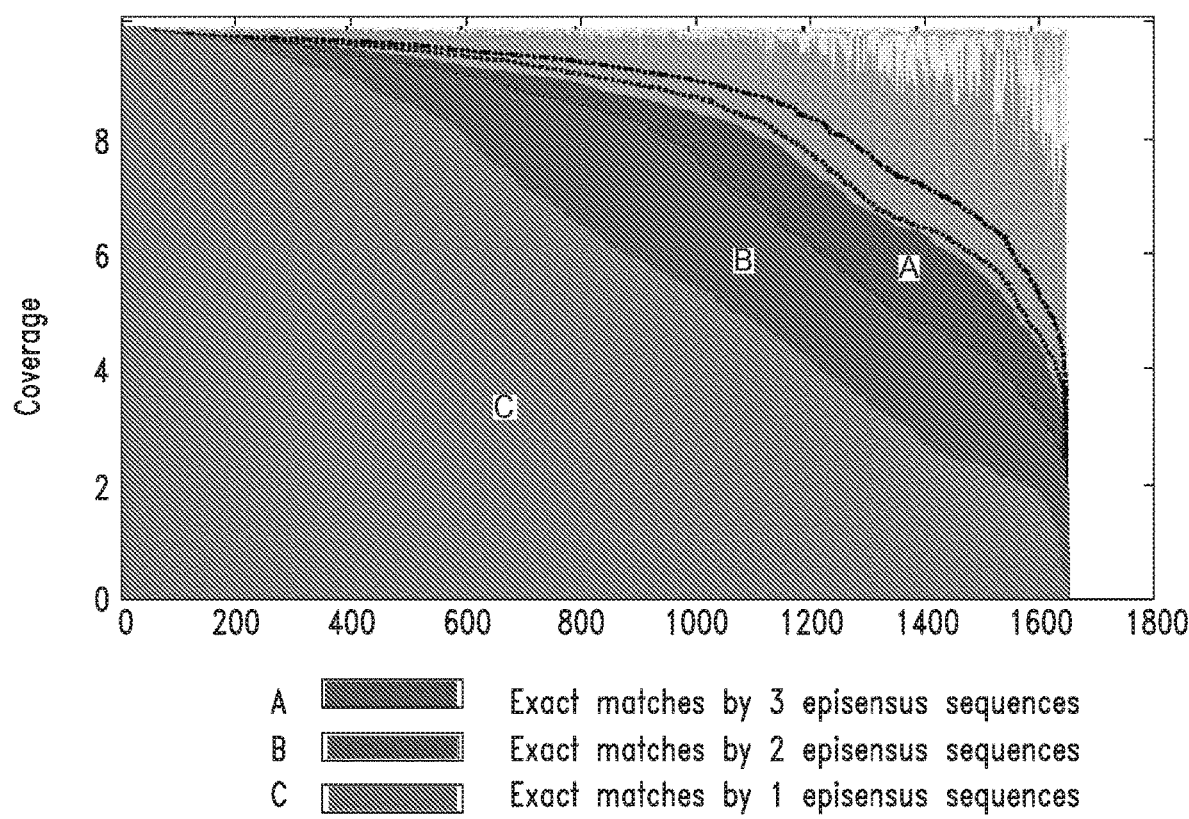
Figure 5A:
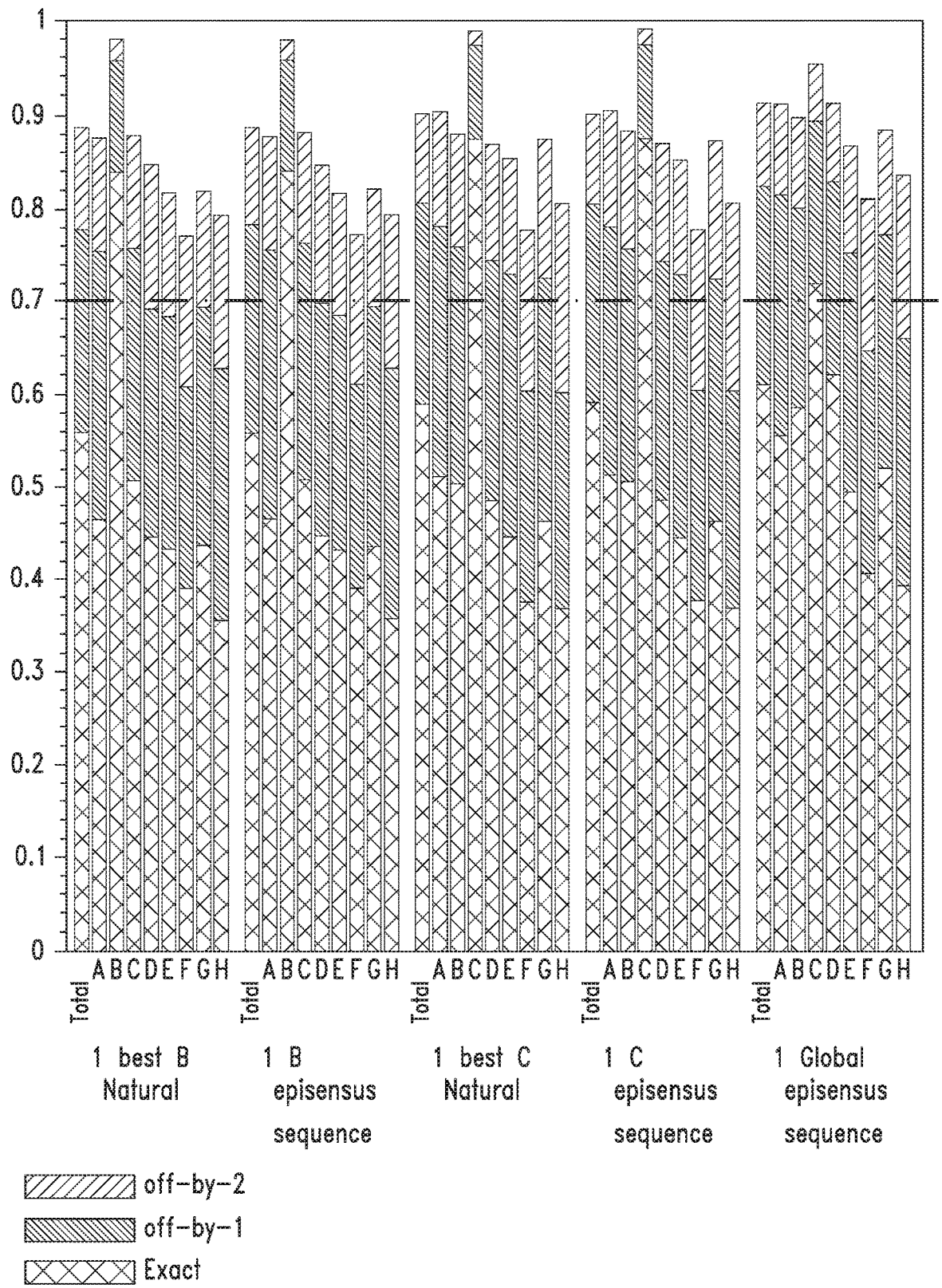
FIG. 5A-5C. Whole proteome coverage when one, two, or three episensus sequences developed using the Global HBV population are used. Use of two or three episensus sequences developed using the Global HBV population substantially improve coverage of all major genotypes, while providing comparable coverage of B and C, as compared to episensus sequences developed using B and C HBV populations.
Figure 5B:
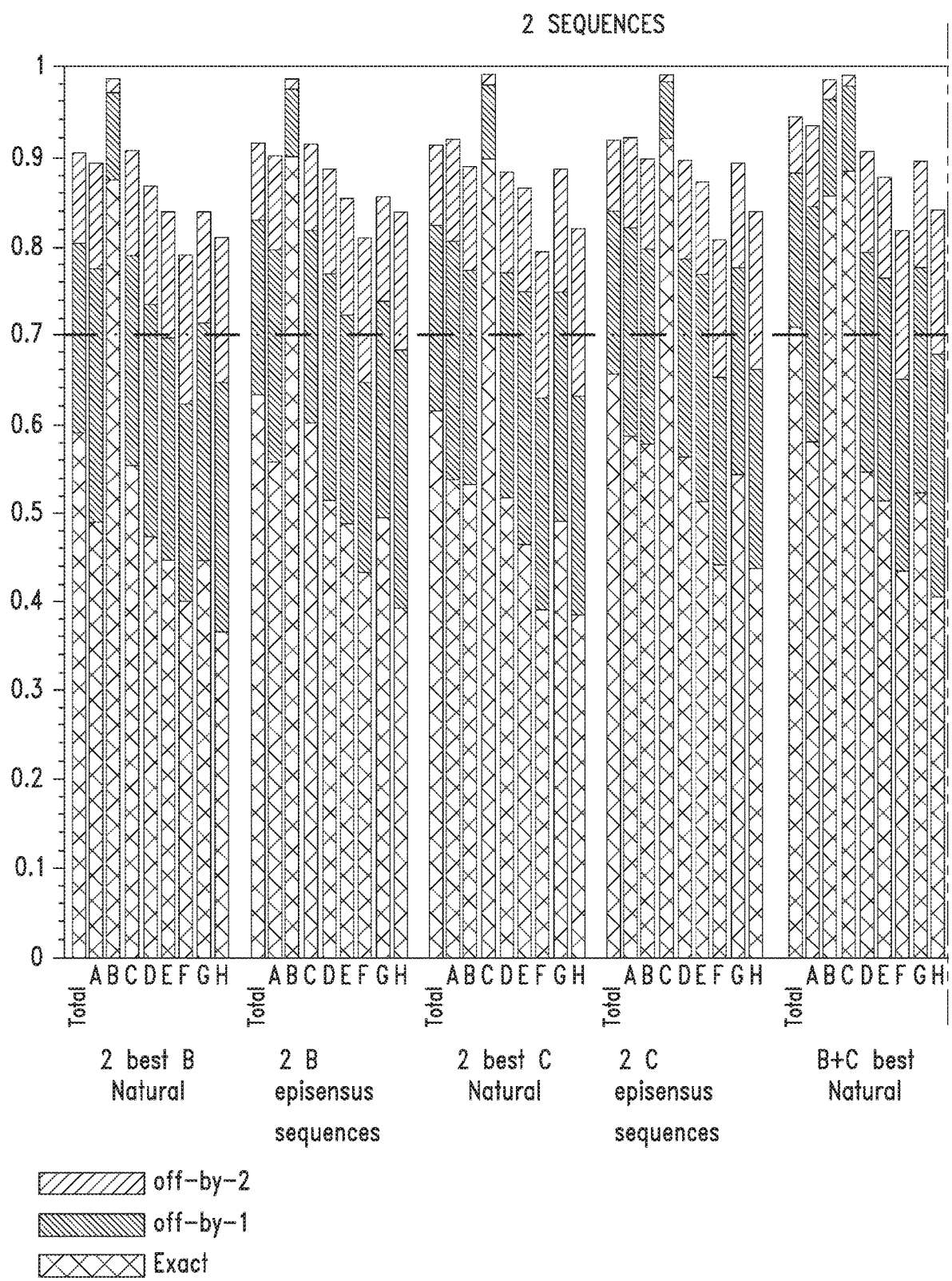
Figure 5C:
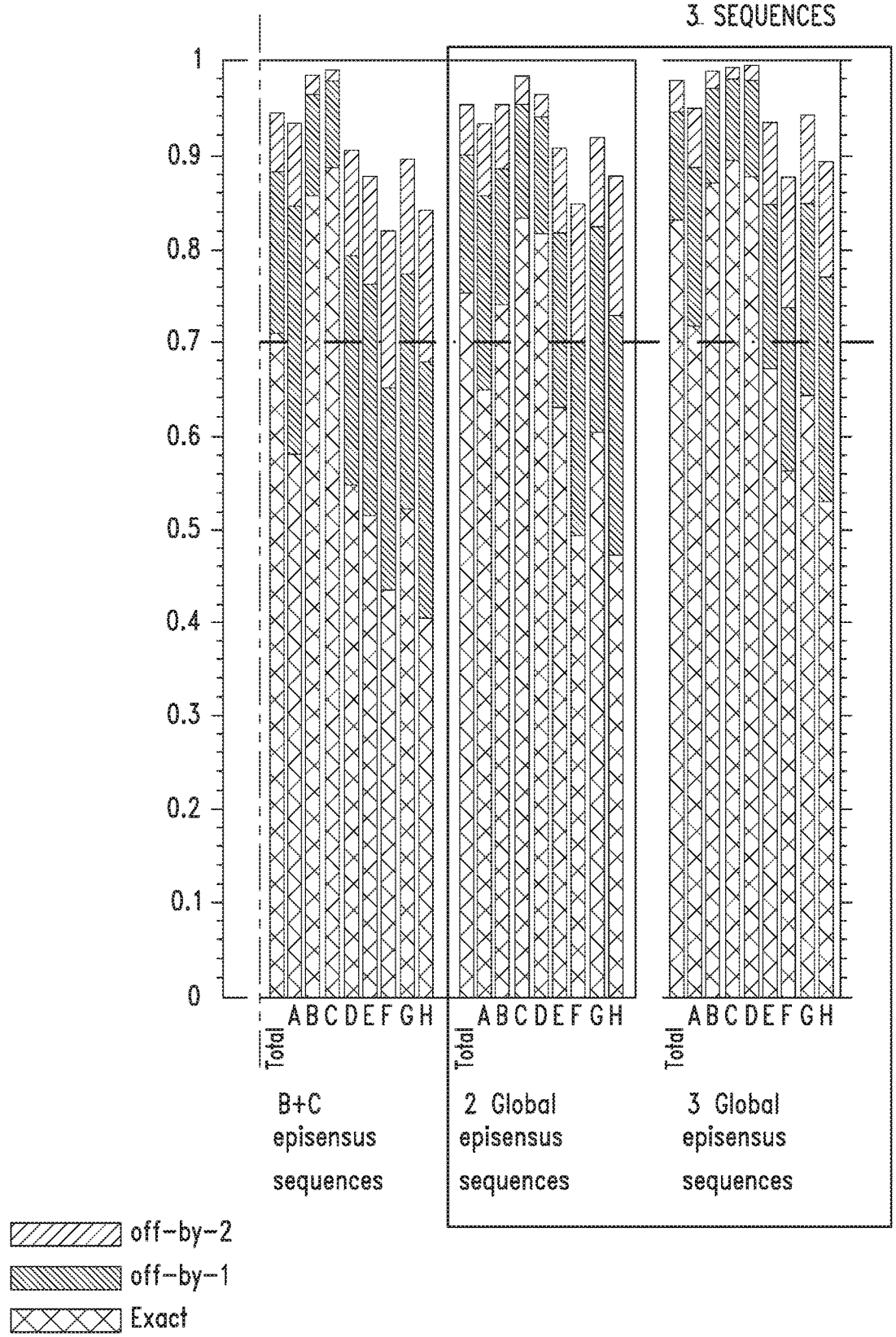

Epigraph sequences were identified using amino acid 9-mers (see FIG. 4A), but the method can be used with any length k-mers as a reference point, where k is the putative potential epitope length. In past work with mosaics, the optimal solution for 9-mers has been very nearly optimal for other nearby lengths (8, 10, 11, 12), and that is expected to also be true for the EpiGraph method.

The epitope coverage of vaccines comprising a) one episensus sequence; b) two episensus sequences; c) three episensus sequences; d) one natural HBV genotype sequence; and e) two natural HBV genotype sequences are compared in FIGS. 4A-7B. Generally, genotype-based vaccines provide excellent coverage of that genotype, but poor coverage of other genotypes. The data in FIGS. 5A-5C demonstrate that two and three valent Global EpiGraph sequences substantially improve coverage of all major genotypes, while providing comparable coverage of B and C, compared to B and C specific vaccines. For example, as seen in FIGS. 5A to 5C, Genotype D coverage is about 90% when three episensus antigens are used, as opposed to coverage of about 50% for B or C specific vaccines, or even B+C specific vaccines.

Example 2

Transient Expression of Episensus Antigens

Antigens designed to maximize epitope matches using the EpiGraph method resemble natural sequences but no longer code for native proteins. While the theoretical guidelines for expression of these artificial amino acid sequences are adhered to in the construction of these sequences, the proteins may exhibit unanticipated expression profiles or fail to express a stable full-length protein.

To evaluate the expression profile of these sequences in the context of mammalian cells, polynucleotides encoding episensus antigens were synthesized and cloned for transient transfection using methods described in WO 2016/054654, the entirety of which is herein incorporated by reference. Briefly, DNA encoding the constructs was synthesized (Genscript, Piscataway, NJ) to contain compatible cloning sites for plasmid vectors (pcDNA3.1 and pOri). All inserts were codon optimized for the host. Each construct was also modified to eliminate residual enzyme activity of the native sequence as described in Kulkarni et al. Vaccine (2011), the entirety of which is herein incorporated by reference. The plasmid vector was linearized with compatible endonucleases and treated with calf intestinal phosphatase to prevent recircularization of empty vector. Vector and insert fragments were resolved by agarose gel electrophoresis to confirm digest fragment sizes and cleaned for ligation by PCR purification kit (Thermo Scientific). Inserts were ligated to linearized vector at approximately 3:1 insert to vector ratio for 15 minutes at room temperature using a rapid ligation kit (Roche, Indianapolis, IN), transformed into chemically competent *E. coli* (DH5-alpha), and plated on antibiotic selection plates. DNA from resulting colonies was screened by restriction digestion for inserts.

Clones containing each of the correct inserts in the appropriate orientation relative to vector promoter and poly (A) sequences were grown in liquid culture for plasmid DNA purification. Actively growing sub-confluent 293T or HELA cells in 12-well tissue culture plates received 500 µl of fresh media (DMEM 10% FBS) while liposomes are prepared. To generate liposomes containing plasmid DNA, 250 µl of serum free media was mixed with 500 ng of plasmid DNA, and 250 µl of serum free media was mixed with 2 µl of lipid (Lipofectamine 2000, Invitrogen). After 5 minutes incubation at room temperature these solutions were combined, mixed, and incubated for 20 minutes. The DNA-containing liposomes (500 µl) formed during this process were added drop-wise to the culture and allowed to incubate 12-16 hours, after which time the transfection mixture is replaced with fresh media. After an additional day of incubation, cultures were harvested by scraping and centrifugation. Supernatants were removed by aspiration and cell pellets lysed by resuspension in 100 µl gel loading dye containing 5% SDS and 10% 2-mercaptoethanol and centrifugation through QiaShred column (Qiagen, Valencia, CA).

Expression of episensus antigens was demonstrated by SDS poly-acrylamide gel electrophoresis (SDS-page) and western blotting developed with antibodies to the V5 or hemagglutinin epitope tag engineered into each construct. Briefly, NuPAGE 4-12% Bis-Tris gels were prepared and loaded with 20-50 ug total protein and electrophoresed at 110-120 volts for 90 minutes. The resolved proteins were transferred to PVDF membranes by semi-dry or wet transfer at 30 volts for 90 minutes. Non-specific binding was blocked with a solution of 10% nonfat dry milk in tris buffered saline with 0.1% tween-20 (PBS-T) for 60 minutes. HA (Sigma) or V5 (Invitrogen) antibodies were diluted in 5% milk solution and incubated with membranes for 1 hour followed by 3 washes with TBS-T prior to addition of 1:10000 dilution of horseradish peroxidase conjugated goat anti-mouse (Invitrogen) secondary antibody for 1 hour. Subsequently blots were washed three times in TBS-T and developed with enzyme linked chemi-luminescence (ECL kit (Thermo-Pierce) and visualized with a digital gel imaging system.

Example 3

Engineering of Episensus Antigens into CMV Vector Bac Constructs and Expression from Reconstituted Virus Episensus antigens were designed to provide good coverage of T-cell epitopes representative of the spectrum of viral sequences and genotypes of HBV from which they are generated. To utilize these antigens most effectively, polynucleotides encoding the antigens have been engineered into CMV vectors that have been demonstrated to produce three times the CD8$^+$ T cell spectrum of competing platforms. Broad antigen presentation and lifelong expression profiles of CMV vectors have demonstrated the capacity to protect and cure rhesus monkeys infected with SIV. The episensus antigen design algorithm in combination with CMV vectors may provide even greater coverage of HBV within and across genotypes when applied to broadly prophylactic vaccines.

Figure 11A:
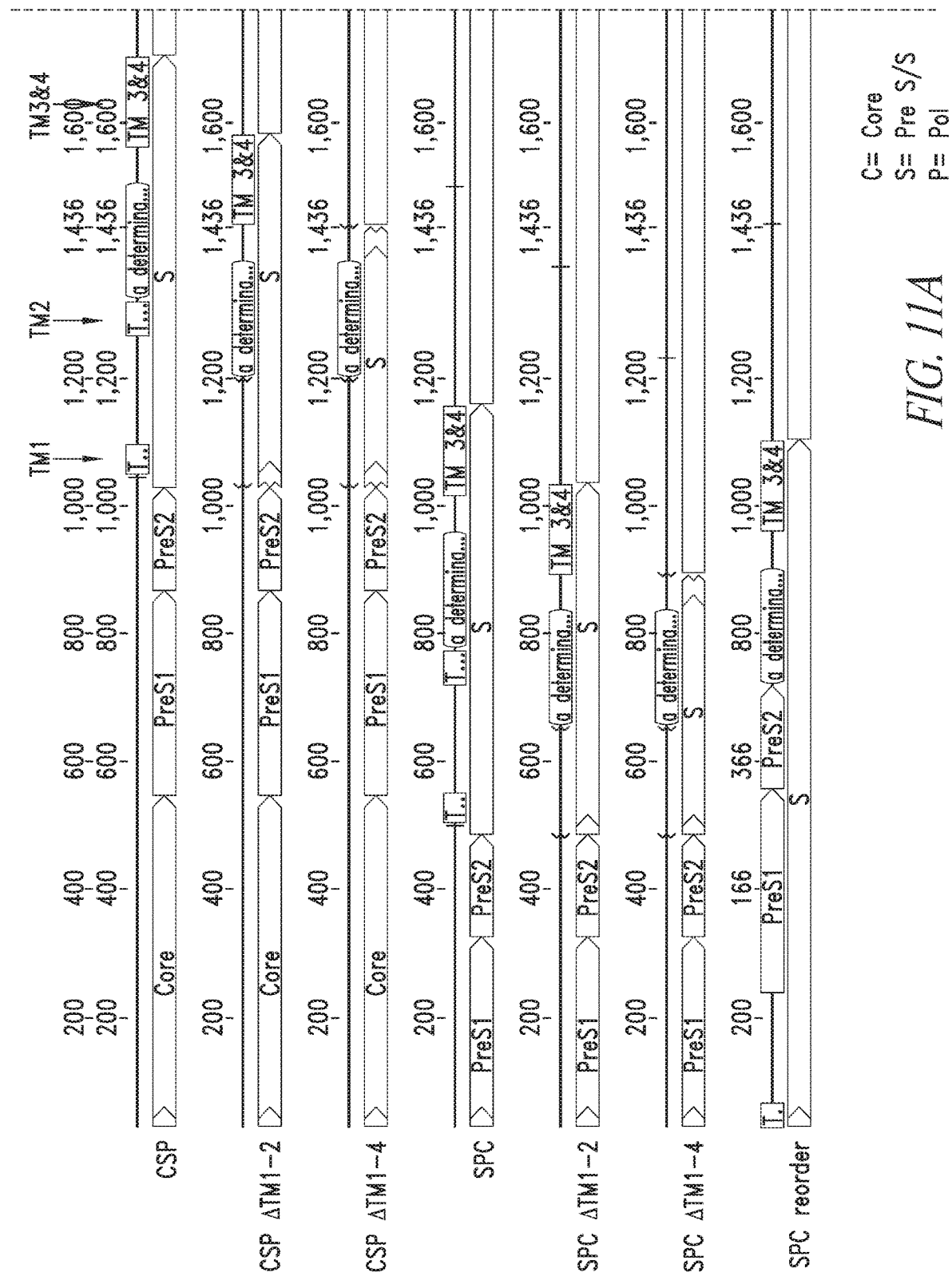
FIG. 11A-11D.
Figure 11B:
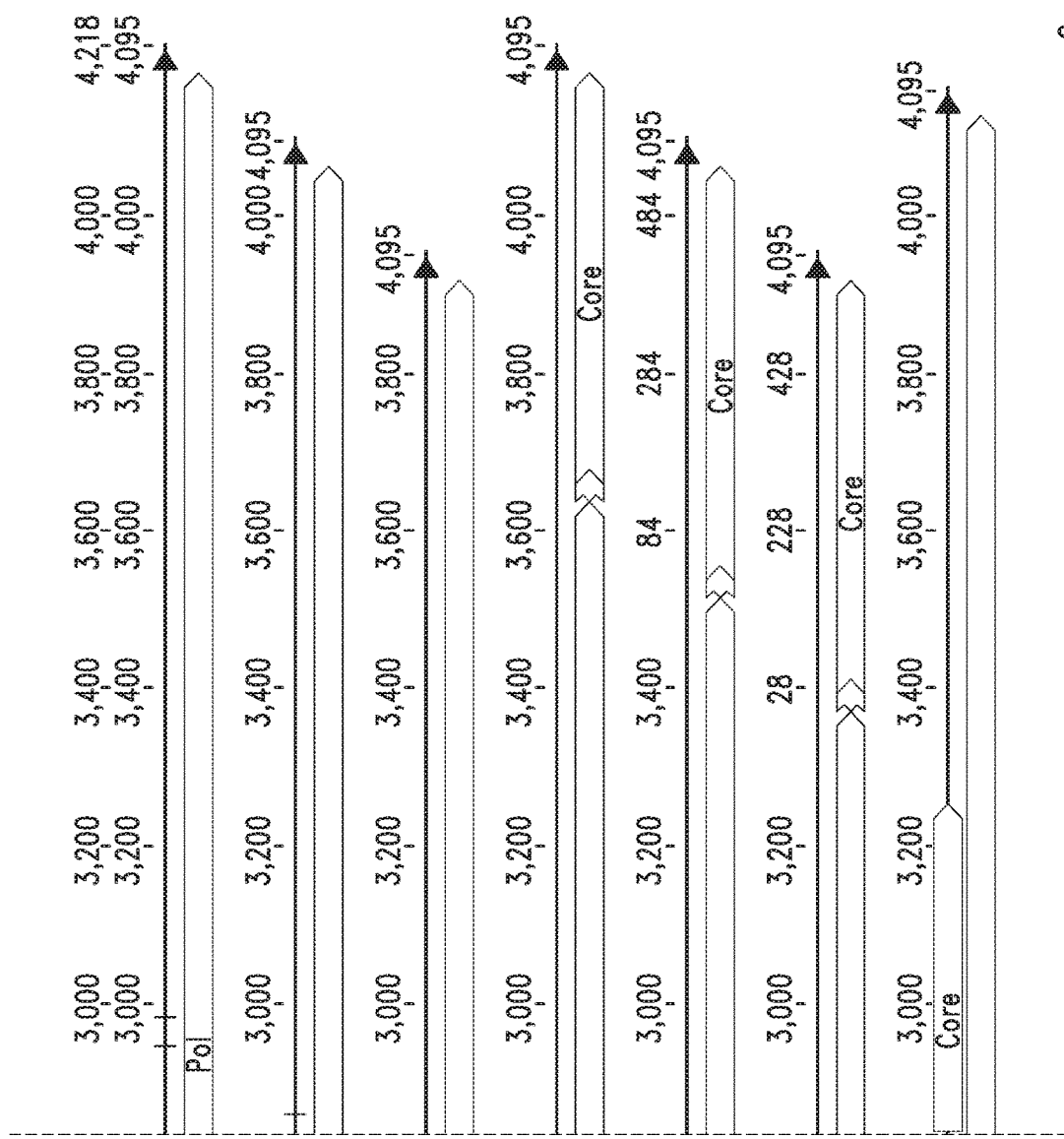
Figure 11C:
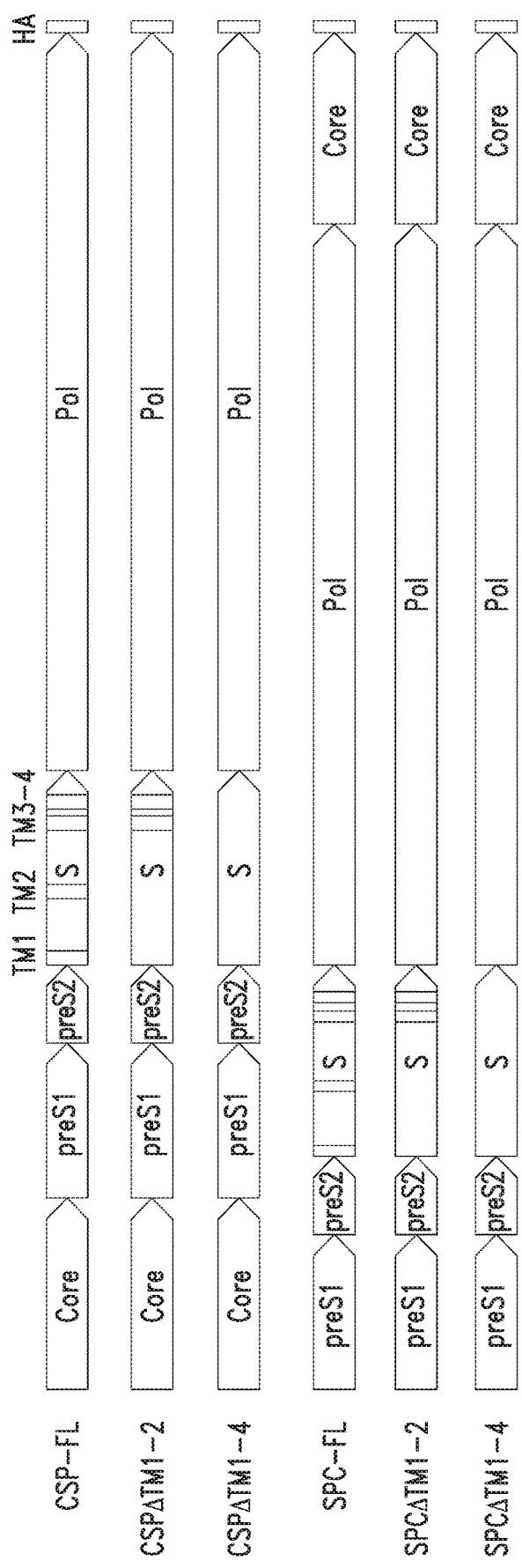

Polynucleotides encoding episensus sequences that demonstrated expression in transient transfection systems were transferred to CMV backbones using BAC recombineering with galactokinase and kanamycin selection. (Warming et al. Nucleic Acids Research. 2005. 33(4):1-12; and Paredes and Yu Curr Protoc Microbiol. 2012. February; Chapter 14:Unit14E.4; both of which are herein incorporated by reference in their entirety). Further, the episensus sequences derived from HBV proteins or protein domains, such as the core (C) protein, the surface antigen(S) protein, the PreS1 domain, the PreS2 domain, and the polymerase (P) protein, can be re-ordered relative to the order in which they occur in wild type HBV, as shown in FIGS. 11A to 11B, for improved expression.

BAC recombineering facilitates the manipulation of large DNA sequences utilizing temperature and metabolite regulated recombination enzymes in the context of E. coli strain SW105 containing a parental BAC. Recombination is a sequential two-step process consisting of Step 1: insertion of the galactokinase (galK) sequence with the antibiotic resistance gene kanamycin (kan) into the target region, followed by Step 2: replacement of the galK/kan cassette with the antigen of interest. Step 1 results in recombinants containing the galK/kan insert after positive selection in kan and step 2 results in recombinants containing the antigen of interest after negative selection in 2-deoxy-galactose (DOG). For both steps, the sequences to be inserted are amplified by standard PCR from template DNA containing either the galK/kan cassette or the antigen of interest using primers with long (50+ bp) homology arms to the HCMV sequences flanking the insertion site.

To prepare the bacterial cells for the galK/kan cassette insertion (Step 1), 5 mL cultures were grown overnight at 30° C. in 2×YT or Terrific Broth with 12.5 ug/mL chloramphenicol, and diluted 1:50 the following morning. Bacteria were grown for approximately 2-4 additional hours at 30° C. (to an $OD_{600}$=0.5-0.6), and then heat shocked by shaking at 42° C. for 15 minutes to induce the recombination enzymes. Following this induction, bacteria were pelleted (3000 rpm, 10 minutes, 4° C.) and then washed three times in ice-cold water. The E. coli cells were rendered electro-competent to receive the PCR product and recombination competent for insertion of the sequence into the target region of the BAC. Purified insert (300 ng) was combined with 40 µl competent E. coli on ice, moved to a 1 mm cuvette, and electroporated using the Bio-rad Gene Pulser Xcell. Following electroporation, the bacteria were diluted by addition of 5 mL culture media and allowed to recover by shaking at 30° C. for 2 hours prior to plating on chloramphenicol/kanamycin plates. Plates were incubated at 30° C. for two days and colonies screened by restriction digest and PCR for recombination events.

BAC constructs positive for the galK/kan insert proceeded to the second step, where the galK/kan cassette was replaced by recombination with the PCR fragment containing the antigen of interest. To prepare the bacterial cells for the replacement of the galK/kan cassette in Step 2, the bacteria were grown and electroporated as described above. For electroporation recovery, the bacteria were diluted by addition of 5 mL culture media and allowed to recover by shaking at 30° C. for at least 4 to 4.5 hours. The cells were then pelleted (3000 rpm, 10 minutes, 4° C.) and washed three times with 1×M9 media prior to plating on M63 minimal media plates with added glycerol, leucine, biotin, DOG and chloramphenicol. Colonies were then screened by PCR to confirm replacement of the galK/kan cassette with the antigen of interest. Positive clones were re-streaked on DOG plates and BAC DNA is isolated for further characterization by restriction digest and sequencing.

Viral Reconstitution: To regenerate virus, the BAC DNA was transferred into mammalian host cells permissive for viral growth. In brief, BAC DNA was purified using an endotoxin-free plasmid DNA kit (Macherey-Nagel) and transfected (16-24 ug BAC DNA/T150) into a confluent flask of primary human fibroblasts grown in DMEM plus 1× glutamax and 9% FBS at 37° C. with 5% $CO_2$. Transfection was achieved using Lipofectamine 3000 following the manufacturer's protocol (ThermoFisher). The following day, the media was changed and the cells were then monitored daily for the formation of plaques. Once full cytopathic effect (CPE) was reached, the viral supernatant was harvested, clarified via centrifugation at 2500×g for 5 min at room temperature and stored at −80° C. The remaining attached cells were harvested by cell scraper in DPBS, pelleted by centrifugation (2,500 rpm, 5 minutes) and stored at −80° C.

Viral Episensus Antigen Expression: Expression of episensus antigens was tested by SDS poly-acrylamide gel electrophoresis (SDS-page) followed by immunoblots developed with either HBV specific antibodies or antibodies directed to the V5 or hemagglutinin (HA) epitope tag engineered into each construct. Briefly, cell pellets were lysed by resuspension in radioimmunoprecipitation assay (RIPA) buffer and protein is quantified using a standard bicinchoninic acid assay (BCA). NuPAGE 4-12% Bis-Tris gels were prepared and loaded with 20-50 ug total protein and electrophoresed at 110-130 volts for 90 minutes. The resolved proteins were transferred to PVDF membranes by semi-dry or wet transfer at 30 volts for 90 minutes or 15V overnight. Non-specific binding was blocked with a solution of 5% nonfat dry milk in tris buffered saline with 0.1% tween-20 (PBS-T) for 60 minutes. Primary antibodies were diluted in 5% milk solution and incubated with membranes for 1 hour, followed by 3 washes with TBS-T prior to addition of 1:10,000 dilution of horseradish peroxidase conjugated goat anti-mouse secondary antibody for 1 hour. Subsequently, blots were washed three times in TBS-T and developed with enzyme linked chemi-luminescence (ECL) kit (Thermo-Pierce) and visualized with a digital gel imaging system.

Example 4

Population Episensus Vaccines

The EpiGraph method was used to create a set of vaccines comprising polynucleotides encoding episensus antigens using CMV vectors initially, however, other vaccine delivery systems can be utilized.

A total of 58 strategies of different episensus antigens and combinations of antigens were tested to determine the most comprehensive vaccine treatment. HBV samples from dbHBV were divided into three groups: samples from China, samples Not from China, and Global samples. Global samples comprise the combination of samples from China and samples Not from China. Vaccines against natural D and natural C subtypes were used as controls. Vaccines with one, two, or three episensus antigens were tested against each group.

Controls included vaccines comprising polynucleotides encoding natural D subtype sequence (SEQ ID NO:12), GenBank accession number Y07587; and natural C subtype reference sequence (SEQ ID NO:13), GenBank accession number GQ358158. The vaccines comprising polynucleotides encoding the D and C subtype sequences were then compared to vaccines comprising polynucleotides encoding: (a) 1_CH_epi (SEQ ID NO:1), developed using 1044 HBV sequences from China; (b) 1_GL_epi (SEQ ID NO:2), developed using the Global set of 3041 HBV sequences; (c) 2_CH_epi, which comprises two episensus antigens (SEQ ID NO:3 and SEQ ID NO:4) developed using 1044 HBV sequences from China; (d) 2_CHGL_epi, which comprises two episensus antigens—a first episensus antigen, Epi1 (SEQ ID NO:5), that was developed using 1044 HBV sequences from China, and a second episensus antigen, Epi2 (SEQ ID NO:6), that was developed using the Global set of 3041 HBV sequences, with Epi1 already fixed in the solution; (e) Epi7 and Epi8 (SEQ ID NO:7 and SEQ ID NO:8, respectively), which are variants of Epi1 and Epi2 modified to induce better expression; and (f) 3_GL_epi, which comprises three episensus antigens (SEQ ID NO:9; SEQ ID NO:10; and SEQ ID NO:11), developed using the Global set of 3041 HBV sequences.

As shown in FIG. 8, a two episensus antigen vaccine that comprises a polynucleotide encoding a first sequence developed using samples from China and a second sequence developed using the Global set provides coverage of ~88% of China sequences, ~77% of NOT China sequences, and ~80% of Global sequences.

Example 5

Epitope Coverage

HBV epitope coverage for vaccines comprising certain episensus antigen sequences was computationally analyzed. The vaccine arms for initial testing in CMV included: 1) a single population episensus antigen, central to the China genotype epidemic; 2) a single population episensus antigen that provides coverage to all HBV Global samples; 3) two population episensus antigens that provide coverage to HBV samples from China; 4) two population episensus antigens that provide coverage to all HBV Global samples; 5) three population episensus antigens that provide coverage to all HBV Global samples; and 6) two population episensus antigens: a first population episensus antigen that provides coverage to HBV samples from China and a second population episensus antigen that provides coverage to HBV samples from the Global set.

Controls included vaccines comprising polynucleotides encoding natural D subtype sequence (SEQ ID NO:12), GenBank accession number Y07587; and natural C subtype reference sequence (SEQ ID NO:13), GenBank accession number GQ358158. We then compared the vaccines comprising polynucleotides encoding the D and C subtype sequences to vaccines comprising polynucleotides encoding: (a) 1_CH_epi (SEQ ID NO:1), developed using 1044 HBV sequences from China; (b) 1_GL_epi (SEQ ID NO:2), developed using the Global set of 3041 HBV sequences; (c) 2_CH_epi, which comprises two episensus antigens (SEQ ID NO:3 and SEQ ID NO:4) developed using 1044 HBV sequences from China; (d) 2_CHGL_epi, which comprises two episensus antigens—a first episensus antigen, Epi1 (SEQ ID NO:5), that was developed using 1044 HBV sequences from China, and a second episensus antigen, Epi2 (SEQ ID NO:6), that was developed using the Global set of 3041 HBV sequences, with Epi1 already fixed in the solution; (e) Epi7 and Epi8 (SEQ ID NO:7 and SEQ ID NO:8, respectively), which are variants of Epi1 and Epi2 modified to induce better expression; and (f) 3_GL_epi, which comprises three episensus antigens (SEQ ID NO:9; SEQ ID NO:10; and SEQ ID NO:11), developed using the Global set of 3041 HBV sequences.

As seen in FIGS. 9A to 10B, the vaccine comprising 2_CHGL_epi provides over 80 percent exact coverage against sequences from China, over 75% exact coverage against sequences Not from China, and 80% exact Global coverage. These data demonstrate superior coverage of all HBV sequences compared to the control vaccines.

Example 6

Second Generation HBV Episensus Antigens

For most HBV genotypes, the HBV N-terminal assembly domain (NTD) of the core (C) is involved in core particle assembly and the C-terminal domain is involved in packaging of the pregenome/reverse transcriptase complex. The surface(S) proteins are products of a single open reading frame and distinguished by three domains: PreS1, PreS2, and S. The polymerase (P) protein exhibits both DNA-dependent DNA polymerase and RNA-dependent DNA polymerase (reverse transcriptase) activities. P protein replicates the HBV genome from an encapsidated pregenomic RNA template. The P protein is composed of 4 domains: (1) Terminal Protein (TP) domain, involved in the protein-priming mechanism through a conserved tyrosine; (2) non-conserved spacer domain; (3) Reverse Transcriptase domain (RNA-dependent DNA polymerase (RT) and DNA-dependent DNA polymerase (active site: YMDD conserved motif)); and (4) RNase H domain (ribonuclease H activity).

Episensus antigens are designed to provide good coverage of T-cell epitopes representative of the spectrum of viral sequences from which they are generated. Infection by HBV genotype D represents one of the most prevalent HBV infections in the U.S. and Europe. Therapeutic vaccines comprising genotype D episensus (EpiD) antigens or nucleotides encoding EpiD antigens may be beneficial for patients who have been pre-screened for the particular genotype. Provided herein are examples of HBV genotype D episensus antigen (SEQ ID NO: 14) that provide good coverage for HBV genotypes in the U.S. and Europe. In one variant, as shown in FIGS. 11A and 11B, the HBV genotype D episensus antigens derived from the core (C) protein, the PreS1 and PreS2 domains, the surface antigen(S) protein, and the polymerase (P) protein were initially used in the order in which they appear in the HBV genome: C-S-P ("CSP") (SEQ ID NO: 14), and were reordered as S-P-C ("SPC") (SEQ ID NO:15). Additional antigen variants were generated by applying the EpiGraph method to HBV protein sequences in which transmembrane domains 1-2 or 1-4 of the S protein were deleted ("CSP ΔTM1-2," "CSP ΔTM1-4," "SPC ΔTM1-2," or "SPC ΔTM1-4") to reduce aggregation and improve expression. Therefore, the HBV episensus antigens may also be derived from HBV protein sequences comprising one or more of the aforementioned variants.

Further, episensus antigens derived from P protein variants with mutations and/or deletion in the active sites of the polymerase domain were generated to reduce potential toxicity and improve safety. Examples of such episensus antigens are provided in, for instance, SEQ ID NOs: 7, 8, and 15. The mutations present in the sequences used to develop these episensus antigens are provided in Table 1, below. Other P protein variants having different mutations or deletions may also be used.

TABLE 1

Mutational Modification of Polymerase in HBV Genotype D

| Position | Amino Acid(s) | Modification |
|---|---|---|
| 538-541 | YMDD | Deleted |
| 689 | D | Replaced with A |
| 718 | E | Replaced with A |
| 737 | D | Replaced with V |
| 777 | D | Replaced with A |

The positions in the left column of the table refer to the amino acid numbers in the full-length polymerase in HBV genotype D. The YMDD sequence is the reverse transcriptase active site. (See Radziwill, et al., *J Virol.* 1990 February; 64(2):613-20, which is incorporated herein by reference in its entirety.) The other 4 amino acids (D, E, D, D) are the RNAse H active sites. (See Tavis et al., *PLoS Pathog.* 2013 January; 9(1):e1003125, which is incorporated herein by reference in its entirety.)

Figure 11D:
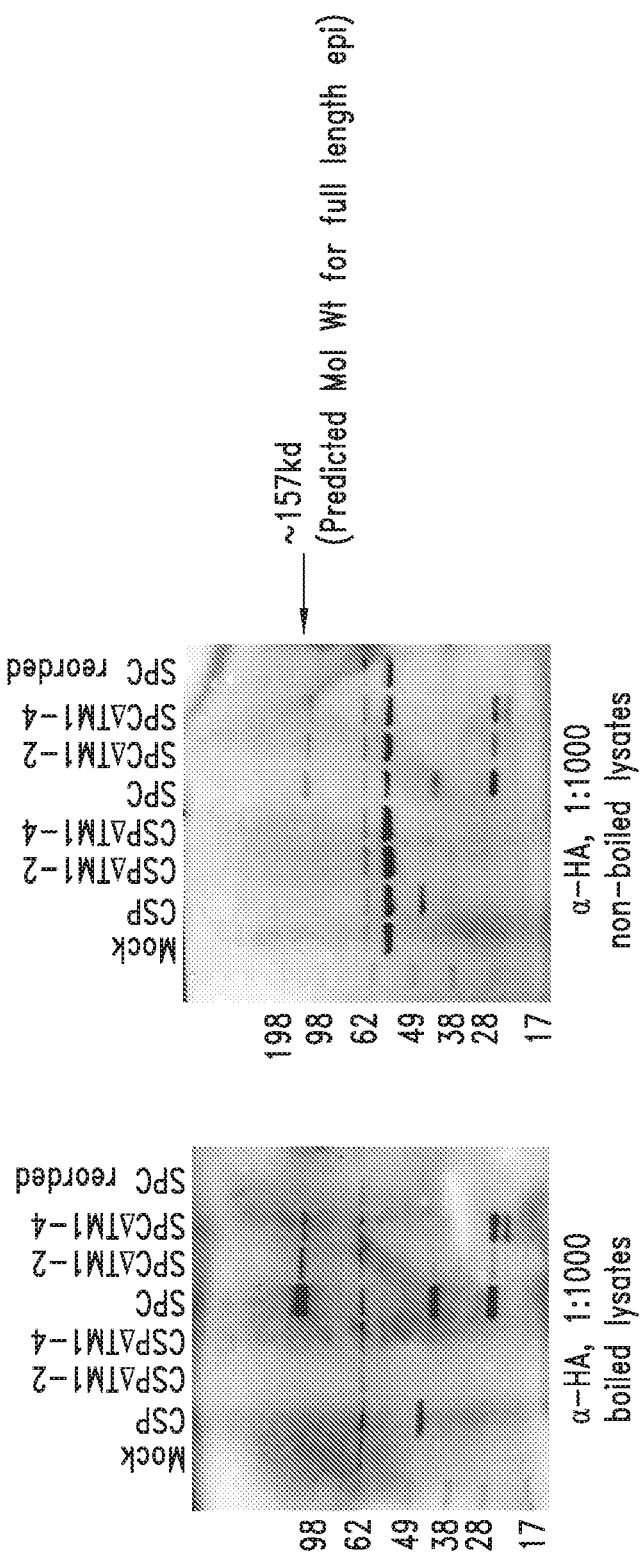

Expression of the episensus antigens derived from these variant sequences was tested by SDS-page and western blotting as described above (FIGS. 11A to 11D). Removing the transmembrane (TM) domains did not affect expression (FIG. 11D).

No significant aggregation was observed with any of the EpiD antigen variants. Protein order of the antigen fusion was related to efficient expression. SPC re-ordered antigen fusion proteins show significantly increased expression.

HBV episensus antigens may be derived from one or more of the following HBV proteins or protein domains: the core (C) protein, the surface(S) protein, the PreS1 protein, the PreS2 protein, the transmembrane domains 1-4 (TM1-4) of the S protein, the determinant, and the polymerase (P) protein. The episensus antigens may be derived from various HBV proteins and protein domains having deletions or mutations, and/or the episensus antigens may be re-ordered relative to their order in HBV, for improved expression or activity. For illustration purposes, an episensus sequence derived from core protein of HBV subtype D is provided in SEQ ID NO:16, an episensus sequence derived from PreS1 protein of HBV subtype D is provided in SEQ ID NO:17, an episensus sequence derived from PreS2 protein of HBV subtype D is provided in SEQ ID NO:18, an episensus sequence derived from surface protein(S) of HBV subtype D is provided in SEQ ID NO:19, an episensus sequence derived from polymerase (P) protein of HBV subtype D is provided in SEQ ID NOs:20 or 22, and an episensus sequence derived from polymerase (P) protein of HBV subtype D containing the mutations and deletion shown in Table 1 is provided in SEQ ID NO:23. An example of an episensus sequence derived from HBV subtype C surface protein(S), polymerase protein (P), and core protein (C), with the antigen sequences in the order "SPC" is provided in SEQ ID NO:24. Examples of episensus sequences derived from P protein that has a larger deleted region than that shown in Table 1 include the episensus sequence derived from HBV subtype C surface protein(S), polymerase protein (P) having a deletion of amino acids 612-838, and core protein (C), provided in SEQ ID NO:25; and the episensus sequence derived from HBV subtype D surface protein(S), polymerase protein (P) having a deletion of amino acids 601-827, and core protein (C), provided in SEQ ID NO:26. Both SEQ ID NOs:25 and 26 are reordered, providing the antigen sequences in the order "SPC."

Figure 12A:
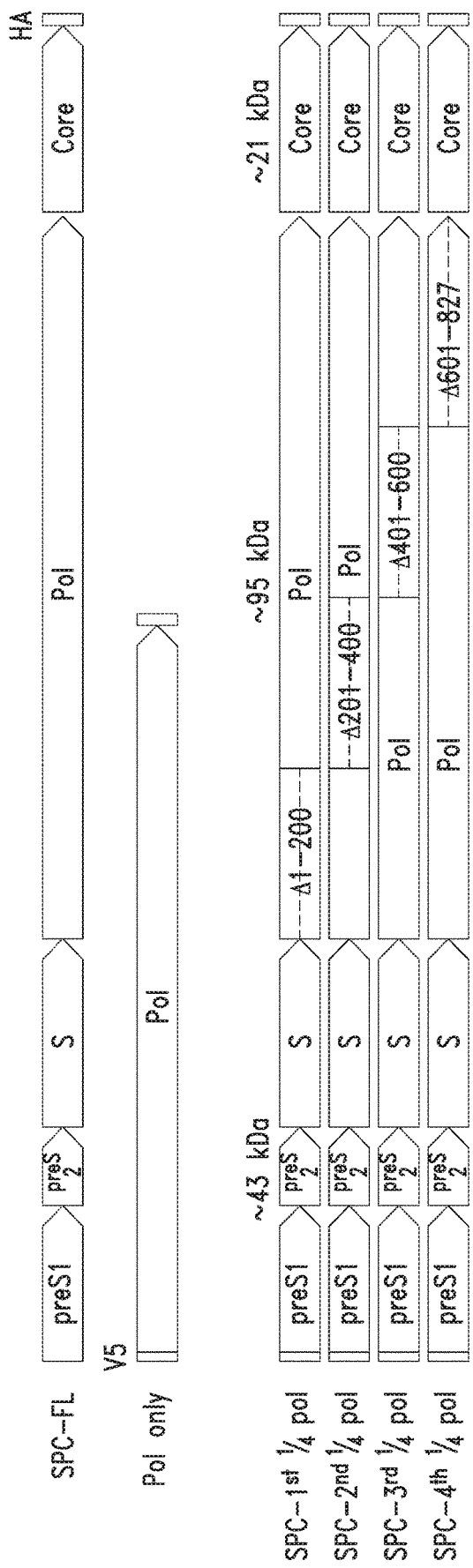
Figure 12B:
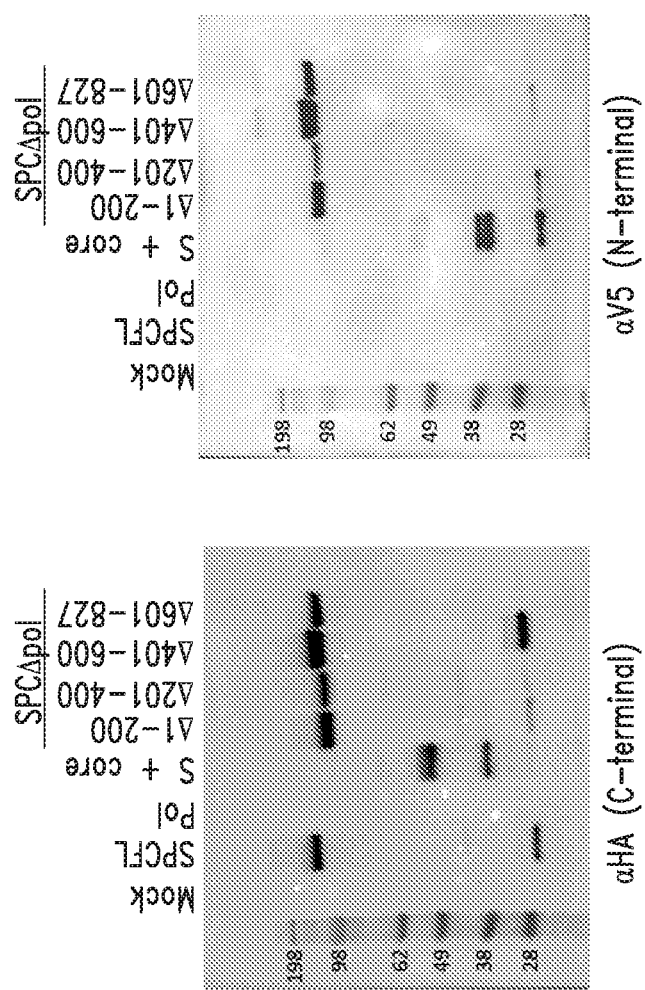

Additional examples of episensus sequences derived from P protein with deleted regions are shown in FIG. 12A, and include deletions of P protein amino acids 1-200, 201-400, or 401-600. Expression data for the constructs of FIG. 12A are shown in FIG. 12B.

Further examples of episensus sequences derived from core protein of HBV are provided in SEQ ID NOs:27, 28, and 34. Further examples of episensus sequences derived from surface protein of HBV are provided in SEQ ID NO:29. Further examples of episensus sequences derived from polymerase protein of HBV are provided in SEQ ID NOs:30-32 and SEQ ID NOs:35-36.

The sequences of HBV proteins and protein domains can be determined for any HBV subtype by sequence alignment with the sequences disclosed herein. For example, the complete genomic sequence of the natural D subtype of HBV is provided in GenBank accession number Y07587 (incorporated by reference herein in its entirety). The P protein is encoded by nucleotides of 1-1625 and 2309-3182 of GenBank reference gene Y07587. The PreS protein is encoded by nucleotides of 1-837 and 2850-3182 of GenBank reference gene Y07587. The S domain is encoded by nucleotides 157-837 of GenBank reference gene Y07587. The PreC/C protein is encoded by nucleotides 1816-2454 of GenBank reference gene Y07587. The C protein is encoded by nucleotides of 1903-2451 of GenBank reference gene Y07587. In addition, the complete genomic sequence of the natural C subtype of HBV is provided in GenBank accession number GQ358158 (incorporated by reference herein in its entirety). The P protein is encoded by nucleotides of 1-1623 and 2307-3215 of GenBank reference gene GQ358158. The S protein is encoded by nucleotides of 1-835 and 2848-3215 of GenBank reference gene GQ358158. The PreC/C protein is encoded by nucleotides of 1814-2452 of GenBank reference gene GQ358158. The C protein is encoded by nucleotides of 1901-2452 of GenBank reference gene GQ358158.

Example 7

Vaccine Testing

Vaccines comprising computationally designed episensus antigens are tested in Rhesus macaques (RM). CMV-based T cell responses are expected to be much broader and therefore cover a much higher percentage of sequences than reported previously for other vectors. Thus, even with a relatively small number of animals there should be sufficient epitope responses to evaluate the impact of sequence variation on the cross-reactive potential of the responses. The number and magnitude of all responses to the vaccines is determined by using vaccine-matched sets of peptides. Once the targeted peptides are determined, using just those peptides that are positive in each animal, the impact of natural variation on each vaccine-responsive peptide is determined. The natural variants that are tested are based on the variation found in a reference panel. Nonparametric and computational re-sampling statistical methods are used as the primary tools to evaluate the impact of epitope variation on diminishing magnitude or abrogation of recognition. These analyses are complemented, however, by using generalized linear models as needed to explore the impact of more complex interactions on T cell response cross-reactivity.

The vaccine arms for initial testing in CMV include vectors encoding: 1) a single population episensus antigen, central to the China genotype epidemic; 2) a single population episensus antigen that provides coverage to all HBV Global samples; 3) two population episensus antigens that provide coverage to HBV samples from China; 4) two population episensus antigens that provide coverage to all HBV Global samples; 5) three population episensus antigens that provide coverage to all HBV Global samples; and 6) two population episensus antigens: a first population episensus antigen that provides coverage to HBV samples from China and a second population episensus antigen that provides coverage to HBV samples from the Global set, 7) an episensus antigen generated using a truncated Pol sequence that provides coverage to HBV C subtype epitopes (SEQ ID NO: 25), and 8) an episensus antigen generated using a truncated Pol sequence that provides coverage to HBV D subtype epitopes (SEQ ID NO:26). Controls included vaccines comprising polynucleotides encoding natural D subtype sequence (SEQ ID NO:12), GenBank accession number Y07587; and natural C subtype reference sequence (SEQ ID NO:13), GenBank accession number GQ358158.

Up to ten cohorts of 5 Rhesus macaques (RM) are inoculated with 106 PFU of HCMV vectors as follows: up to eight cohorts each receive one of vaccines 1-8, listed above; a single cohort receives a vaccine comprising a polynucleotide encoding natural D subtype; and a single cohort receives a vaccine comprising a polynucleotide encoding natural C subtype. Cohort 3 receives the episensus plus a different tailored vaccine vector and cohort 4 receives the episensus plus both tailored vaccine vectors.

Rhesus macaques (RM) are inoculated subcutaneously at day 0 and week 12 and followed longitudinally for one year. Since vaccination by HCMV-vectors is not affected by pre-existing anti-RhCMV immunity, animals naturally infected with RhCMV are used for these experiments. Flow cytometric intracellular cytokine analysis (ICS) is used to determine the CD4+ and CD8+ T cell response to individual consecutive 15 mer peptides comprising the vaccine sequences within the vaccine inserts administered to each animal (which will comprise the total vaccine-elicited responses). It is then determined whether these epitope-specific T cells recognize epitope variants in both the target strain and the non-target strains. For peptides that show responses to strain-specific epitopes, the magnitude, functional avidity, and functional characteristics (IFN-γ, TNF-α, IL-2 and MIP-1β production and CD107 externalization) of these responses to the "parent" (vaccine insert sequences) peptide variants are compared to determine the degree of functional cross-reactivity. In selected cases, truncation analysis is used to identify the core epitope for similar comparative analysis. To determine the percentage of MHC-II restricted CD8+ T cells present, "blocking" mAbs specific for MHC-I and MHC-II, and the invariant chain-derived, MHC-II-specific binding peptide CLIP is used to inhibit influenza-specific CD8+ T cell responses in PBMC.

While specific embodiments have been illustrated and described, it will be readily appreciated that the various embodiments described above can be combined to provide further embodiments, and that various changes can be made therein without departing from the spirit and scope of the invention.

All of the U.S. patents, U.S. patent application publications, U.S. patent applications, foreign patents, foreign patent applications, and non-patent publications referred to in the specification and/or listed in the Application Data Sheet, including U.S. Provisional Patent Application No. 62/893, 546, filed Aug. 29, 2019, U.S. Provisional Patent Application No. 62/941,125, filed Nov. 27, 2019, and International Patent Application No. PCT/US2020/048411, filed Aug. 28, 2020, are incorporated herein by reference, in their entirety, unless explicitly stated otherwise. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A polypeptide comprising the amino acid sequence as set forth in SEQ ID NO:1, 2, 3, 4, 5, 6, 7, 8, 9, 10, 11, 14 15, 24, 25, or 26.

2. A polypeptide comprising two or more of the amino acid sequences selected from SEQ ID NOs:1-11, 14, 15, and 24-26.

3. The polypeptide of claim 1, wherein the polypeptide comprises the amino acid sequence as set forth in SEQ ID NO:15, 24, 25, or 26.

4. A cytomegalovirus (CMV) vector comprising a polynucleotide comprising the sequence encoding one or more amino acid sequences as set forth in SEQ ID NO:1, 2, 3, 4, 5, 6, 7, 8, 9, 10, 11, 14, 15, 24, 25, or 26.

5. The CMV vector of claim 4, wherein the CMV vector is a human CMV (HCMV) vector or a rhesus CMV (RhCMV) vector.

6. The CMV vector of claim 5, wherein the CMV vector lacks the UL82 gene.

7. The CMV vector of claim 5, wherein the CMV vector lacks the UL128-UL130 gene region and lacks the UL146-UL147 gene region.

8. The CMV vector of claim 5, wherein the CMV vector has an intact UL128-UL130 gene region and an intact UL146-UL147 gene region.

9. The CMV vector of claim 4, wherein the one or more amino acid sequences comprise one or more of SEQ ID NOs:15, 24, 25, and 26.

10. A hepatitis B virus (HBV) vaccine comprising one or more polypeptides according to claim 1.

11. A method of treating HBV in a subject comprising administering an effective amount of the vector of claim 4 to the subject in need thereof.

12. A method of protecting a subject from an HBV infection comprising administering an effective amount of the vector of claim 4 to the subject in need thereof.

13. A method of generating or inducing an immune response to HBV in a subject comprising administering an effective amount of the vector of claim 4 to the subject in need thereof.

14. A method of generating or inducing an immune response to HBV in a subject comprising administering an effective amount of the polypeptide of claim 1 to the subject in need thereof.

15. A method of generating or inducing an immune response to HBV in a subject comprising administering an effective amount of the vaccine of claim 10 to the subject in need thereof.

* * * * *